US012710622B2

(12) United States Patent
Ke et al.

(10) Patent No.: US 12,710,622 B2
(45) Date of Patent: Aug. 18, 2026

(54) IMAGE CAPTURING LENS ASSEMBLY, IMAGE CAPTURING UNIT AND ELECTRONIC DEVICE

(71) Applicant: LARGAN PRECISION CO., LTD., Taichung City (TW)

(72) Inventors: Yu-Chun Ke, Taichung City (TW); Shiu Sheng Li, Taichung City (TW); Hong Rong Kuo, Taichung City (TW); Yu-Han Shih, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 322 days.

(21) Appl. No.: 18/517,677

(22) Filed: Nov. 22, 2023

(65) Prior Publication Data

US 2025/0138284 A1 May 1, 2025

(30) Foreign Application Priority Data

Oct. 27, 2023 (TW) ................................ 112141324

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ........................................................ G02B 9/62
See application file for complete search history.

(56) References Cited

U.S. PATENT DOCUMENTS

| | | | |
|---|---|---|---|
| 2,262,998 | A | 11/1941 | Frederick et al. |
| 2,611,295 | A | 9/1952 | Schade |
| 2,707,417 | A | 5/1955 | Bouwers et al. |
| 2,718,173 | A | 9/1955 | Hacman et al. |
| 2,894,431 | A | 7/1959 | Miles |
| 2,959,103 | A | 11/1960 | Cook |
| 3,608,452 | A | 9/1971 | Conrad et al. |
| 4,316,653 | A | 2/1982 | Shimizu |

(Continued)

FOREIGN PATENT DOCUMENTS

| | | | |
|---|---|---|---|
| CN | 101893750 | A | 11/2010 |
| CN | 103424845 | A | 12/2013 |

(Continued)

OTHER PUBLICATIONS

TW Office Action dated Oct. 7, 2024 in application 112141324.

*Primary Examiner* — Edmond C Lau
(74) *Attorney, Agent, or Firm* — Maschoff Brennan

(57) ABSTRACT

An image capturing lens assembly includes six lens units which are, in order from an object side to an image side along an optical path: first through sixth lens units. Each lens unit of the first through third lens units and the fifth through sixth lens units is a single lens element. The fourth lens unit is a single lens element or is composed of two lens elements, and the fourth lens unit at least includes a front lens element. The total number of lens elements of the image capturing lens assembly is six to seven. The first lens unit has an image-side surface being concave in a paraxial region thereof. The third lens unit has an object-side surface being convex in a paraxial region thereof. The front lens element with negative refractive power has an image-side surface being concave in a paraxial region thereof.

29 Claims, 41 Drawing Sheets

1

(56) References Cited

U.S. PATENT DOCUMENTS

| | | | |
|---|---|---|---|
| 4,390,252 | A | 6/1983 | Mori |
| 4,747,677 | A | 5/1988 | Horikawa et al. |
| 4,776,682 | A | 10/1988 | Hosoya |
| 5,066,113 | A | 11/1991 | Nakajima et al. |
| 5,157,553 | A | 10/1992 | Phillips et al. |
| 5,339,195 | A | 8/1994 | Ogata |
| 5,742,436 | A | 4/1998 | Furter |
| 5,914,823 | A | 6/1999 | Yamamoto |
| 5,982,558 | A | 11/1999 | Furter et al. |
| 6,014,265 | A | 1/2000 | Kato et al. |
| 6,411,443 | B1 | 6/2002 | Kato et al. |
| 9,961,244 | B2 | 5/2018 | Liao et al. |
| 10,627,603 | B2 | 4/2020 | Huang |
| 10,935,761 | B1 * | 3/2021 | Ning ..................... G02B 13/04 |
| 11,340,427 | B2 | 5/2022 | Wei et al. |
| 2013/0314588 | A1 | 11/2013 | Kim |
| 2015/0277083 | A1 | 10/2015 | Chae |
| 2019/0086638 | A1 | 3/2019 | Lee |
| 2021/0063704 | A1 | 3/2021 | Son et al. |
| 2021/0165187 | A1 | 6/2021 | Nagahara |
| 2021/0173126 | A1 | 6/2021 | Lee et al. |
| 2022/0091367 | A1 | 3/2022 | Jang et al. |
| 2022/0252841 | A1 | 8/2022 | Lee et al. |
| 2023/0185060 | A1 | 6/2023 | Hua et al. |

FOREIGN PATENT DOCUMENTS

| | | | |
|---|---|---|---|
| CN | 107102429 | A | 8/2017 |
| CN | 107436481 | A | 12/2017 |
| CN | 107621682 | A | 1/2018 |
| CN | 107664817 | A | 2/2018 |
| CN | 107797232 | A | 3/2018 |
| CN | 108037579 | A | 5/2018 |
| CN | 108919459 | A | 11/2018 |
| CN | 110488458 | A | 11/2019 |
| CN | 112327449 | A | 2/2021 |
| CN | 112630947 | A | 4/2021 |
| CN | 112666686 | A | 4/2021 |
| CN | 112684599 | A | 4/2021 |
| CN | 113126268 | A | 7/2021 |
| CN | 113126269 | A | 7/2021 |
| CN | 113467053 | A | 10/2021 |
| CN | 113671677 | A | 11/2021 |
| CN | 113835200 | A | 12/2021 |
| CN | 215116952 | U | 12/2021 |
| CN | 215340514 | U | 12/2021 |
| CN | 113885180 | A | 1/2022 |
| CN | 215769187 | U | 2/2022 |
| CN | 114137692 | A | 3/2022 |
| CN | 114185161 | A | 3/2022 |
| CN | 216118220 | U | 3/2022 |
| CN | 114509857 | A | 5/2022 |
| CN | 114859503 | A | 8/2022 |
| CN | 114966919 | A | 8/2022 |
| CN | 114994867 | A | 9/2022 |
| CN | 115113378 | A | 9/2022 |
| CN | 115113379 | A | 9/2022 |
| CN | 115128781 | A | 9/2022 |
| CN | 115220196 | A | 10/2022 |
| CN | 115980986 | A | 4/2023 |
| CN | 116027525 | A | 4/2023 |
| CN | 116047713 | A | 5/2023 |
| CN | 116482837 | A | 7/2023 |
| CN | 116661103 | A | 8/2023 |
| CN | 116661112 | A | 8/2023 |
| CN | 117055185 | A | 11/2023 |
| JP | S5627108 | A | 3/1981 |
| JP | S63-70818 | A | 3/1988 |
| JP | S63-101812 | A | 5/1988 |
| JP | H05-224119 | A | 9/1993 |
| JP | H07-294808 | A | 11/1995 |
| JP | H09-197270 | A | 7/1997 |
| JP | H10-78546 | A | 3/1998 |
| JP | H11-231216 | A | 8/1999 |
| JP | 2009-169129 | A | 7/2009 |
| TW | M612634 | U | 6/2021 |
| TW | 202232181 | A | 8/2022 |
| WO | 2015016004 | A1 | 2/2015 |
| WO | 2022/151353 | A1 | 7/2022 |
| WO | 2022/179632 | A1 | 9/2022 |
| WO | 2022/213793 | A1 | 10/2022 |
| WO | 2023234051 | A1 | 12/2023 |

* cited by examiner

600

700

IMAGE CAPTURING LENS ASSEMBLY, IMAGE CAPTURING UNIT AND ELECTRONIC DEVICE

RELATED APPLICATIONS

This application claims priority to Taiwan Application 112141324, filed on Oct. 27, 2023, which is incorporated by reference herein in its entirety.

BACKGROUND

Technical Field

The present disclosure relates to an image capturing lens assembly, an image capturing unit and an electronic device, more particularly to an image capturing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an image capturing lens assembly includes two lens groups. The two lens groups are, in order from an object side to an image side along an optical path, a first lens group and a second lens group. The two lens groups include six lens units. The six lens units are, in order from the object side to the image side along the optical path, a first lens unit, a second lens unit, a third lens unit, a fourth lens unit, a fifth lens unit and a sixth lens unit. The first lens group includes the first lens unit, the second lens unit and the third lens unit. The second lens group includes a front lens group and a rear lens group. The front lens group includes the fourth lens unit. The rear lens group includes the fifth lens unit and the sixth lens unit.

Preferably, each of the first lens unit, the second lens unit, the third lens unit, the fifth lens unit and the sixth lens unit is a single lens element. Preferably, the fourth lens unit is a single lens element or is composed of two lens elements. When the fourth lens unit is a single lens element, the fourth lens unit includes a front lens element. When the fourth lens unit is composed of two lens elements, the fourth lens unit includes, in order from the object side to the image side along the optical path, a front lens element and a rear lens element.

Preferably, the total number of lens groups of the image capturing lens assembly is two. Preferably, the total number of lens units of the image capturing lens assembly is six. Preferably, the total number of lens elements of the image capturing lens assembly is six to seven. Preferably, each lens element of the image capturing lens assembly has an object-side surface facing toward the object side and an image-side surface facing toward the image side. Preferably, there is no additional lens element disposed between each of adjacent two of the six lens units.

Preferably, the image-side surface of the first lens unit is concave in a paraxial region thereof. Preferably, the object-side surface of the third lens unit is convex in a paraxial region thereof. Preferably, the front lens element has negative refractive power. Preferably, the image-side surface of the front lens element is concave in a paraxial region thereof.

When a maximum field of view of the image capturing lens assembly is FOV, an axial distance between the image-side surface of the front lens element and the object-side surface of the fifth lens unit is Dra2r9, an axial distance of the first lens group is DG1, an axial distance of the front lens group is DG2f, a central thickness of the front lens element is CTa, a central thickness of the fifth lens unit is CT5, an axial distance between the object-side surface of the first lens unit and an image surface is TL, an axial distance between the first lens unit and the second lens unit is T12, an entrance pupil diameter of the image capturing lens assembly is EPD, a focal length of the image capturing lens assembly is f, a composite focal length of the first lens unit and the second lens unit is f12, a composite focal length of the second lens unit and the third lens unit is f23, and a focal length of the front lens group is fG2f, the following conditions are preferably satisfied:

$$10.0\text{ degrees} < FOV < 45.0\text{ degrees};$$

$$0.65 < Dra2r9/CT5 < 2.10;$$

$$DG1/DG2f < 1.68;$$

$$2.40 < TL/EPD < 4.10;$$

$$-1.30 < f/f23 - |f/f12| + f/fG2f < 3.00;$$

and $$10 \times T12/CTa < 2.50.$$

According to another aspect of the present disclosure, an image capturing lens assembly includes two lens groups. The two lens groups are, in order from an object side to an image side along an optical path, a first lens group and a second lens group. The two lens groups include six lens units. The six lens units are, in order from the object side to the image side along the optical path, a first lens unit, a second lens unit, a third lens unit, a fourth lens unit, a fifth lens unit and a sixth lens unit. The first lens group includes the first lens unit, the second lens unit and the third lens unit. The second lens group includes a front lens group and a rear lens group. The front lens group includes the fourth lens unit. The rear lens group includes the fifth lens unit and the sixth lens unit.

Preferably, each of the first lens unit, the second lens unit, the third lens unit, the fifth lens unit and the sixth lens unit is a single lens element. Preferably, the fourth lens unit is a single lens element or is composed of two cemented lens elements. When the fourth lens unit is a single lens element, the fourth lens unit includes a front lens element. When the fourth lens unit is composed of two cemented lens elements, the fourth lens unit includes, in order from the object side to the image side along the optical path, a front lens element and a rear lens element.

Preferably, the total number of lens groups of the image capturing lens assembly is two. Preferably, the total number of lens units of the image capturing lens assembly is six. Preferably, the total number of lens elements of the image capturing lens assembly is six to seven. Preferably, each lens element of the image capturing lens assembly has an object-side surface facing toward the object side and an image-side surface facing toward the image side. Preferably, there is no additional lens element disposed between each of adjacent two of the six lens units.

Preferably, the image-side surface of the first lens unit is concave in a paraxial region thereof. Preferably, the object-side surface of the third lens unit is convex in a paraxial region thereof. Preferably, the front lens element has negative refractive power. Preferably, the image-side surface of the front lens element is concave in a paraxial region thereof.

When a maximum field of view of the image capturing lens assembly is FOV, an axial distance of the first lens group is DG1, an axial distance of the front lens group is DG2f, an axial distance between the object-side surface of the first lens unit and an image surface is TL, an entrance pupil diameter of the image capturing lens assembly is EPD, a curvature radius of a most-object-side surface of the fourth lens unit is RU4f, a curvature radius of a most-image-side surface of the fourth lens unit is RU4r, a focal length of the second lens unit is f2, a focal length of the third lens unit is f3, and a focal length of the fifth lens unit is f5, the following conditions are preferably satisfied:

$$15.0\text{ degrees} < FOV < 42.0\text{ degrees};$$

$$DG1/DG2f < 1.68;$$

$$2.40 < TL/EPD < 4.10;$$

$$RU4f/RU4r < 7.50;$$

and $$1.60 < |f3 + f5|/|f2|.$$

According to another aspect of the present disclosure, an image capturing lens assembly includes two lens groups. The two lens groups are, in order from an object side to an image side along an optical path, a first lens group and a second lens group. The two lens groups includes six lens units. The six lens units are, in order from the object side to the image side along the optical path, a first lens unit, a second lens unit, a third lens unit, a fourth lens unit, a fifth lens unit and a sixth lens unit. The first lens group includes the first lens unit, the second lens unit and the third lens unit. The second lens group includes a front lens group and a rear lens group. The front lens group includes the fourth lens unit. The rear lens group includes the fifth lens unit and the sixth lens unit.

Preferably, each of the first lens unit, the second lens unit, the third lens unit, the fifth lens unit and the sixth lens unit is a single lens element. Preferably, the fourth lens unit is composed of two lens elements, and the fourth lens unit includes, in order from the object side to the image side along the optical path, a front lens element and a rear lens element.

Preferably, the total number of lens groups of the image capturing lens assembly is two. Preferably, the total number of lens units of the image capturing lens assembly is six. Preferably, the total number of lens elements of the image capturing lens assembly is seven. Preferably, each lens element of the image capturing lens assembly has an object-side surface facing toward the object side and an image-side surface facing toward the image side. Preferably, there is no additional lens element disposed between each of adjacent two of the six lens units.

Preferably, the object-side surface of the third lens unit is convex in a paraxial region thereof. Preferably, the object-side surface of the front lens element is concave in a paraxial region thereof. Preferably, the sixth lens unit has negative refractive power.

When a maximum field of view of the image capturing lens assembly is FOV, an axial distance between the object-side surface of the front lens element and the object-side surface of the fifth lens unit is Dra1r9, an axial distance between the image-side surface of the front lens element and the object-side surface of the fifth lens unit is Dra2r9, a central thickness of the first lens unit is CT1, a central thickness of the second lens unit is CT2, a central thickness of the fifth lens unit is CT5, and an axial distance between the front lens element and the rear lens element is Tab, the following conditions are preferably satisfied:

$$10.0\text{ degrees} < FOV < 55.0\text{ degrees};$$

$$0.50 < Dra2r9/CT5 < 2.30;$$

$$3.0 < Dra1r9/CT1 < 15.0;$$

and $$1.80 < 0.1 \times CT2/\text{Tab}.$$

According to another aspect of the present disclosure, an image capturing unit includes one of the aforementioned image capturing lens assemblies and an image sensor, wherein the image sensor is disposed on the image surface of the image capturing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
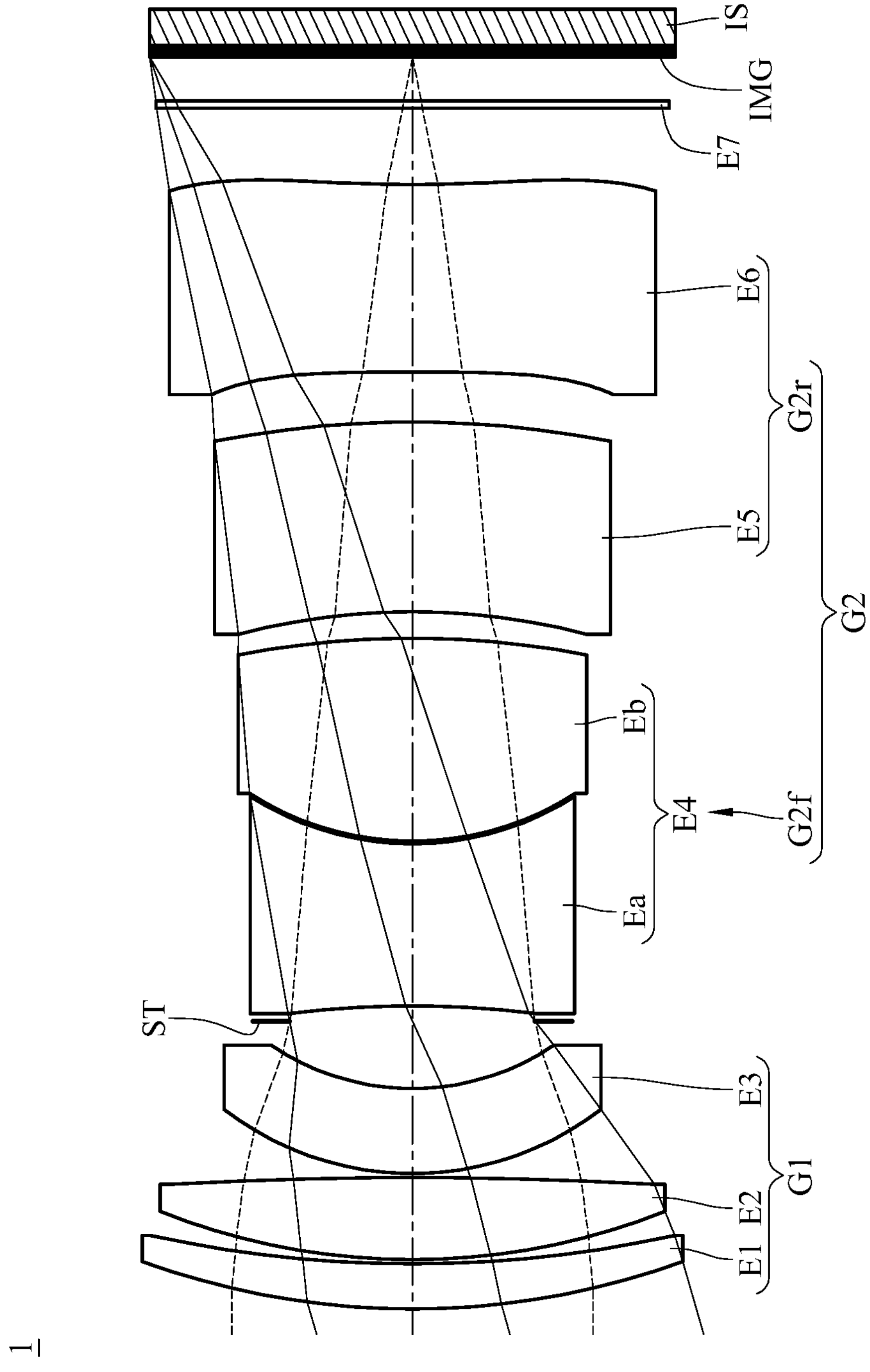
FIG. 1 is a schematic view of an image capturing unit according to the 1st embodiment of the present disclosure.

An image capturing lens assembly includes two lens groups. The two lens groups are, in order from an object side to an image side along an optical path, a first lens group and a second lens group. The two lens groups include six lens units. The six lens units are, in order from the object side to the image side along the optical path, a first lens unit, a second lens unit, a third lens unit, a fourth lens unit, a fifth lens unit and a sixth lens unit. The first lens group includes the first lens unit, the second lens unit and the third lens unit. The second lens group includes a front lens group and a rear lens group. The front lens group includes the fourth lens unit. The rear lens group includes the fifth lens unit and the sixth lens unit.

Each of the first lens unit, the second lens unit, the third lens unit, the fifth lens unit and the sixth lens unit is a single lens element. In this situation, the first lens unit, the second lens unit, the third lens unit, the fifth lens unit and the sixth lens unit can also be considered as the first lens element, the second lens element, the third lens element, the fifth lens element and the sixth lens element, respectively. The fourth lens unit can be a single lens element or can be composed of two lens elements or two cemented lens elements. When the fourth lens unit is a single lens element, it can be considered that the fourth lens unit includes a front lens element. Therefore, it is favorable for reducing manufacturing tolerance and costs. When the fourth lens unit is composed of two lens elements, it can be considered that the fourth lens unit includes, in order from the object side to the image side along the optical path, a front lens element and a rear lens element. Therefore, it is favorable for providing more parameters for controlling the optical path so as to improve design flexibility. When the fourth lens unit is composed of two cemented lens elements, it can be considered that the fourth lens unit includes, in order from the object side to the image side along the optical path, a front lens element and a rear lens element. Therefore, it is favorable for utilizing cementation to reduce the refractive index difference at the interval between the lens elements, thereby effectively reducing reflection generated along with light refraction and thus preventing unwanted images such as ghost images. In some situations, the front lens element can also be considered as the most-object-side lens element of the fourth lens unit, and the rear lens element can also be considered as the most-image-side lens element of the fourth lens unit.

The total number of lens groups of the image capturing lens assembly is two. The total number of lens units of the image capturing lens assembly is six. The total number of lens elements of the image capturing lens assembly can be six to seven. Moreover, the total number of lens elements of the image capturing lens assembly can be seven. Each lens element of the image capturing lens assembly has an object-side surface facing toward the object side and an image-side surface facing toward the image side. There is no additional lens element disposed between each of adjacent two of the six lens units.

The image-side surface of the first lens unit can be concave in a paraxial region thereof. Therefore, it is favorable for receiving light to prevent light divergence.

The object-side surface of the third lens unit is convex in a paraxial region thereof. Therefore, it is favorable for converging light so as to effectively control the travelling direction of the optical path while correcting aberrations.

The front lens element can have negative refractive power. Therefore, it is favorable for effectively balancing refractive power configuration of lens elements and obtaining a proper balance between the image size and the size distribution. The object-side surface of the front lens element can be concave in a paraxial region thereof. Therefore, it is favorable for enlarging the image surface while correcting spherical aberration and coma. The image-side surface of the front lens element can be concave in a paraxial region thereof. Therefore, it is favorable for adjusting the lens shape of the image-side surface of the most-object-side lens element of the fourth lens unit (i.e., the front lens element) so as to be combined with the remaining lens elements at an image side thereof to correct aberrations.

The rear lens element is disposed between the front lens element and the fifth lens unit. The rear lens element can have positive refractive power. Therefore, it is favorable for being combined with the most-object-side lens element of the fourth lens unit (i.e., the front lens element) so as to correct aberrations of the image capturing lens assembly. The object-side surface of the rear lens element can be convex in a paraxial region thereof. Therefore, it is favorable for adjusting the lens shape of the object-side surface of the rear lens element so as to converge light for reducing the overall size.

The sixth lens unit can have negative refractive power. Therefore, it is favorable for correcting distortion and reducing the back focal length of the image capturing lens assembly.

According to the present disclosure, the image capturing lens assembly can further include an aperture stop. The aperture stop can be disposed at an object side of the second lens group. Therefore, it is favorable for controlling the position of the aperture stop so as to restrict the incident angle of light, thereby improving image quality.

According to the present disclosure, at least one of the object-side surface and the image-side surface of at least one lens element of the first lens group can be spherical. Therefore, it is favorable for collaborating with a proper selection of glass material to prevent image distortion due to temperature effect. Moreover, at least one of the object-side surface and the image-side surface of each of at least three lens elements of the first lens group can be spherical. Therefore, it is favorable for effectively improving manufacturability and collaborating with the selection of glass material to reduce the influence caused by temperature effect.

According to the present disclosure, at least one lens element of the image capturing lens assembly can be made of glass material. Therefore, it is favorable for effectively improving temperature effect to reduce the degree of environmental influence on image quality.

According to the present disclosure, there can be no relative displacement between each adjacent two lens elements of the image capturing lens assembly. Therefore, it is favorable for ensuring good image quality and reducing the difficulty of structural design and assembly.

Figure 35:
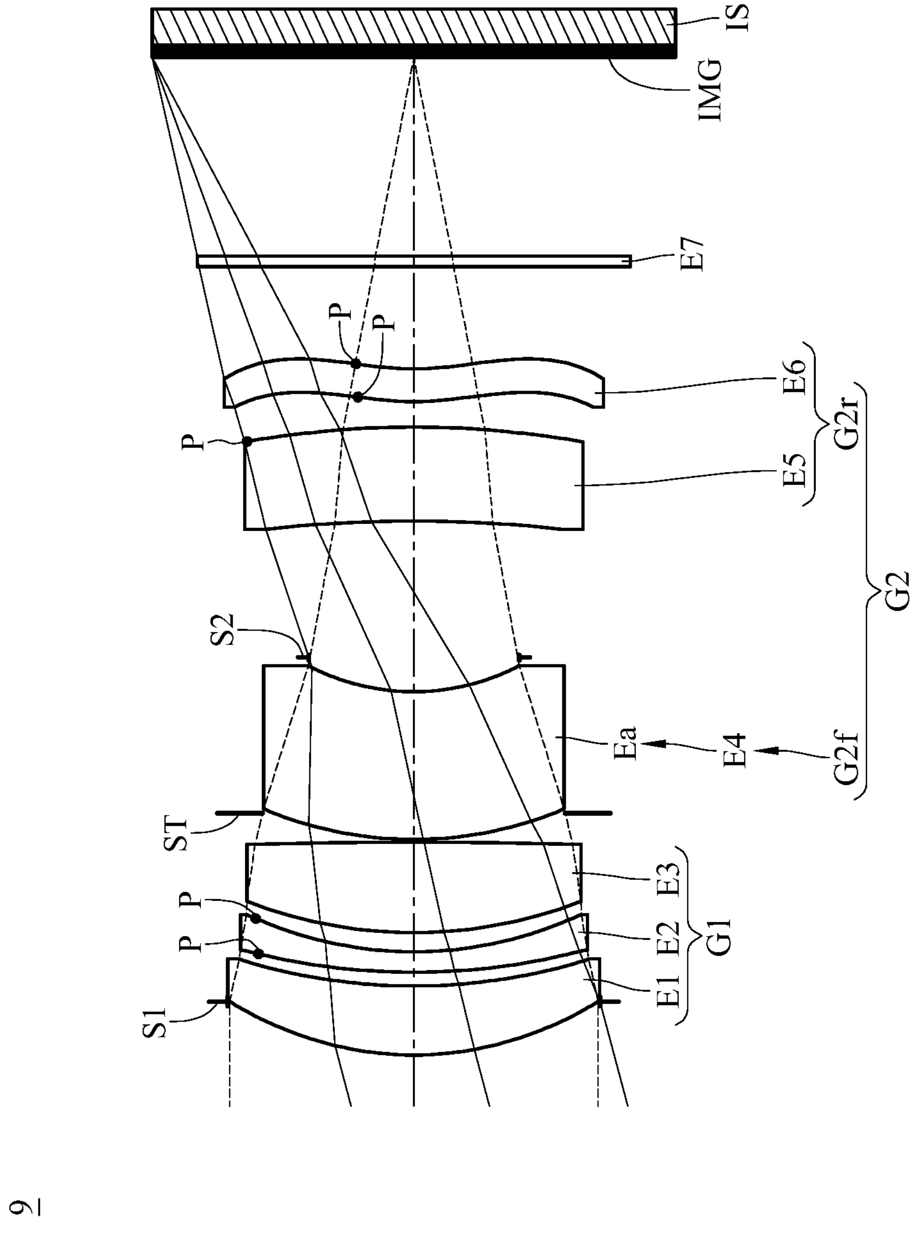
FIG. 35 shows a schematic view of inflection points on lens surfaces according to the 9th embodiment of the present disclosure.

According to the present disclosure, at least one of the object-side surface and the image-side surface of at least one lens element of the image capturing lens assembly can have at least one inflection point. Therefore, it is favorable for adjusting the lens shape design at the periphery of the lens element so as to correct field curvature. Please refer to FIG. 35, which shows a schematic view of all inflection points P on lens elements according to the 9th embodiment of the present disclosure. The abovementioned inflection points P on lens surfaces of the second, fifth and sixth lens units in FIG. 35 are only exemplary. Each of lens surfaces in various embodiments of the present disclosure may also have one or more inflection points.

When a maximum field of view of the image capturing lens assembly is FOV, the following condition is satisfied: $10.0\ \text{degrees}<FOV<55.0\ \text{degrees}$. Therefore, it is favorable for having a proper field of view of the image capturing lens assembly so as to meet image requirements of the applied device. Moreover, the following condition can also be satisfied: $10.0\ \text{degrees}<FOV<45.0\ \text{degrees}$. Moreover, the following condition can also be satisfied: $15.0\ \text{degrees}<FOV<42.0\ \text{degrees}$. Moreover, the following condition can also be satisfied: $25.0\ \text{degrees}<FOV<42.0\ \text{degrees}$. Moreover, the following condition can also be satisfied: $29.8\ \text{degrees}\leq FOV\leq 37.0\ \text{degrees}$.

Figure 36:
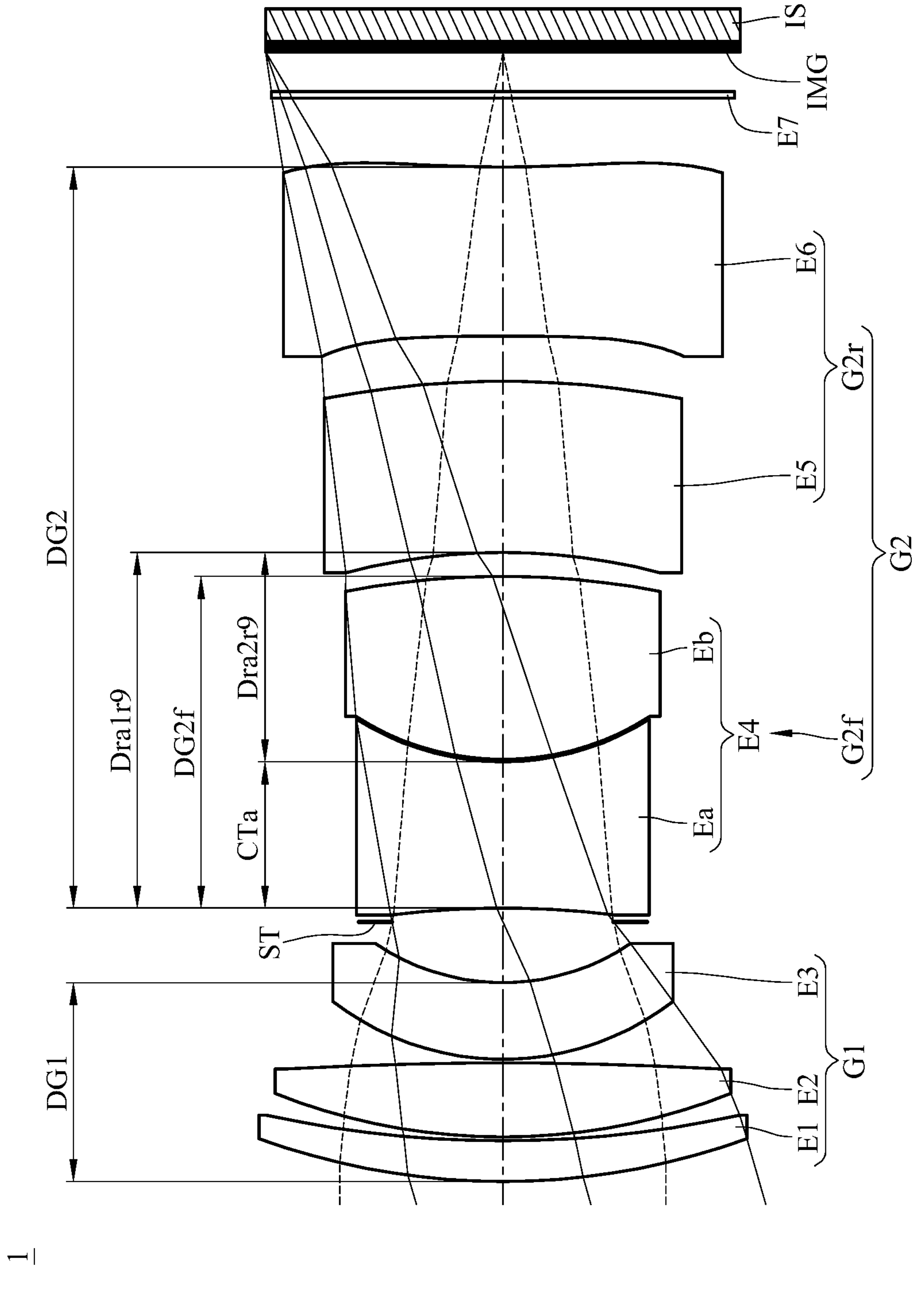
FIG. 36 shows a schematic view of DG1, DG2, DG2f, Dra1r9, Dra2r9 and CTa according to the 1st embodiment of the present disclosure.
Figure 37:
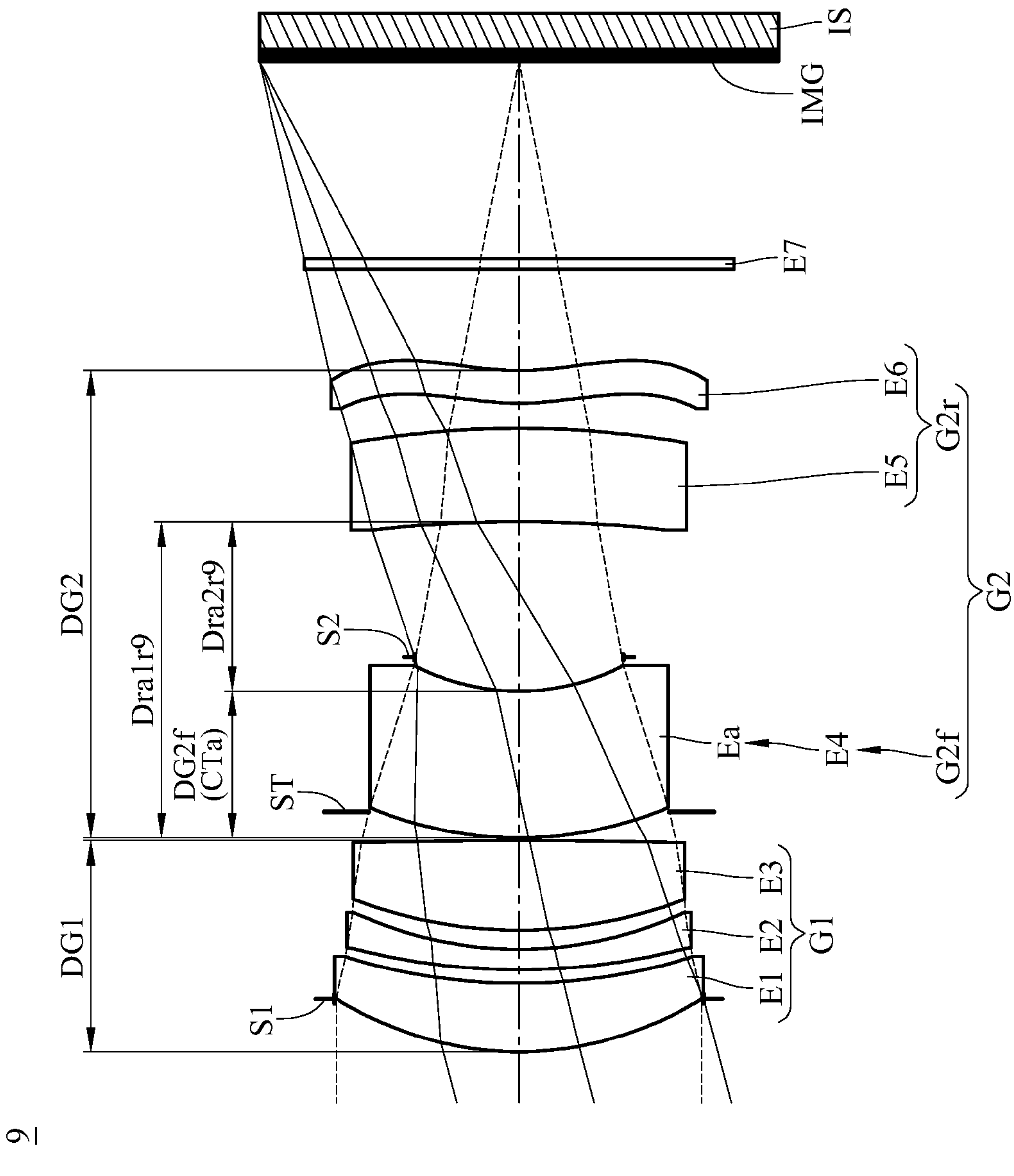
FIG. 37 shows a schematic view of DG1, DG2, DG2f, Dra1r9, Dra2r9 and CTa according to the 9th embodiment of the present disclosure.

When an axial distance between the image-side surface of the front lens element and the object-side surface of the fifth lens unit is Dra2r9, and a central thickness of the fifth lens unit is CT5, the following condition can be satisfied: $0.50<Dra2r9/CT5<2.30$. Therefore, it is favorable for balancing the distance between the front lens element and the fifth lens unit and the central thickness of the fifth lens unit, thereby maintaining a proper space configuration and reducing the sensitivity of the image capturing lens assembly. Moreover, the following condition can also be satisfied: $0.65<Dra2r9/CT5<2.10$. Moreover, the following condition can also be satisfied: $0.70<Dra2r9/CT5<2.00$. Moreover, the following condition can also be satisfied: $0.81\leq Dra2r9/CT5\leq 1.81$. Moreover, the following condition can also be satisfied: $0.98\leq Dra2r9/CT5\leq 1.91$. Please refer to FIG. 36, which shows a schematic view of Dra2r9 according to the 1st embodiment of the present disclosure. Please refer to FIG. 37, which shows a schematic view of Dra2r9 according to the 9th embodiment of the present disclosure.

When an axial distance of the first lens group is DG1, and an axial distance of the front lens group is DG2f, the following condition can be satisfied: $DG1/DG2f<1.80$. Therefore, it is favorable for adjusting the length ratio of the front portion and the middle portion of the image capturing lens assembly so as to prevent an overly long total track length. Moreover, the following condition can also be satisfied: $DG1/DG2f<1.68$. Moreover, the following condition can also be satisfied: $0.50<DG1/DG2f<1.60$. Moreover, the following condition can also be satisfied: $0.60\leq DG1/DG2f\leq 1.44$. Please refer to FIG. 36, which shows a schematic view of DG1 and DG2f according to the 1st embodiment of the present disclosure. Please refer to FIG. 37, which shows a schematic view of DG1 and DG2f according to the 9th embodiment of the present disclosure.

When an axial distance between the object-side surface of the first lens unit and the image surface is TL, and an entrance pupil diameter of the image capturing lens assembly is EPD, the following condition can be satisfied: $1.50<TL/EPD<4.10$. Therefore, it is favorable for the image capturing lens assembly to be a telephoto-type imaging system while obtaining a proper balance between the total track length and the amount of incident light. Moreover, the following condition can also be satisfied: $2.40<TL/EPD<4.10$. Moreover, the following condition can also be satisfied: $2.50<TL/EPD<3.95$. Moreover, the following condition can also be satisfied: $2.71 \leq TL/EPD \leq 3.73$.

When a focal length of the image capturing lens assembly is f, a composite focal length of the first lens unit and the second lens unit is f12, a composite focal length of the second lens unit and the third lens unit is f23, and a focal length of the front lens group is fG2f, the following condition can be satisfied: $-1.50<f/f23-|f/f12|+f/fG2f<3.50$. Therefore, it is favorable for effectively sharing the intensity of the overall refractive power so as to balance the travelling direction of the optical path of the telephoto-type imaging system for improving image quality. Moreover, the following condition can also be satisfied: $-1.30<f/f23-|f/f12|+f/fG2f<3.00$. Moreover, the following condition can also be satisfied: $-1.00<f/f23-|f/f12|+f/fG2f<2.70$. Moreover, the following condition can also be satisfied: $-0.81 \leq f/f23-|f/f12|+f/fG2f \leq 2.28$.

When an axial distance between the first lens unit and the second lens unit is T12, and a central thickness of the front lens element is CTa, the following condition can be satisfied: $10 \times T12/CTa<2.50$. Therefore, it is favorable for controlling the interval between the first lens unit and the second lens unit and the central thickness of the front lens element, thereby collaborating with the adjustment of the travelling direction of the optical path at the front portion of the image capturing lens assembly while reducing manufacturing tolerance. Moreover, the following condition can also be satisfied: $10 \times T12/CTa<2.20$. Moreover, the following condition can also be satisfied: $0.06 \leq 10 \times T12/CTa \leq 1.31$. Please refer to FIG. 36, which shows a schematic view of CTa according to the 1st embodiment of the present disclosure. Please refer to FIG. 37, which shows a schematic view of CTa according to the 9th embodiment of the present disclosure.

When a curvature radius of a most-object-side surface of the fourth lens unit is RU4f, and a curvature radius of a most-image-side surface of the fourth lens unit is RU4r, the following condition can be satisfied: $RU4f/RU4r<7.50$. Therefore, it is favorable for adjusting the ranges of the central curvature radii of the most-image-side surface and the most-object-side surface of the fourth lens unit to harmonizing the optical path and reduce aberrations. Moreover, the following condition can also be satisfied: $RU4f/RU4r<5.50$. Moreover, the following condition can also be satisfied: $RU4f/RU4r<3.50$. Moreover, the following condition can also be satisfied: $-2.91 \leq RU4f/RU4r \leq 1.98$.

When a focal length of the second lens unit is f2, a focal length of the third lens unit is f3, and a focal length of the fifth lens unit is f5, the following condition can be satisfied: $1.60<|f3+f5|/|f2|$. Therefore, it is favorable for balancing the convergence or the divergence of incident light so as to adjusting the travelling direction of the optical path of the telephoto-type imaging system and improve convergence quality at all fields of view. Moreover, the following condition can also be satisfied: $2.00<|f3+f5|/|f2|$. Moreover, the following condition can also be satisfied: $1.75 \leq |f3+f5|/|f2| \leq 48.28$.

When an axial distance between the object-side surface of the front lens element and the object-side surface of the fifth lens unit is Dra1r9, and a central thickness of the first lens unit is CT1, the following condition can be satisfied: $3.0<Dra1r9/CT1<15.0$. Therefore, it is favorable for adjusting the distance between the object-side surface of the front lens element and the fifth lens unit and the central thickness of the first lens unit, thereby ensuring a sufficient distance of the image capturing lens assembly for the extension of the optical path while without overly extending the total track length of the image capturing lens assembly. Moreover, the following condition can also be satisfied: $3.0<Dra1r9/CT1<12.0$. Moreover, the following condition can also be satisfied: $3.38 \leq Dra1r9/CT1 \leq 9.51$. Please refer to FIG. 36, which shows a schematic view of Dra1r9 according to the 1st embodiment of the present disclosure. Please refer to FIG. 37, which shows a schematic view of Dra1r9 according to the 9th embodiment of the present disclosure.

When a central thickness of the second lens unit is CT2, and an axial distance between the front lens element and the rear lens element is Tab, the following condition can be satisfied: $1.80<0.1 \times CT2/Tab$. Therefore, it is favorable for ensuring a sufficient central thickness of the second lens unit, thereby enhancing the structural strengthen of the second lens unit while reducing the sensitivity of the image capturing lens assembly. Moreover, the following condition can also be satisfied: $2.00<0.1 \times CT2/Tab$. Moreover, the following condition can also be satisfied: $3.24 \leq 0.1 \times CT2/Tab \leq 65.72$.

When the focal length of the image capturing lens assembly is f, and a focal length of the first lens group is fG1, the following condition can be satisfied: $0.10<f/fG1<1.60$. Therefore, it is favorable for controlling the refractive power at the front portion of the image capturing lens assembly, thereby configuring the optical path to form a telephoto lens structure. Moreover, the following condition can also be satisfied: $0.10<f/fG1<1.40$.

When a curvature radius of the image-side surface of the first lens unit is R2, and a curvature radius of the image-side surface of the front lens element is Ra2, the following condition can be satisfied: $0.80<|R2/Ra2|<15.00$. Therefore, it is favorable for adjusting the lens shapes of the image-side surface of the first lens unit and the image-side surface of the front lens element, thereby improving convergence quality of imaging light. Moreover, the following condition can also be satisfied: $0.80<|R2/Ra2|<8.50$.

When a curvature radius of the image-side surface of the second lens unit is R4, a curvature radius of the image-side surface of the third lens unit is R6, and the focal length of the image capturing lens assembly is f, the following condition can be satisfied: $2.50<|R4|/f+|R6|/f$. Therefore, it is favorable for controlling the curvature radii of the image-side surface of the second lens unit and the image-side surface of the third lens unit, thereby correcting spherical aberration and coma and thus improving image quality. Moreover, the following condition can also be satisfied: $2.80<|R4|/f+|R6|/f$.

When an axial distance between the fifth lens unit and the sixth lens unit is T56, the axial distance between the object-side surface of the first lens unit and the image surface is TL, a central thickness of the sixth lens unit is CT6, and a maximum image height of the image capturing lens assembly (which can be half of a diagonal length of an effective photosensitive area of the image sensor) is ImgH, the following condition can be satisfied: $3.30<T56/CT6+TL/ImgH<10.50$. Therefore, it is favorable for reducing the back focal length and preventing an overly long total track length of the image capturing lens assembly.

When an Abbe number of the first lens unit is V1, an Abbe number of the second lens unit is V2, and an Abbe number of the front lens element is Va, the following condition can be satisfied: $1.00<(V1+V2)/Va<3.80$. Therefore, it is favorable for adjusting the material distribution of lens elements and correcting chromatic aberration generated by the image capturing lens assembly so as to prevent overlapped images, thereby improving image quality. Moreover, the following condition can also be satisfied: $1.95<(V1+V2)/Va<3.80$.

When a curvature radius of the object-side surface of the second lens unit is R3, and the curvature radius of the image-side surface of the front lens element is Ra2, the following condition can be satisfied: $0.60<|R3/Ra2|<20.00$. Therefore, the lens shapes of the object-side surface of the second lens unit and the image-side surface of the front lens element are favorable for controlling the travelling direction of peripheral optical path, thereby effectively converging light and increasing image brightness. Moreover, the following condition can also be satisfied: $0.80<|R3/Ra2|<15.00$.

When the focal length of the image capturing lens assembly is f, the composite focal length of the first lens unit and the second lens unit is f12, and the composite focal length of the second lens unit and the third lens unit is f23, the following condition can be satisfied: $0.00<f/f12+f/f23$. Therefore, it is favorable for adjusting the travelling direction of the optical path at the front portion of the image capturing lens assembly, thereby adjusting the viewing angle and correcting aberrations. Moreover, the following condition can also be satisfied: $0.05<f/f12+f/f23<3.50$.

Figure 38:
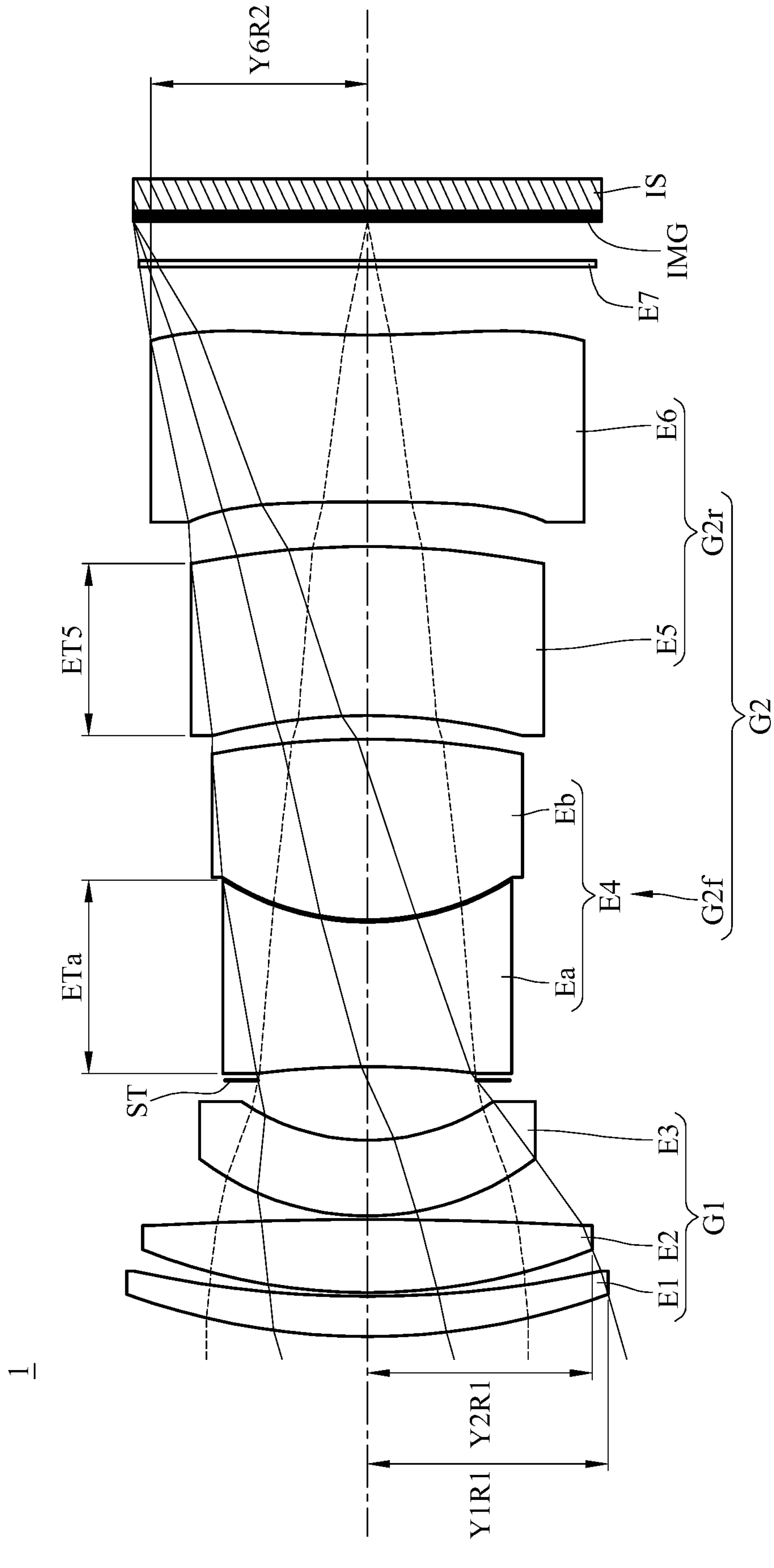
FIG. 38 shows a schematic view of ETa, ET5, Y1R1, Y2R1 and Y6R2 according to the 1st embodiment of the present disclosure.

When a distance in parallel with an optical axis between a maximum effective radius position of the object-side surface of the front lens element and a maximum effective radius position of the image-side surface of the front lens element is ETa, and a distance in parallel with the optical axis between a maximum effective radius position of the object-side surface of the fifth lens unit and a maximum effective radius position of the image-side surface of the fifth lens unit is ET5, the following condition can be satisfied: $0.80<ETa/ET5<3.50$. Therefore, it is favorable for collaborating with the central field of view, thereby effectively controlling the travelling direction of the peripheral optical path while correcting astigmatism and eliminating distortion. Moreover, the following condition can also be satisfied: $0.80<ETa/ET5<3.10$. Please refer to FIG. 38, which shows a schematic view of ETa and ET5 according to the 1st embodiment of the present disclosure.

When a maximum effective radius of the object-side surface of the first lens unit is Y1R1, and a maximum effective radius of the image-side surface of the sixth lens unit is Y6R2, the following condition can be satisfied: $0.50<Y6R2/Y1R1<1.60$. Therefore, it is favorable for setting the image size and reducing incident angle onto the image surface, thereby effectively increasing relative illuminance at the peripheral image. Please refer to FIG. 38, which shows a schematic view of Y1R1 and Y6R2 according to the 1st embodiment of the present disclosure.

When a maximum value of an absolute value of a distortion aberration on the image surface at various fields of view is |Dist|max, the following condition can be satisfied: $|Dist|max<5.00\%$. Therefore, it is favorable for adjusting the image capturing lens assembly at a low-distortion range, thereby effectively improving image quality. Moreover, the following condition can also be satisfied: $|Dist|max<3.50\%$.

When the axial distance of the first lens group is DG1, and an axial distance of the second lens group is DG2, the following condition can be satisfied: $0.20<DG1/DG2<0.65$. Therefore, it is favorable for adjusting the length ratio of lens units so as to obtain a proper balance between the overall field of view, the image height and the total track length of the image capturing lens assembly. Moreover, the following condition can also be satisfied: $0.20<DG1/DG2<0.60$. Please refer to FIG. 36, which shows a schematic view of DG1 and DG2 according to the 1st embodiment of the present disclosure. Please refer to FIG. 37, which shows a schematic view of DG1 and DG2 according to the 9th embodiment of the present disclosure.

When a curvature radius of the object-side surface of the first lens unit is R1, and the curvature radius of the image-side surface of the first lens unit is R2, the following condition can be satisfied: $0.25<|R1/R2|$. Therefore, it is favorable for adjusting the lens shape and the refractive power of the first lens unit so as to further adjust the initial travelling direction of the optical path for preventing excessive aberrations. Moreover, the following condition can also be satisfied: $0.45<|R1/R2|$.

When the maximum image height of the image capturing lens assembly is ImgH, an axial distance between the aperture stop and the image-side surface of the sixth lens unit is SD, and the axial distance between the object-side surface of the first lens unit and the image surface is TL, the following condition can be satisfied: $4.30<10\times(ImgH/SD+ImgH/TL)<8.90$. Therefore, it is favorable for utilizing the size of the image surface to auxiliary restrict the position of the aperture stop and the total track length of the image capturing lens assembly, thereby obtaining a proper balance between image brightness and the overall size.

When the focal length of the image capturing lens assembly is f, the focal length of the first lens group is fG1, and a focal length of the second lens group is fG2, the following condition can be satisfied: $0.25<|f/fG1|+|f/fG2|$. Therefore, it is favorable for ensuring sufficient refractive power of the image capturing lens assembly, thereby assisting in light convergence and reducing the total track length. Moreover, the following condition can also be satisfied: $0.40<|f/fG1|+|f/fG2|<2.65$.

When the axial distance between the front lens element and the rear lens element is Tab, the following condition can be satisfied: 0.001 millimeters$<Tab<$0.020 millimeters. Therefore, it is favorable for ensuring a proper interval maintained between the cemented surfaces of the two lens elements so as to prevent uneven distribution of adhesive to the periphery of lens elements and allow certain manufacturing tolerance for improving manufacturing yield.

When the focal length of the image capturing lens assembly is f, a focal length of the first lens unit is f1, and the focal length of the second lens unit is f2, the following condition can be satisfied: $-0.70<f/f1+f/f2<1.15$. Therefore, it is favorable for preventing overly strong refractive power at the front portion of the image capturing lens assembly, thereby collaborating with the space arrangement at the middle portion of the image capturing lens assembly for the adjustment performance and the aberration reduction. Moreover, the following condition can also be satisfied: $-0.60<f/f1+f/f2<1.00$.

When the curvature radius of the object-side surface of the first lens unit is R1, a curvature radius of the object-side surface of the fifth lens unit is R9, a curvature radius of the image-side surface of the sixth lens unit is R12, and the focal length of the image capturing lens assembly is f, the following condition can be satisfied: $|R1|/f+|R9|/f+|R12|/f<25.0$. Therefore, it is favorable for designing the lens shapes of the object-side surface of the first lens unit, the object-side surface of the fifth lens unit and the image-side surface of the sixth lens unit, thereby effectively correcting field curvature and spherical aberration. Moreover, the following condition can also be satisfied: $|R1|/f+|R9|/f+|R12|/f<20.0$.

When the curvature radius of the image-side surface of the front lens element is Ra2, a curvature radius of the object-side surface of the rear lens element is Rb1, and the focal length of the image capturing lens assembly is f, the following condition can be satisfied: $|Ra2|/f+|Rb1|/f<3.30$. Therefore, it is favorable for restricting the bending degrees of central curvature radii of the image-side surface of the front lens element and the object-side surface of the rear lens element, thereby correcting astigmatism of the image capturing lens assembly and reducing stray light inside the lens. Moreover, the following condition can also be satisfied: $0.45|Ra2|/f+|Rb1|/f<3.30$.

When an axial distance between the aperture stop and the object-side surface of the fifth lens unit is Dsr9, and an axial distance between the aperture stop and the image-side surface of the fifth lens unit is Dsr10, the following condition can be satisfied: $Dsr9/Dsr10<0.98$. Therefore, it is favorable for setting the position of the aperture stop so as to ensure a sufficient amount of incident light into the image capturing lens assembly for increasing image illuminance.

When the maximum image height of the image capturing lens assembly is ImgH, the maximum effective radius of the object-side surface of the first lens unit is Y1R1, and a maximum effective radius of the object-side surface of the second lens unit is Y2R1, the following condition can be satisfied: $0.65<2\times ImgH/(Y1R1+Y2R1)<2.00$. Therefore, it is favorable for designing the optical effective radii of the first lens unit and the second lens unit, thereby enlarging the image surface and improving image quality. Moreover, the following condition can also be satisfied: $0.65<2\times ImgH/(Y1R1+Y2R1)<1.70$. Please refer to FIG. 38, which shows a schematic view of Y2R1 according to the 1st embodiment of the present disclosure.

According to the present disclosure, the aforementioned features and conditions can be utilized in numerous combinations so as to achieve corresponding effects.

According to the present disclosure, the lens elements of the image capturing lens assembly can be made of either glass or plastic material. When the lens elements are made of glass material, the refractive power distribution of the image capturing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image capturing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the image capturing lens assembly, based on the corresponding image sensor, can be flat or curved, especially a curved surface being concave facing towards the object side of the image capturing lens assembly.

According to the present disclosure, an image correction unit, such as a field flattener, can be optionally disposed between the lens element closest to the image side of the image capturing lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 39:
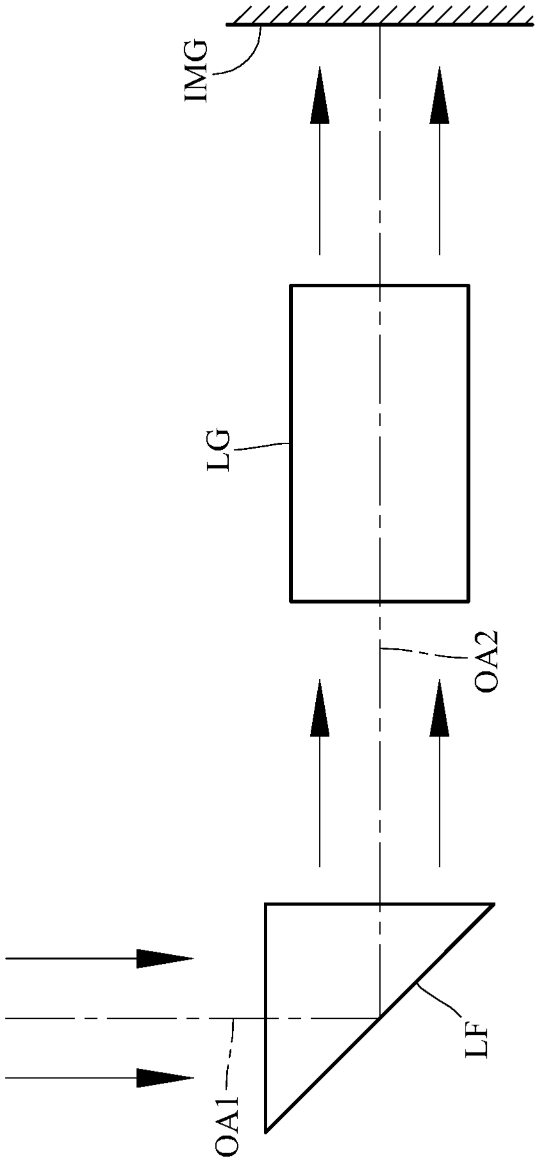
FIG. 39 shows a schematic view of a configuration of a light-folding element in an image capturing lens assembly according to one embodiment of the present disclosure.
Figure 40:
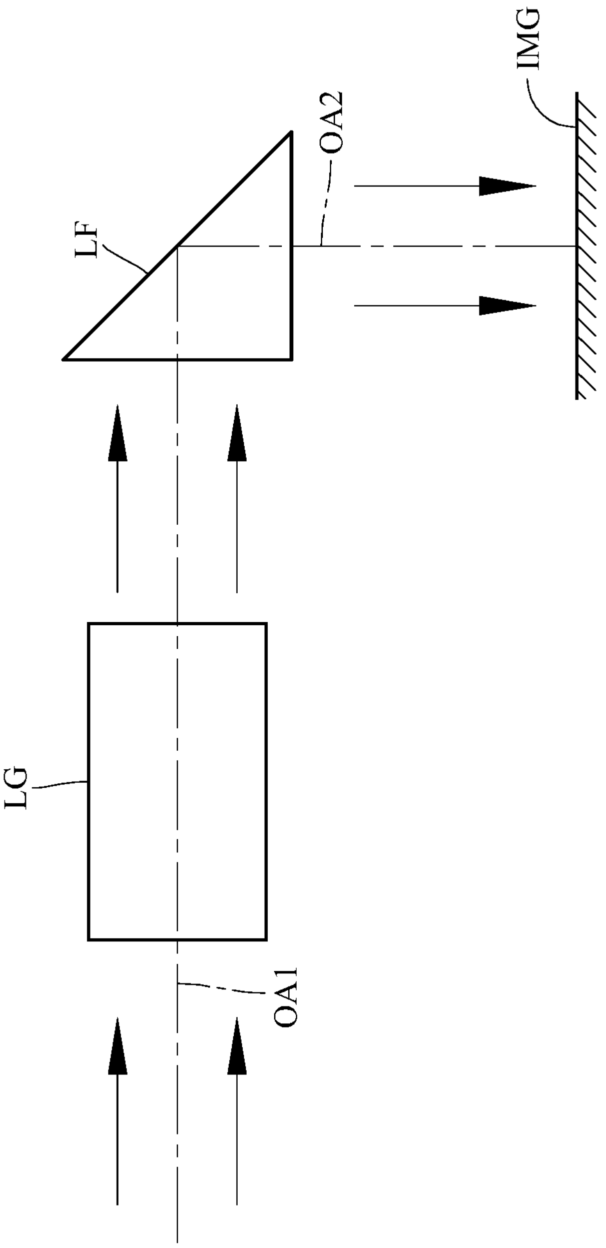
FIG. 40 shows a schematic view of another configuration of a light-folding element in an image capturing lens assembly according to one embodiment of the present disclosure.

According to the present disclosure, at least one light-folding element, such as a prism or a mirror which can have a surface being planar, spherical, aspheric or in free-form, can be optionally disposed between an imaged object and the image surface on the imaging optical path, such that the image capturing lens assembly can be more flexible in space arrangement, and therefore the dimensions of an electronic device is not restricted by the total track length of the image capturing lens assembly. Specifically, please refer to FIG. 39 and FIG. 40. FIG. 39 shows a schematic view of a configuration of a light-folding element in an image capturing lens assembly according to one embodiment of the present disclosure, and FIG. 40 shows a schematic view of another configuration of a light-folding element in an image capturing lens assembly according to one embodiment of the present disclosure. In FIG. 39 and FIG. 40, the image capturing lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the image capturing lens assembly as shown in FIG. 39 or disposed between a lens group LG of the image capturing lens assembly and the image surface IMG as shown in FIG. 40. Furthermore, please refer to FIG.

Figure 41:
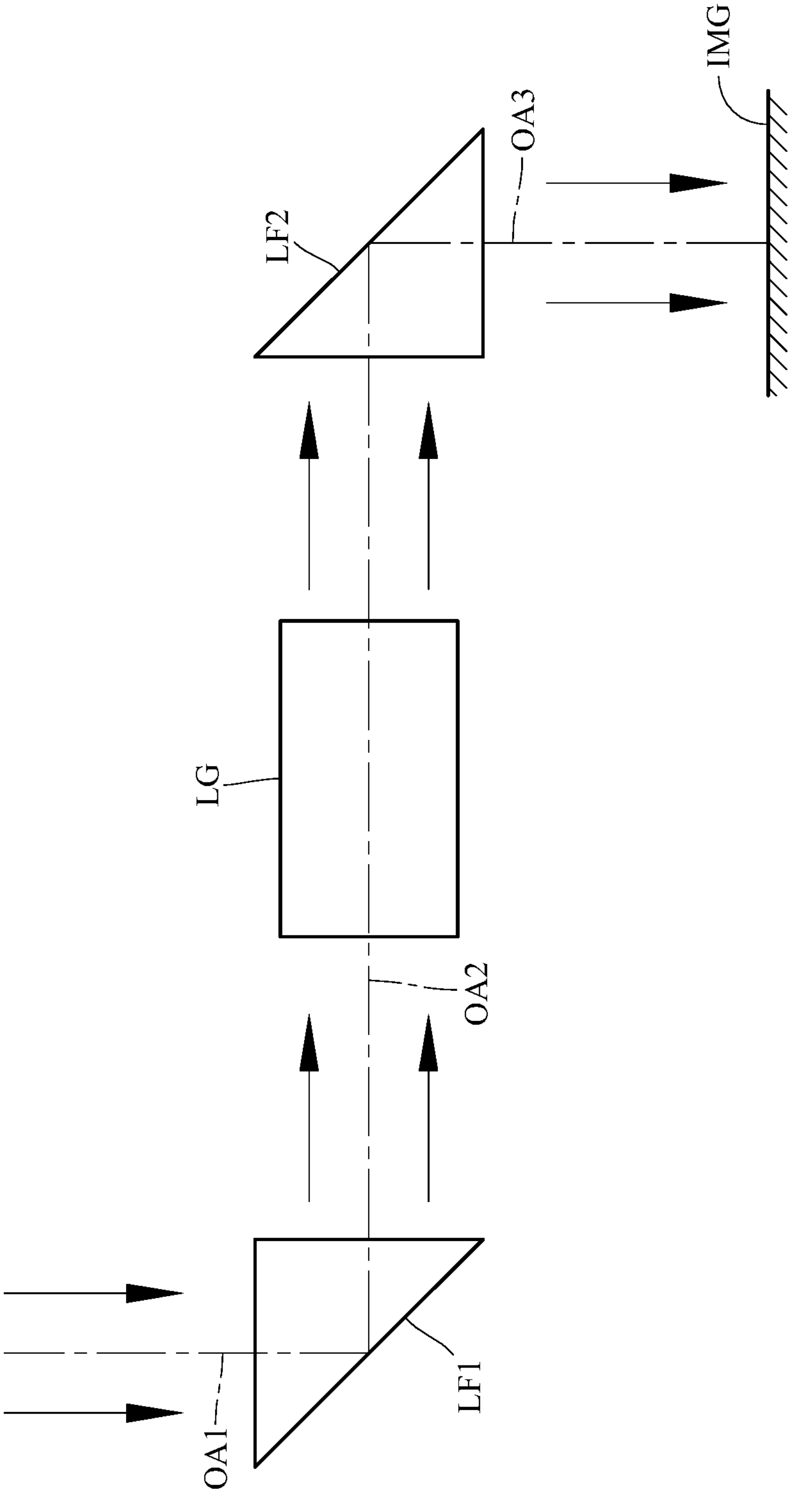
FIG. 41 shows a schematic view of a configuration of two light-folding elements in an image capturing lens assembly according to one embodiment of the present disclosure.

41, which shows a schematic view of a configuration of two light-folding elements in an image capturing lens assembly according to one embodiment of the present disclosure. In FIG. 41, the image capturing lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the image capturing lens assembly, the second light-folding element LF2 is disposed between the lens group LG of the image capturing lens assembly and the image surface IMG, and the travelling direction of light on the first optical axis OA1 can be the same direction as the travelling direction of light on the third optical axis OA3 as shown in FIG. 41. The image capturing lens assembly can be optionally provided with three or more light-folding elements, and the present disclosure is not limited to the type, amount and position of the light-folding elements of the embodiments disclosed in the aforementioned figures.

According to the present disclosure, the image capturing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens unit can provide a longer distance between an exit pupil of the image capturing lens assembly and the image surface to produce a telecentric effect, and thereby improves the image-sensing efficiency of an image sensor (for example, CCD or CMOS). A middle stop disposed between the first lens unit and the image surface is favorable for enlarging the viewing angle of the image capturing lens assembly and thereby provides a wider field of view for the same.

According to the present disclosure, the image capturing lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the image capturing lens assembly can include one or more optical elements for limiting the form of light passing through the image capturing lens assembly. Each optical element can be, but not limited to, a filter, a polarizer, etc., and each optical element can be, but not limited to, a single-piece element, a composite component, a thin film, etc. The optical element can be located at the object side or the image side of the image capturing lens assembly or between any two adjacent lens elements so as to allow light in a specific form to pass through, thereby meeting application requirements.

According to the present disclosure, the image capturing lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and the image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
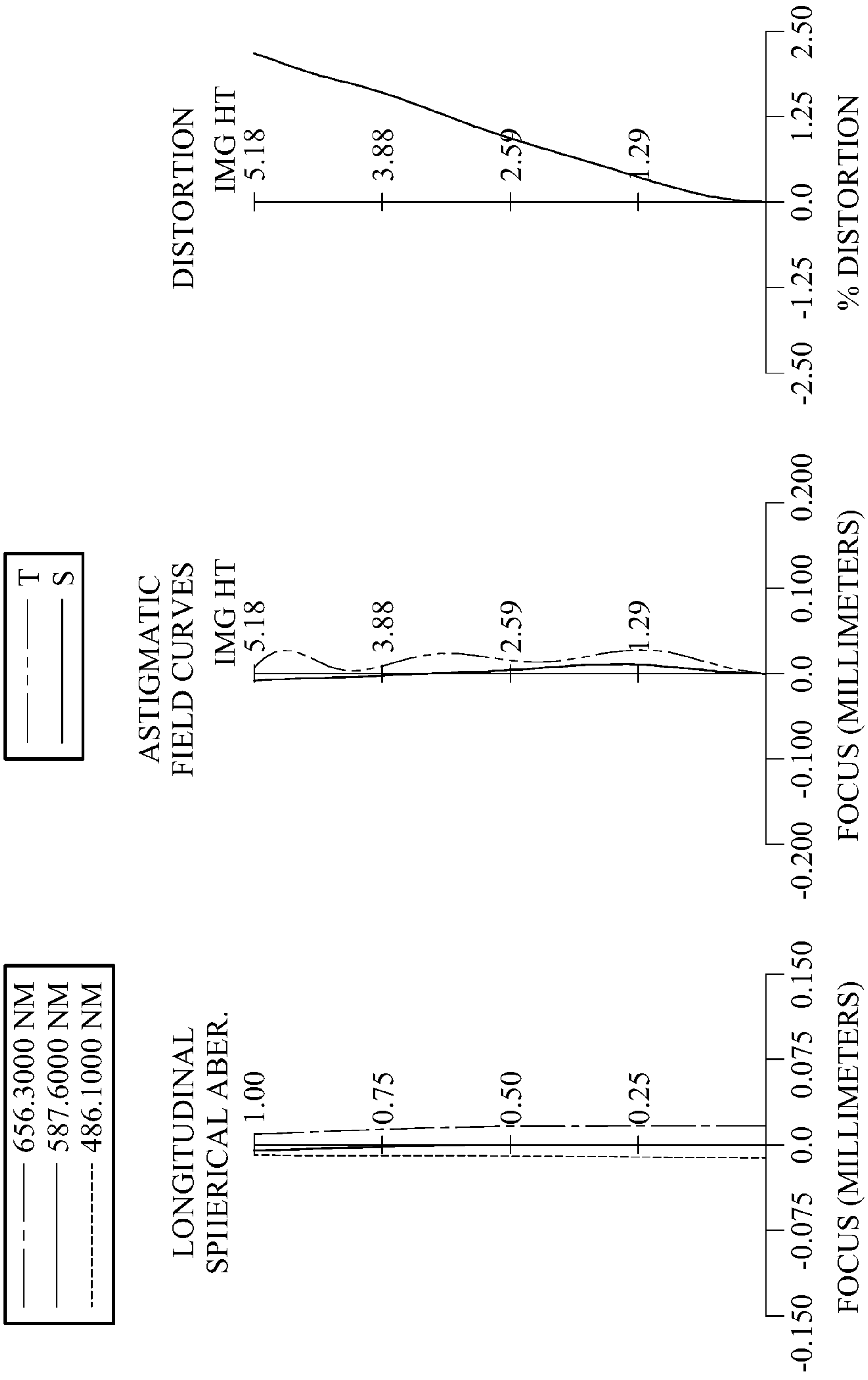
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the image capturing lens assembly (its reference numeral is omitted) of the present disclosure and an image sensor IS. The image capturing lens assembly includes, in order from an object side to an image side along an optical axis, a first lens unit E1, a second lens unit E2, a third lens unit E3, an aperture stop ST, a fourth lens unit E4, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with positive refractive power has an object-side surface being convex in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being convex in a paraxial region thereof. The second lens unit E2 is made of glass material and has the object-side surface and the image-side surface being both spherical.

The third lens unit E3 with negative refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with negative refractive power has an object-side surface being concave in a paraxial region thereof and an image-side surface being convex in a paraxial region thereof. The fifth lens unit E5 is made of glass material and has the object-side surface and the image-side surface being both spherical.

The sixth lens unit E6 with negative refractive power has an object-side surface being concave in a paraxial region thereof and an image-side surface being concave in a paraxial region thereof. The sixth lens unit E6 is made of plastic material and has the object-side surface and the image-side surface being both aspheric.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

- X is the displacement in parallel with an optical axis from an axial vertex on the aspheric surface to a point at a distance of Y from the optical axis on the aspheric surface;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14, 16, 18 and 20.

In the image capturing lens assembly of the image capturing unit according to the 1st embodiment, when a focal length of the image capturing lens assembly is f, an f-number of the image capturing lens assembly is Fno, and half of a maximum field of view of the image capturing lens assembly is HFOV, these parameters have the following values: f=17.78 millimeters (mm), Fno=2.50, HFOV=15.9 degrees (deg.).

When the maximum field of view of the image capturing lens assembly is FOV, the following condition is satisfied: FOV=31.8 degrees.

When an axial distance between the image-side surface of the front lens element Ea and the object-side surface of the fifth lens unit E5 is Dra2r9, and a central thickness of the fifth lens unit E5 is CT5, the following condition is satisfied:

$$Dra2r9/CT5 = 1.22.$$

When an axial distance of the first lens group G1 is DG1, and an axial distance of the front lens group G2f is DG2f, the following condition is satisfied: DG1/DG2f=0.60. In this embodiment, DG1 can also be considered as an axial distance between the object-side surface of the first lens unit E1 and the image-side surface of the third lens unit E3. In this embodiment, DG2f can also be considered as an axial distance of the fourth lens unit E4.

When an axial distance between the object-side surface of the first lens unit E1 and the image surface IMG is TL, and an entrance pupil diameter of the image capturing lens assembly is EPD, the following condition is satisfied: TL/EPD=3.47.

When the focal length of the image capturing lens assembly is f, a composite focal length of the first lens unit E1 and the second lens unit E2 is f12, a composite focal length of the second lens unit E2 and the third lens unit E3 is f23, and a focal length of the front lens group G2f is fG2f, the following condition is satisfied: $f/f23-|f/f12|+f/fG2f=0.50$. In this embodiment, fG2f can also be considered as a focal length of the fourth lens unit E4.

When an axial distance between the first lens unit E1 and the second lens unit E2 is T12, and a central thickness of the front lens element Ea is CTa, the following condition is satisfied: $10\times T12/CTa=0.25$. In this embodiment, an axial distance between two adjacent lens elements (two adjacent lens units) is a distance in a paraxial region between two adjacent lens surfaces of the two adjacent lens elements (two adjacent lens units).

When the focal length of the image capturing lens assembly is f, and a focal length of the first lens group G1 is fG1, the following condition is satisfied: f/fG1=1.02.

When a curvature radius of the image-side surface of the first lens unit E1 is R2, and a curvature radius of the image-side surface of the front lens element Ea is Ra2, the following condition is satisfied: $|R2/Ra2|=4.05$.

When a curvature radius of the image-side surface of the second lens unit E2 is R4, a curvature radius of the image-side surface of the third lens unit E3 is R6, and the focal length of the image capturing lens assembly is f, the following condition is satisfied: $|R4|/f+|R6|/f=5.17$.

When an axial distance between the fifth lens unit E5 and the sixth lens unit E6 is T56, the axial distance between the object-side surface of the first lens unit E1 and the image surface IMG is TL, a central thickness of the sixth lens unit E6 is CT6, and a maximum image height of the image capturing lens assembly is ImgH, the following condition is satisfied: T56/CT6+TL/ImgH=5.03.

When an Abbe number of the first lens unit E1 is V1, an Abbe number of the second lens unit E2 is V2, and an Abbe number of the front lens element Ea is Va, the following condition is satisfied: (V1+V2)/Va=3.29.

When a curvature radius of the object-side surface of the second lens unit E2 is R3, and the curvature radius of the image-side surface of the front lens element Ea is Ra2, the following condition is satisfied: |R3/Ra2|=2.24.

When the focal length of the image capturing lens assembly is f, the composite focal length of the first lens unit E1 and the second lens unit E2 is f12, and the composite focal length of the second lens unit E2 and the third lens unit E3 is f23, the following condition is satisfied: f/f12+f/f23=1.72.

When a distance in parallel with the optical axis between a maximum effective radius position of the object-side surface of the front lens element Ea and a maximum effective radius position of the image-side surface of the front lens element Ea is ETa, and a distance in parallel with the optical axis between a maximum effective radius position of the object-side surface of the fifth lens unit E5 and a maximum effective radius position of the image-side surface of the fifth lens unit E5 is ET5, the following condition is satisfied: ETa/ET5=1.13.

When a maximum effective radius of the object-side surface of the first lens unit E1 is Y1R1, and a maximum effective radius of the image-side surface of the sixth lens unit E6 is Y6R2, the following condition is satisfied: Y6R2/Y1R1=0.90.

When a maximum value of an absolute value of a distortion aberration on the image surface IMG at various fields of view is |Dist|max, the following condition is satisfied: |Dist|max=2.17%.

When a curvature radius of a most-object-side surface of the fourth lens unit E4 is RU4f, and a curvature radius of a most-image-side surface of the fourth lens unit E4 is RU4r, the following condition is satisfied: RU4f/RU4r=1.07. In this embodiment, the most-object-side surface of the fourth lens unit E4 is the object-side surface of the front lens element Ea, and the most-image-side surface of the fourth lens unit E4 is the image-side surface of the rear lens element Eb.

When a focal length of the second lens unit E2 is f2, a focal length of the third lens unit E3 is f3, and a focal length of the fifth lens unit E5 is f5, the following condition is satisfied: |f3+f5|/|f2|=6.81.

When the axial distance of the first lens group G1 is DG1, and an axial distance of the second lens group G2 is DG2, the following condition is satisfied: DG1/DG2=0.27. In this embodiment, DG2 can also be considered as an axial distance between the object-side surface of the front lens element Ea and the image-side surface of the sixth lens unit E6.

When a curvature radius of the object-side surface of the first lens unit E1 is R1, and the curvature radius of the image-side surface of the first lens unit E1 is R2, the following condition is satisfied: |R1/R2|=0.65.

When the maximum image height of the image capturing lens assembly is ImgH, an axial distance between the aperture stop ST and the image-side surface of the sixth lens unit E6 is SD, and the axial distance between the object-side surface of the first lens unit E1 and the image surface IMG is TL, the following condition is satisfied: 10×(ImgH/SD+ImgH/TL)=5.2.

When the focal length of the image capturing lens assembly is f, the focal length of the first lens group G1 is fG1, and a focal length of the second lens group G2 is fG2, the following condition is satisfied: |f/fG1|+|f/fG2|=1.10.

When an axial distance between the front lens element Ea and the rear lens element Eb is Tab, the following condition is satisfied: Tab=0.050 mm. In this embodiment, Tab can also be considered as an axial distance between cemented surfaces of the fourth lens unit E4.

When an axial distance between the object-side surface of the front lens element Ea and the object-side surface of the fifth lens unit E5 is Dra1r9, and a central thickness of the first lens unit E1 is CT1, the following condition is satisfied:

$$Dra1r9/CT1 = 8.72.$$

When a central thickness of the second lens unit E2 is CT2, and the axial distance between the front lens element Ea and the rear lens element Eb is Tab, the following condition is satisfied: 0.1×CT2/Tab=3.24.

When the focal length of the image capturing lens assembly is f, a focal length of the first lens unit E1 is f1, and the focal length of the second lens unit E2 is f2, the following condition is satisfied: f/f1+f/f2=1.05.

When the curvature radius of the object-side surface of the first lens unit E1 is R1, a curvature radius of the object-side surface of the fifth lens unit E5 is R9, a curvature radius of the image-side surface of the sixth lens unit E6 is R12, and the focal length of the image capturing lens assembly is f, the following condition is satisfied: |R1|/f+|R9|/f+|R12|/f=3.06.

When the curvature radius of the image-side surface of the front lens element Ea is Ra2, a curvature radius of the object-side surface of the rear lens element Eb is Rb1, and the focal length of the image capturing lens assembly is f, the following condition is satisfied: |Ra2|/f+|Rb1|/f=0.67.

When an axial distance between the aperture stop ST and the object-side surface of the fifth lens unit E5 is Dsr9, and an axial distance between the aperture stop ST and the image-side surface of the fifth lens unit E5 is Dsr10, the following condition is satisfied: Dsr9/Dsr10=0.68.

When the maximum image height of the image capturing lens assembly is ImgH, the maximum effective radius of the object-side surface of the first lens unit E1 is Y1R1, and a maximum effective radius of the object-side surface of the second lens unit E2 is Y2R1, the following condition is satisfied: 2×ImgH/(Y1R1+Y2R1)=1.01.

The detailed optical data of the 1st embodiment are shown in Table 1A and the aspheric surface data are shown in Table 1B below.

TABLE 1A

1st Embodiment
f = 17.78 mm, Fno = 2.50, HFOV = 15.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens unit 1 | 15.5886 (SPH) | 0.890 | Glass | 1.729 | 54.7 | 57.83 |
| 2 | | 24.1358 (SPH) | 0.080 | | | | |

TABLE 1A-continued

| 1st Embodiment f = 17.78 mm, Fno = 2.50, HFOV = 15.9 deg. | | | | | | | |
|---|---|---|---|---|---|---|---|
| Surface # | | Curvature Radius | Thickness | Material | Index | Abbe # | Focal Length |
| 3 | Lens unit 2 | 13.3684 (SPH) | 1.620 | Glass | 1.487 | 70.4 | 23.89 |
| 4 | | −86.9136 (SPH) | 0.080 | | | | |
| 5 | Lens unit 3 | 6.0836 (SPH) | 1.673 | Glass | 1.729 | 54.7 | −102.83 |
| 6 | | 4.9745 (SPH) | 1.326 | | | | |
| 7 | Ape. Stop | Plano | 0.304 | | | | |
| 8 | Front lens of Lens unit 4 | −19.4890 (SPH) | 3.193 | Glass | 1.603 | 38.0 | −7.22 |
| 9 | | 5.9552 (SPH) | 0.050 | Cemented | 1.550 | 43.9 | — |
| 10 | Rear lens of Lens unit 4 | 5.9552 (SPH) | 4.000 | Glass | 1.788 | 47.5 | 6.14 |
| 11 | | −18.2032 (SPH) | 0.519 | | | | |
| 12 | Lens unit 5 | −13.5547 (SPH) | 3.741 | Glass | 1.946 | 17.9 | −59.96 |
| 13 | | −20.2012 (SPH) | 0.986 | | | | |
| 14 | Lens unit 6 | −122.1033 (ASP) | 3.692 | Plastic | 1.639 | 23.5 | −32.42 |
| 15 | | 25.2467 (ASP) | 1.500 | | | | |
| 16 | Filter | Plano | 0.150 | Glass | 1.517 | 64.2 | — |
| 17 | | Plano | 0.858 | | | | |
| 18 | Image | Plano | — | | | | |

Note:
Reference wavelength is 587.6 nm (d-line).

TABLE 1B

| Aspheric Coefficients | | |
|---|---|---|
| Surface # | 14 | 15 |
| k= | −7.6054900E+01 | 3.7122900E+00 |
| A4= | −2.0129186E−03 | −1.3217899E−03 |
| A6= | 4.1325712E−04 | 1.4114148E−04 |
| A8= | −1.4528117E−04 | −4.2950884E−05 |
| A10= | 3.0180960E−05 | 7.0296086E−06 |
| A12= | −3.9327631E−06 | −6.7965162E−07 |
| A14= | 3.2319378E−07 | 3.9936376E−08 |
| A16= | −1.6286437E−08 | −1.4013510E−09 |
| A18= | 4.5944467E−10 | 2.7001457E−11 |
| A20= | −5.5535667E−12 | −2.1980451E−13 |

In Table 1A, the curvature radius, the thickness and the focal length are shown in millimeters (mm). Surface numbers 0-18 represent the surfaces sequentially arranged from the object side to the image side along the optical axis. In Table 1B, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
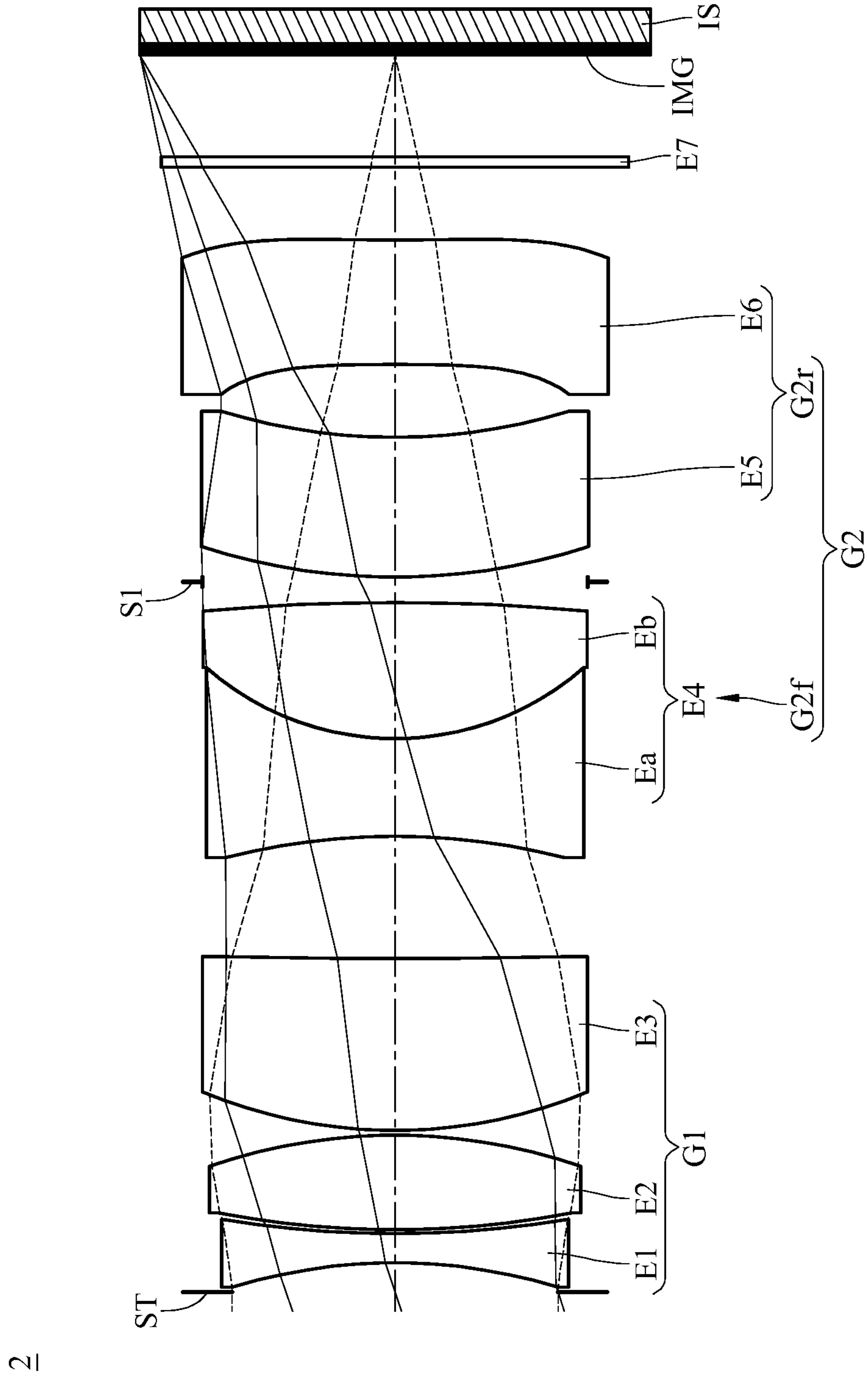
FIG. 3 is a schematic view of an image capturing unit according to the 2nd embodiment of the present disclosure.
Figure 4:
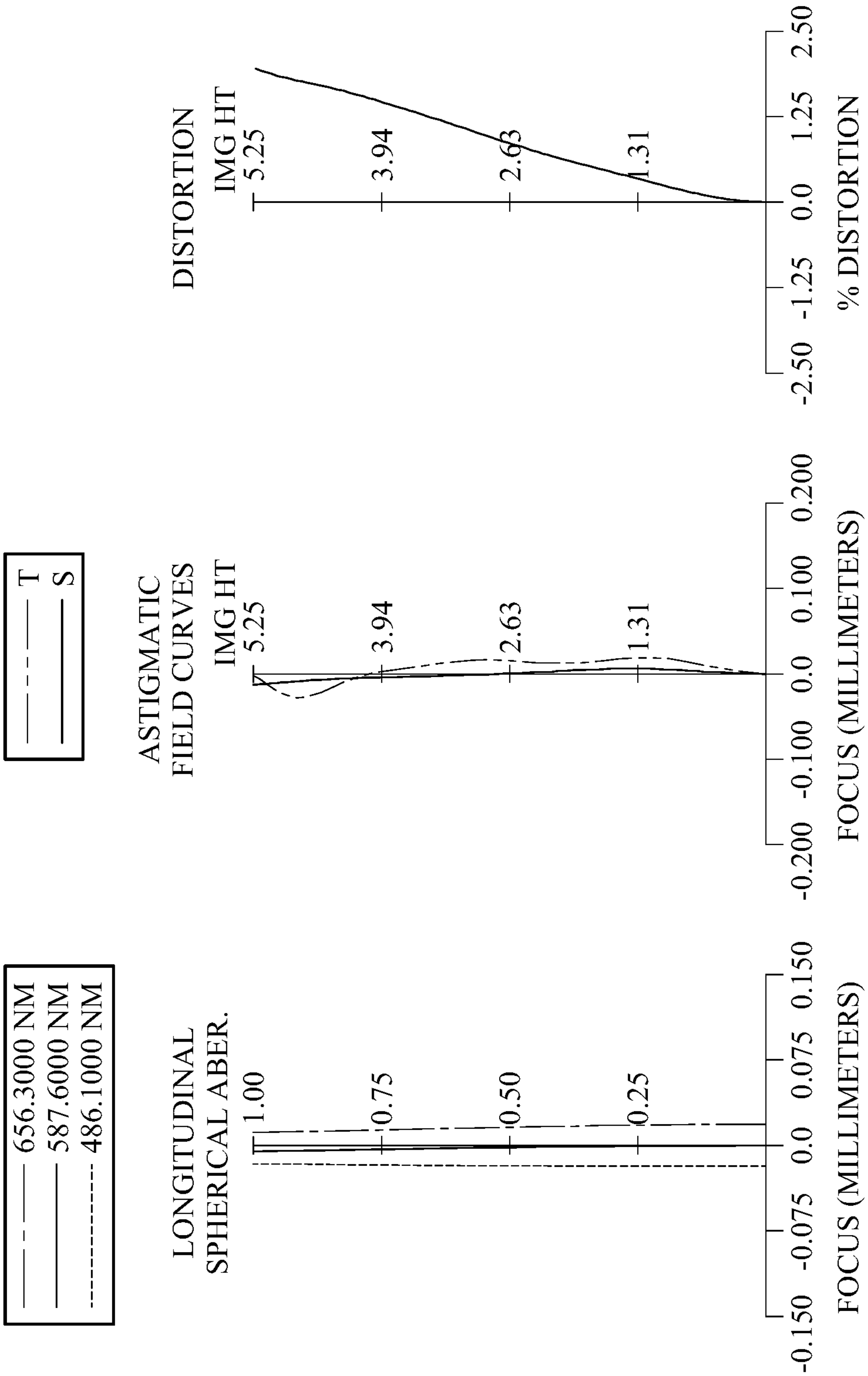
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the image capturing lens assembly (its reference numeral is omitted) of the present disclosure and an image sensor IS. The image capturing lens assembly includes, in order from an object side to an image side along an optical axis, an aperture stop ST, a first lens unit E1, a second lens unit E2, a third lens unit E3, a fourth lens unit E4, a stop S1, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with negative refractive power has an object-side surface being concave in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being convex in a paraxial region thereof. The second lens unit E2 is made of glass material and has the object-side surface and the image-side surface being both spherical.

The third lens unit E3 with positive refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being concave in a paraxial region thereof. The fifth lens unit E5 is made of glass material and has the object-side surface and the image-side surface being both spherical.

The sixth lens unit E6 with negative refractive power has an object-side surface being concave in a paraxial region thereof and an image-side surface being concave in a paraxial region thereof. The sixth lens unit E6 is made of plastic material and has the object-side surface and the image-side surface being both aspheric. The image-side surface of the sixth lens unit E6 has one inflection point.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 2nd embodiment are shown in Table 2A and the aspheric surface data are shown in Table 2B below.

TABLE 2A

| 2nd Embodiment<br>f = 15.41 mm, Fno = 2.30, HFOV = 18.5 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | 0.600 | | | | |
| 2 | Lens unit 1 | −11.4516 (SPH) | 0.600 | Glass | 1.883 | 39.2 | −8.41 |
| 3 | | 21.6421 (SPH) | 0.080 | | | | |
| 4 | Lens unit 2 | 19.4241 (SPH) | 1.945 | Glass | 1.729 | 54.7 | 10.30 |
| 5 | | −11.7207 (SPH) | 0.100 | | | | |
| 6 | Lens unit 3 | 10.2635 (SPH) | 3.535 | Glass | 1.834 | 37.2 | 12.91 |
| 7 | | 184.4970 (SPH) | 2.515 | | | | |
| 8 | Front lens of Lens unit 4 | −14.0482 (SPH) | 2.010 | Glass | 1.648 | 33.8 | −6.17 |
| 9 | | 5.8986 (SPH) | 0.003 | Cemented | 1.550 | 43.9 | — |
| 10 | Rear lens of Lens unit 4 | 5.8986 (SPH) | 2.800 | Glass | 1.729 | 54.7 | 7.32 |
| 11 | | −44.6023 (SPH) | 0.422 | | | | |
| 12 | Stop | Plano | 0.100 | | | | |
| 13 | Lens unit 5 | 12.8184 (SPH) | 2.878 | Glass | 1.946 | 17.9 | 227.84 |
| 14 | | 12.1415 (SPH) | 1.498 | | | | |
| 15 | Lens unit 6 | −67.7816 (ASP) | 2.562 | Plastic | 1.697 | 16.3 | −43.60 |
| 16 | | 55.9677 (ASP) | 1.500 | | | | |
| 17 | Filter | Plano | 0.210 | Glass | 1.517 | 64.2 | — |
| 18 | | Plano | 2.101 | | | | |
| 19 | Image | Plano | — | | | | |

Note:
Reference wavelength is 587.6 nm (d-line).
An effective radius of the stop S1 (Surface 12) is 3.962 mm.

TABLE 2B

| Aspheric Coefficients | | |
|---|---|---|
| Surface # | 15 | 16 |
| k= | −8.4214300E+01 | 2.4548300E+01 |
| A4= | −2.6136155E−03 | −1.2720831E−03 |
| A6= | 4.9471398E−05 | −1.1823514E−04 |
| A8= | −2.3184811E−05 | 3.3529132E−05 |
| A10= | 1.8003296E−06 | −6.1683883E−06 |
| A12= | 3.3114734E−07 | 7.3413127E−07 |
| A14= | −9.5458529E−08 | −5.5279307E−08 |
| A16= | 9.6020352E−09 | 2.5274002E−09 |
| A18= | −4.5544057E−10 | −6.3794187E−11 |
| A20= | 8.5320601E−12 | 6.8073016E−13 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Schematic Parameters | | | |
|---|---|---|---|
| f [mm] | 15.41 | Y6R2/Y1R1 | 1.30 |
| Fno | 2.30 | \|Dist\|max [%] | 1.97 |
| HFOV [deg.] | 18.5 | RU4f/RU4r | 0.31 |
| FOV [deg.] | 37.0 | \|f3 + f5\|/\|f2\| | 23.38 |

TABLE 2C-continued

| Schematic Parameters | | | |
|---|---|---|---|
| Dra2r9/CT5 | 1.16 | DG1/DG2 | 0.51 |

TABLE 2C-continued

| Schematic Parameters | | | |
|---|---|---|---|
| DG1/DG2f | 1.30 | \|R1/R2\| | 0.53 |
| TL/EPD | 3.71 | 10 × (ImgH/SD + ImgH/TL) | 4.5 |
| f/f23 − \|f/f12\| + f/fG2f | 2.28 | \|f/fG1\| + \|f/fG2\| | 1.71 |
| 10 × T12/CTa | 0.40 | Tab [mm] | 0.003 |
| f/fG1 | 1.19 | Dra1r9/CT1 | 8.89 |
| \|R2/Ra2\| | 3.67 | 0.1 × CT2/Tab | 64.83 |
| \|R4\|/f + \|R6\|/f | 12.73 | f/f1 + f/f2 | −0.34 |
| T56/CT6 + TL/ImgH | 5.32 | \|R1\|/f + \|R9\|/f + \|R12\|/f | 5.21 |
| (V1 + V2)/Va | 2.77 | \|Ra2\|/f + \|Rb1\|/f | 0.77 |
| \|R3/Ra2\| | 3.29 | Dsr9/Dsr10 | 0.84 |
| f/f12 + f/f23 | 2.49 | 2 × ImgH/(Y1R1 + Y2R1) | 1.44 |
| ETa/ET5 | 1.51 | — | — |

3rd Embodiment

Figure 5:
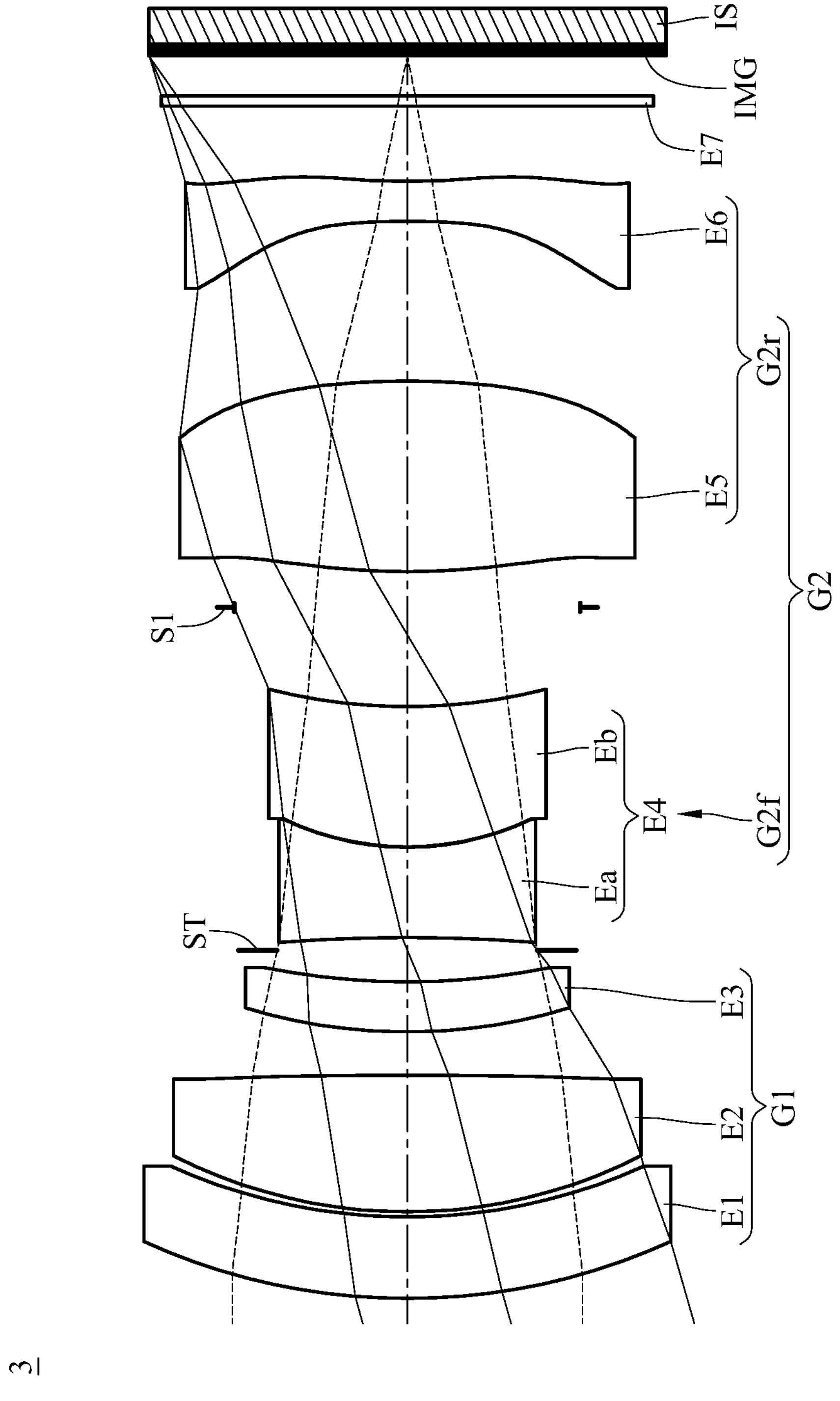
FIG. 5 is a schematic view of an image capturing unit according to the 3rd embodiment of the present disclosure.
Figure 6:
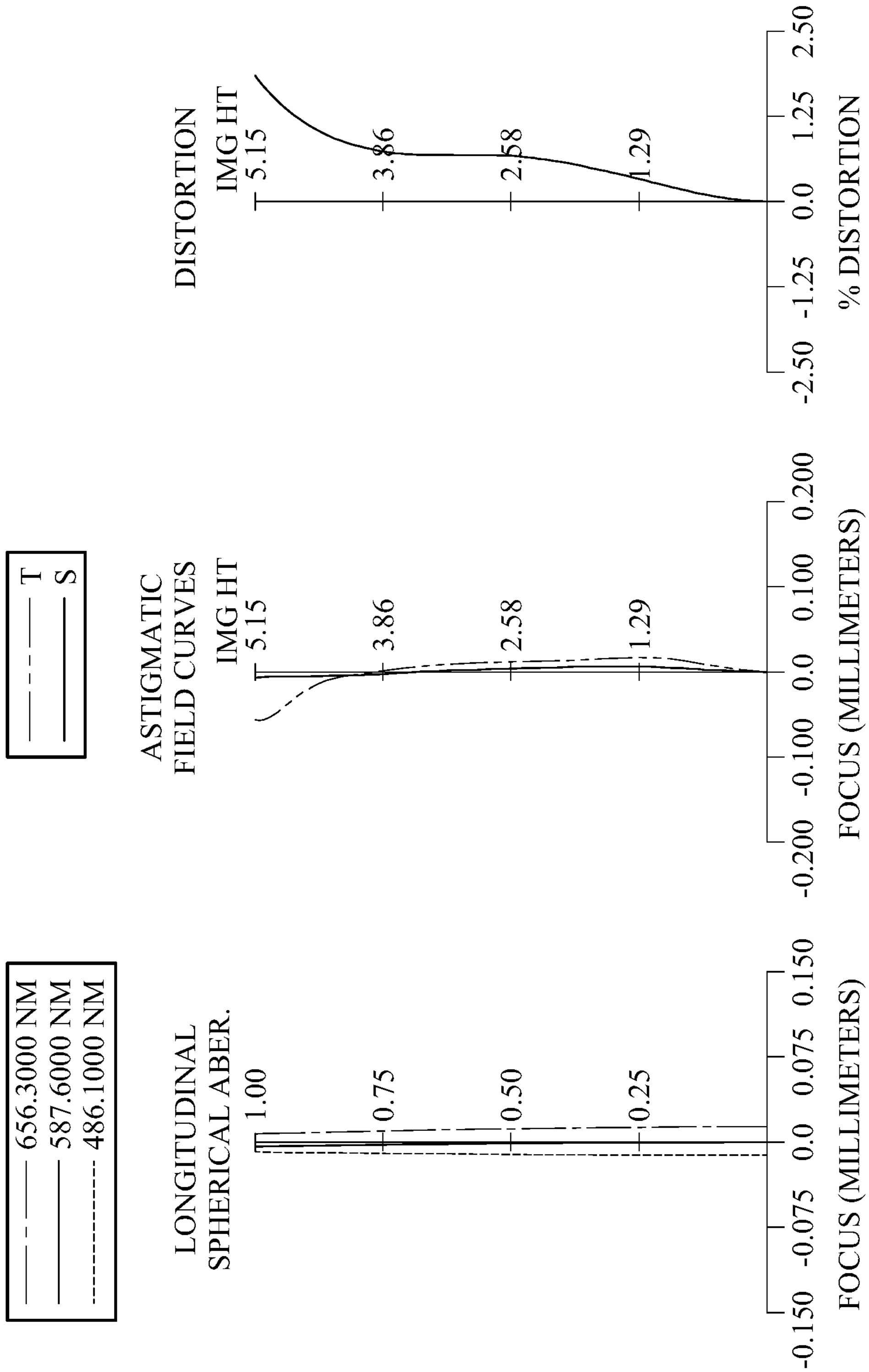
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the image capturing lens assembly (its reference numeral is omitted) of the present disclosure and an image sensor IS. The image capturing lens assembly includes, in order from an object side to an image side along an optical axis, a first lens unit E1, a second lens unit E2, a third lens unit E3, an aperture stop ST, a fourth lens unit E4, a stop S1, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with negative refractive power has an object-side surface being convex in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being convex in a paraxial region thereof. The second lens unit E2 is made of glass material and has the object-side surface and the image-side surface being both spherical.

The third lens unit E3 with positive refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being concave in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being convex in a paraxial region thereof. The fifth lens unit E5 is made of glass material and has the object-side surface and the image-side surface being both aspheric. The object-side surface of the fifth lens unit E5 has one inflection point.

The sixth lens unit E6 with negative refractive power has an object-side surface being concave in a paraxial region thereof and an image-side surface being concave in a paraxial region thereof. The sixth lens unit E6 is made of glass material and has the object-side surface and the image-side surface being both aspheric. The object-side surface of the sixth lens unit E6 has one inflection point. The image-side surface of the sixth lens unit E6 has two inflection points.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 3rd embodiment are shown in Table 3A and the aspheric surface data are shown in Table 3B below.

TABLE 3A

| 3rd Embodiment<br>f = 17.47 mm, Fno = 2.50, HFOV = 16.1 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens unit 1 | 12.7298 (SPH) | 1.628 | Glass | 1.673 | 32.2 | −385.95 |
| 2 | | 11.5107 (SPH) | 0.100 | | | | |
| 3 | Lens unit 2 | 10.2885 (SPH) | 2.732 | Glass | 1.487 | 70.4 | 19.29 |
| 4 | | −100.0000 (SPH) | 0.861 | | | | |

TABLE 3A-continued

| 3rd Embodiment f = 17.47 mm, Fno = 2.50, HFOV = 16.1 deg. | | | | | | | |
|---|---|---|---|---|---|---|---|
| Surface # | | Curvature Radius | Thickness | Material | Index | Abbe # | Focal Length |
| 5 | Lens unit 3 | 11.1804 (SPH) | 0.997 | Glass | 1.804 | 46.6 | 52.84 |
| 6 | | 14.5711 (SPH) | 0.633 | | | | |
| 7 | Ape. Stop | Plano | 0.253 | | | | |
| 8 | Front lens of Lens unit 4 | −32.9026 (SPH) | 1.800 | Glass | 1.640 | 34.5 | −7.51 |
| 9 | | 5.7465 (SPH) | 0.010 | Cemented | 1.550 | 43.9 | — |
| 10 | Rear lens of Lens unit 4 | 5.7465 (SPH) | 2.800 | Glass | 1.729 | 54.7 | 13.23 |
| 11 | | 11.2954 (SPH) | 1.982 | | | | |
| 12 | Stop | Plano | 0.711 | | | | |
| 13 | Lens unit 5 | 14.2159 (ASP) | 3.800 | Glass | 1.772 | 49.6 | 10.64 |
| 14 | | −17.2090 (ASP) | 3.187 | | | | |
| 15 | Lens unit 6 | −26.8387 (ASP) | 0.800 | Glass | 1.575 | 41.5 | −13.23 |
| 16 | | 10.7373 (ASP) | 1.500 | | | | |
| 17 | Filter | Plano | 0.210 | Glass | 1.517 | 64.2 | — |
| 18 | | Plano | 0.798 | | | | |
| 19 | Image | Plano | — | | | | |

Note:
Reference wavelength is 587.6 nm (d-line).
An effective radius of the stop S1 (Surface 12) is 3.450 mm.

TABLE 3B

| Aspheric Coefficients | | | | |
|---|---|---|---|---|
| Surface # | 13 | 14 | 15 | 16 |
| k= | −7.9565600E+00 | 1.0251600E+01 | 2.4000500E+01 | −1.6680100E+01 |
| A4= | −2.1024220E−04 | −4.3812213E−04 | −9.4784302E−03 | −7.0307224E−03 |
| A6= | −3.5122842E−05 | −5.4979177E−05 | 1.1426586E−03 | 9.2097684E−04 |
| A8= | 2.0910867E−06 | 9.0306969E−06 | −2.5065411E−04 | −1.6908897E−04 |
| A10= | −4.9729564E−07 | −1.3231324E−06 | 4.3806627E−05 | 2.5090144E−05 |
| A12= | 4.2634908E−08 | 1.2799256E−07 | −4.7271482E−06 | −2.3961676E−06 |
| A14= | −1.0392601E−09 | −7.9175941E−09 | 3.1837729E−07 | 1.4649656E−07 |
| A16= | −1.3373067E−10 | 3.0598759E−10 | −1.3063546E−08 | −5.5829905E−09 |
| A18= | 1.0920812E−11 | −6.7482549E−12 | 2.9859209E−10 | 1.2119553E−10 |
| A20= | −2.5254881E−13 | 6.5239271E−14 | −2.9164959E−12 | −1.1456990E−12 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Schematic Parameters | | | |
|---|---|---|---|
| f [mm] | 17.47 | Y6R2/Y1R1 | 0.84 |
| Fno | 2.50 | \|Dist\|max [%] | 1.85 |
| HFOV [deg.] | 16.1 | RU4f/RU4r | −2.91 |
| FOV [deg.] | 32.2 | \|f3 + f5\|/\|f2\| | 3.29 |
| Dra2r9/CT5 | 1.45 | DG1/DG2 | 0.42 |
| DG1/DG2f | 1.37 | \|R1/R2\| | 1.11 |
| TL/EPD | 3.55 | 10 × (ImgH/SD + ImgH/TL) | 5.4 |
| f/f23 − \|f/f12\| + f/fG2f | −0.81 | \|f/fG1\| + \|f/fG2\| | 1.60 |
| 10 × T12/CTa | 0.56 | Tab [mm] | 0.010 |
| f/fG1 | 1.11 | Dra1r9/CT1 | 4.49 |
| \|R2/Ra2\| | 2.00 | 0.1 × CT2/Tab | 27.32 |
| \|R4\|/f + \|R6\|/f | 6.56 | f/f1 + f/f2 | 0.86 |
| T56/CT6 + TL/ImgH | 8.80 | \|R1\|/f + \|R9\|/f + \|R12\|/f | 2.16 |

TABLE 3C-continued

| Schematic Parameters | | | |
|---|---|---|---|
| (V1 + V2)/Va | 2.98 | \|Ra2\|/f + \|Rb1\|/f | 0.66 |
| \|R3/Ra2\| | 1.79 | Dsr9/Dsr10 | 0.67 |
| f/f12 + f/f23 | 2.03 | 2 × ImgH/(Y1R1 + Y2R1) | 1.04 |
| ETa/ET5 | 1.11 | — | — |

4th Embodiment

Figure 7:
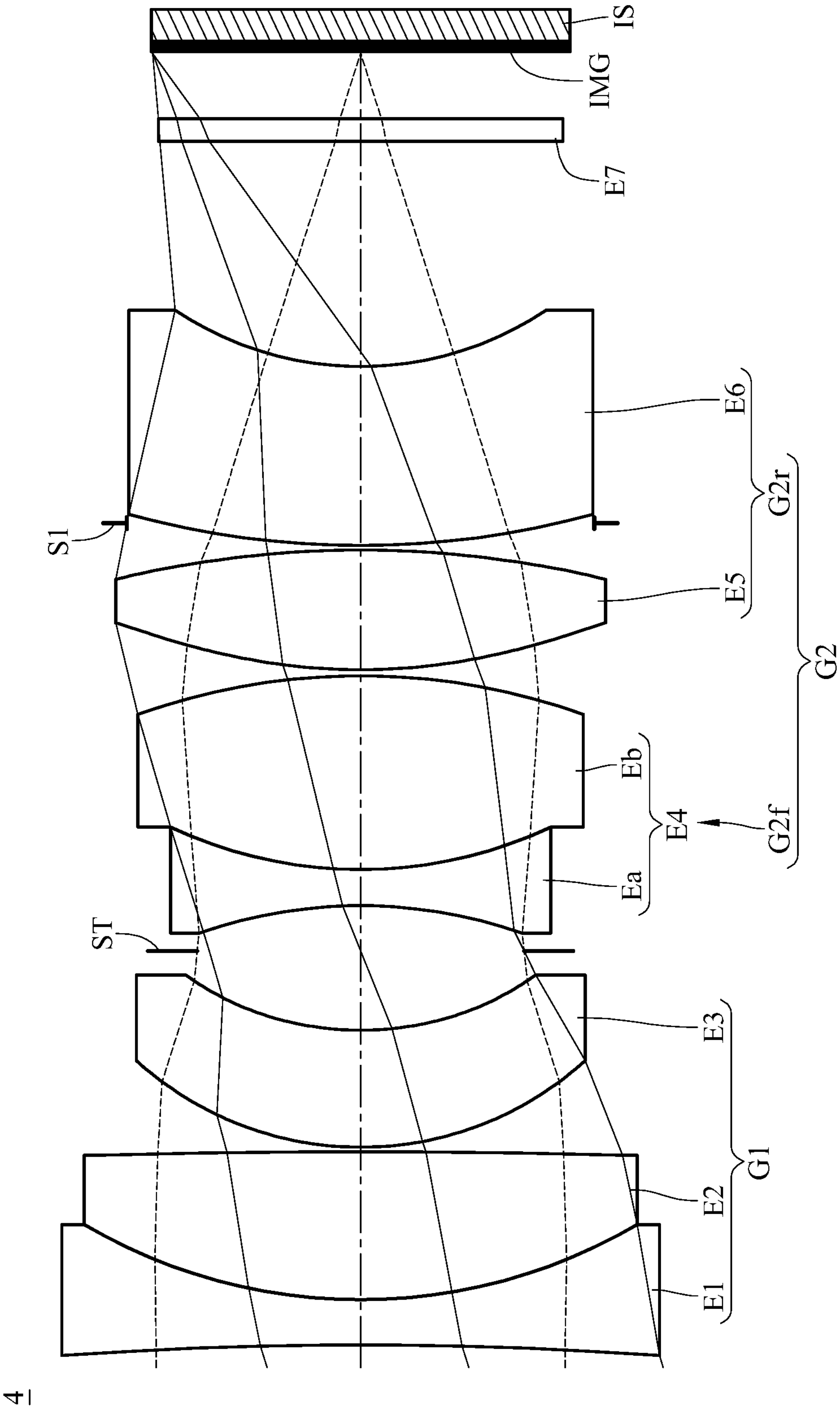
FIG. 7 is a schematic view of an image capturing unit according to the 4th embodiment of the present disclosure.
Figure 8:
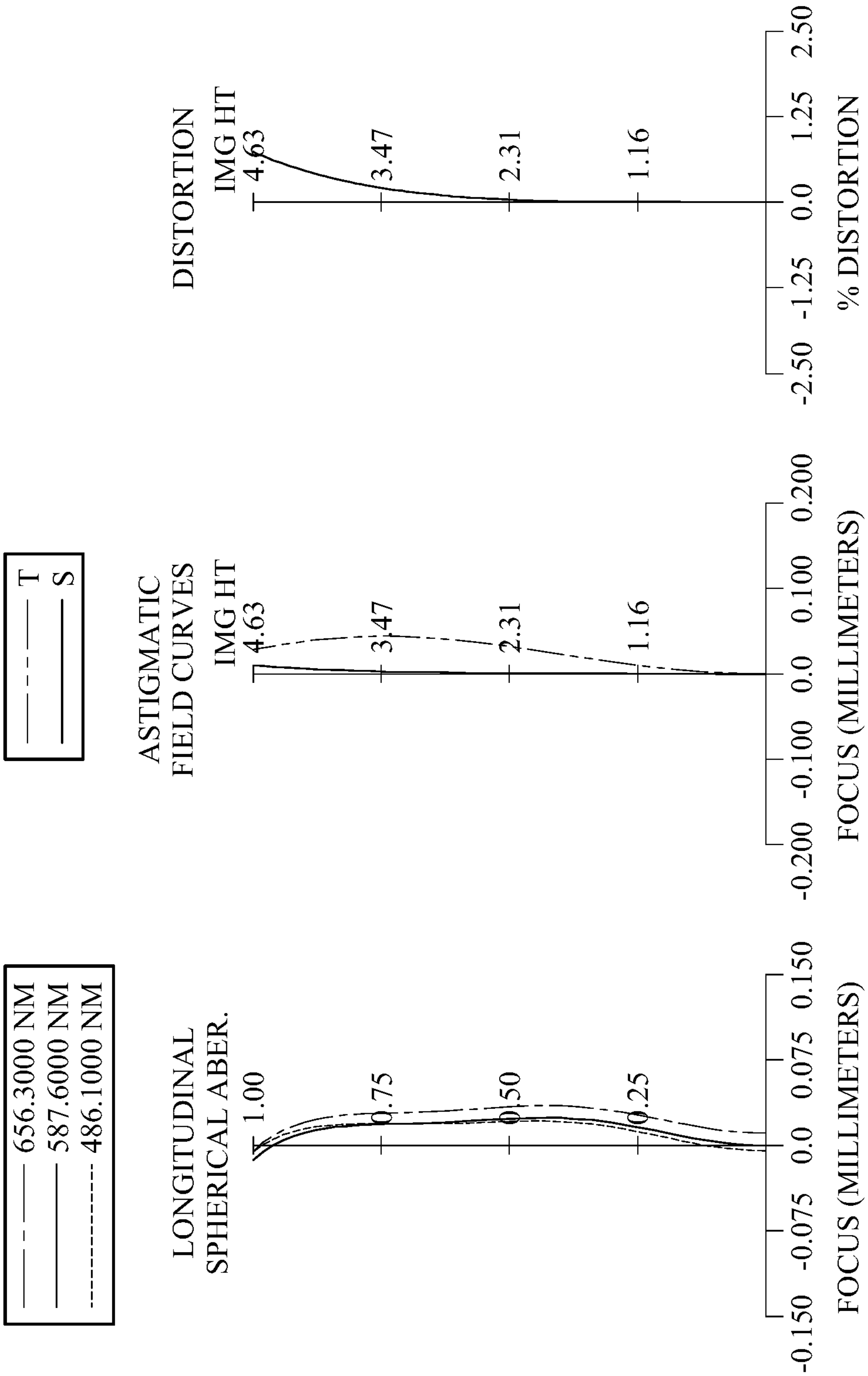
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the image capturing lens assembly (its reference numeral is omitted) of the present disclosure and an image sensor IS. The image capturing lens assembly includes, in order from an object side to an image side along an optical axis, a first lens unit E1, a second lens unit E2, a third lens unit E3, an aperture stop ST, a fourth lens unit E4, a fifth lens unit E5, a stop S1, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with negative refractive power has an object-side surface being concave in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being convex in a paraxial region thereof. The second lens unit E2 is made of glass material and has the object-side surface and the image-side surface being both spherical. The object-side surface of the second lens unit E2 is cemented to the image-side surface of the first lens unit E1.

The third lens unit E3 with positive refractive power has an object-side surface being convex in a paraxial region thereof and an image-side surface being concave in a paraxial region thereof. The third lens unit E3 is made of glass material and has the object-side surface and the image-side surface being both aspheric.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being convex in a paraxial region thereof. The fifth lens unit E5 is made of glass material and has the object-side surface and the image-side surface being both aspheric. The object-side surface of the fifth lens unit E5 has one inflection point.

The sixth lens unit E6 with negative refractive power has an object-side surface being convex in a paraxial region thereof and an image-side surface being concave in a paraxial region thereof. The sixth lens unit E6 is made of glass material and has the object-side surface and the image-side surface being both spherical.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 4th embodiment are shown in Table 4A and the aspheric surface data are shown in Table 4B below.

TABLE 4A

4th Embodiment
f = 14.97 mm, Fno = 1.65, HFOV = 17.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens unit 1 | −94.5879 (SPH) | 1.000 | Glass | 1.517 | 52.2 | −20.67 |
| 2 | | 12.0996 (SPH) | 0.005 | Cemented | 1.550 | 43.9 | — |
| 3 | Lens unit 2 | 12.0996 (SPH) | 3.286 | Glass | 1.692 | 54.5 | 16.68 |
| 4 | | −223.1032 (SPH) | 0.100 | | | | |
| 5 | Lens unit 3 | 7.4190 (ASP) | 2.600 | Glass | 1.693 | 53.2 | 106.10 |
| 6 | | 7.0668 (ASP) | 1.754 | | | | |
| 7 | Ape. Stop | Plano | 1.009 | | | | |
| 8 | Front lens of Lens unit 4 | −10.8050 (SPH) | 0.800 | Glass | 1.648 | 33.8 | −7.87 |
| 9 | | 9.9288 (SPH) | 0.005 | Cemented | 1.550 | 43.9 | — |
| 10 | Rear lens of Lens unit 4 | 9.9288 (SPH) | 4.300 | Glass | 1.692 | 54.5 | 9.21 |
| 11 | | −14.6548 (SPH) | 0.133 | | | | |
| 12 | Lens unit 5 | 13.1521 (ASP) | 2.660 | Glass | 1.693 | 53.2 | 12.20 |
| 13 | | −21.7381 (ASP) | 0.596 | | | | |
| 14 | Stop | Plano | −0.496 | | | | |
| 15 | Lens unit 6 | 19.6121 (SPH) | 3.970 | Glass | 1.755 | 27.5 | −18.32 |
| 16 | | 7.4058 (SPH) | 5.000 | | | | |
| 17 | Filter | Plano | 0.500 | Glass | 1.517 | 64.2 | — |
| 18 | | Plano | 1.490 | | | | |
| 19 | Image | Plano | — | | | | |

Note:
Reference wavelength is 587.6 nm (d-line).

TABLE 4A-continued

| 4th Embodiment f = 14.97 mm, Fno = 1.65, HFOV = 17.0 deg. | | | | | | |
|---|---|---|---|---|---|---|
| Surface # | Curvature Radius | Thickness | Material | Index | Abbe # | Focal Length |

An effective radius of the stop S1 (Surface 14) is 5.190 mm.

TABLE 4B

| Aspheric Coefficients | | | | |
|---|---|---|---|---|
| Surface # | 5 | 6 | 12 | 13 |
| k= | 4.8173500E−01 | −7.9815800E−02 | 8.2200300E−02 | 8.0192100E+00 |
| A4= | −1.5488157E−04 | 2.2897230E−04 | −1.3617248E−04 | 1.8647571E−04 |
| A6= | 1.9316764E−06 | 7.3476696E−06 | 2.4330239E−06 | 4.0152479E−07 |
| A8= | −5.9965506E−07 | −4.9000415E−07 | −2.6459800E−07 | −8.3577121E−08 |
| A10= | 2.4279008E−08 | 5.1253980E−08 | 1.0838532E−08 | 5.9079116E−09 |
| A12= | −5.8073171E−10 | −1.7304481E−09 | −1.8627319E−10 | −1.2120040E−10 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Schematic Parameters | | | |
|---|---|---|---|
| f [mm] | 14.97 | Y6R2/Y1R1 | 0.62 |
| Fno | 1.65 | \|Dist\|max [%] | 0.73 |
| HFOV [deg.] | 17.0 | RU4f/RU4r | 0.74 |
| FOV [deg.] | 34.0 | \|f3 + f5\|/\|f2\| | 1.75 |
| Dra2r9/CT5 | 1.67 | DG1/DG2 | 0.58 |
| DG1/DG2f | 1.37 | \|R1/R2\| | 7.82 |
| TL/EPD | 3.16 | 10 × (ImgH/SD + ImgH/TL) | 5.2 |
| f/f23 − \|f/f12\| + f/fG2f | 0.21 | \|f/fG1\| + \|f/fG2\| | 1.24 |
| 10 × T12/CTa | 0.06 | Tab [mm] | 0.005 |
| f/fG1 | 0.35 | Dra1r9/CT1 | 5.24 |
| \|R2/Ra2\| | 1.22 | 0.1 × CT2/Tab | 65.72 |
| \|R4\|/f + \|R6\|/f | 15.38 | f/f1 + f/f2 | 0.19 |
| T56/CT6 + TL/ImgH | 6.23 | \|R1\|/f + \|R9\|/f + \|R12\|/f | 7.69 |
| (V1 + V2)/Va | 3.15 | \|Ra2\|/f + \|Rb1\|/f | 1.33 |
| \|R3/Ra2\| | 1.22 | Dsr9/Dsr10 | 0.70 |
| f/f12 + f/f23 | 0.57 | 2 × ImgH/(Y1R1 + Y2R1) | 0.72 |
| ETa/ET5 | 2.72 | — | — |

5th Embodiment

Figure 9:
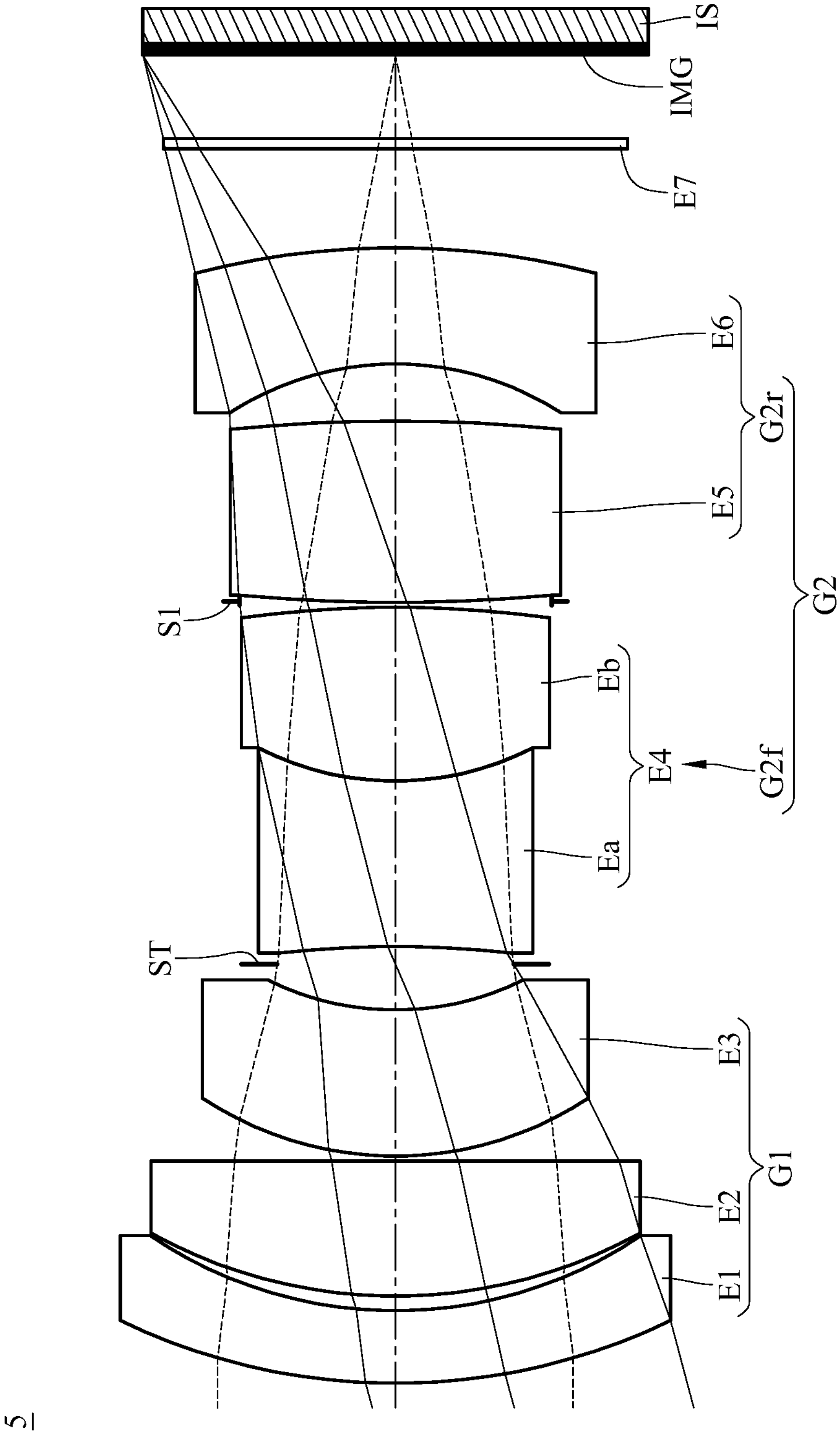
FIG. 9 is a schematic view of an image capturing unit according to the 5th embodiment of the present disclosure.
Figure 10:
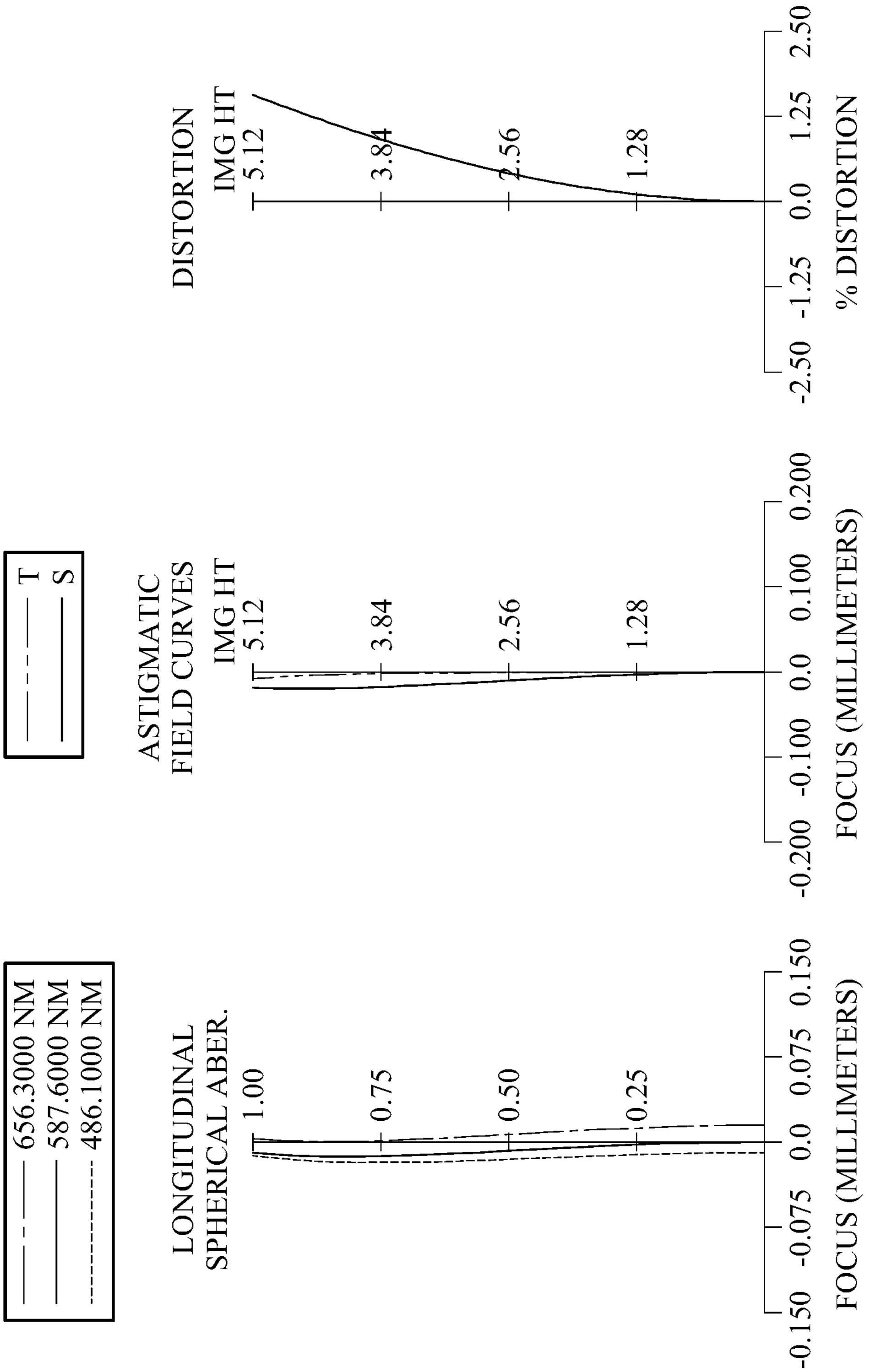
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the image capturing lens assembly (its reference numeral is omitted) of the present disclosure and an image sensor IS. The image capturing lens assembly includes, in order from an object side to an image side along an optical axis, a first lens unit E1, a second lens unit E2, a third lens unit E3, an aperture stop ST, a fourth lens unit E4, a stop S1, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with negative refractive power has an object-side surface being convex in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being planar in a paraxial region thereof. The second lens unit E2 is made of glass material and has the object-side surface and the image-side surface being both spherical.

The third lens unit E3 with negative refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being convex in a paraxial region thereof. The fifth lens unit E5 is made of glass material and has the object-side surface and the image-side surface being both spherical.

The sixth lens unit E6 with negative refractive power has an object-side surface being concave in a paraxial region thereof and an image-side surface being convex in a paraxial region thereof. The sixth lens unit E6 is made of glass material and has the object-side surface and the image-side surface being both spherical.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 5th embodiment are shown in Table 5A below. In this embodiment, all lens surfaces are spherical, so Table 5B for showing the aspheric surface data is omitted.

TABLE 5A

| 5th Embodiment<br>f = 18.95 mm, Fno = 2.63, HFOV = 14.9 deg. | | | | | | | | |
|---|---|---|---|---|---|---|---|---|
| Surface # | | Curvature Radius | Thickness | Material | Index | Abbe # | Focal Length |
| 0 | Object | Plano | Infinity | | | | |
| 1 | Lens unit 1 | 12.8723 (SPH) | 1.470 | Glass | 1.728 | 28.3 | −46.45 |
| 2 | | 8.8756 (SPH) | 0.294 | | | | |
| 3 | Lens unit 2 | 10.2458 (SPH) | 2.740 | Glass | 1.593 | 68.3 | 17.28 |
| 4 | | Plano (SPH) | 0.100 | | | | |
| 5 | Lens unit 3 | 7.1349 (SPH) | 2.960 | Glass | 1.620 | 60.3 | −440.20 |
| 6 | | 5.8488 (SPH) | 0.924 | | | | |
| 7 | Ape. Stop | Plano | 0.357 | | | | |
| 8 | Front lens of Lens unit 4 | −21.9180 (SPH) | 3.350 | Glass | 1.603 | 38.0 | −7.54 |
| 9 | | 6.0714 (SPH) | 0.005 | Cemented | 1.550 | 43.9 | — |
| 10 | Rear lens of Lens unit 4 | 6.0714 (SPH) | 3.516 | Glass | 1.804 | 46.6 | 6.31 |
| 11 | | −22.8094 (SPH) | 0.125 | | | | |
| 12 | Stop | Plano | −0.025 | | | | |
| 13 | Lens unit 5 | 34.1191 (SPH) | 3.675 | Glass | 1.497 | 81.6 | 34.95 |
| 14 | | −34.1191 (SPH) | 1.156 | | | | |
| 15 | Lens unit 6 | −6.1716 (SPH) | 2.355 | Glass | 1.603 | 38.0 | −18.15 |
| 16 | | −16.1718 (SPH) | 2.000 | | | | |
| 17 | Filter | Plano | 0.210 | Glass | 1.517 | 64.2 | — |
| 18 | | Plano | 1.693 | | | | |
| 19 | Image | Plano | — | | | | |

Note:
Reference wavelength is 587.6 nm (d-line).
An effective radius of the stop S1 (Surface 12) is 3.164 mm.

In the 5th embodiment, the definitions of these parameters shown in Table 5C are the same as those stated in the 1st embodiment with corresponding values for the 5th embodiment, so an explanation in this regard will not be provided again.

Moreover, these parameters can be calculated from Table 5A as the following values and satisfy the following conditions:

TABLE 5C

| Schematic Parameters | | | |
|---|---|---|---|
| f [mm] | 18.95 | Y6R2/Y1R1 | 0.73 |
| Fno | 2.63 | \|Dist\|max [%] | 1.56 |
| HFOV [deg.] | 14.9 | RU4f/RU4r | 0.96 |
| FOV [deg.] | 29.8 | \|f3 + f5\|/\|f2\| | 23.45 |
| Dra2r9/CT5 | 0.99 | DG1/DG2 | 0.53 |
| DG1/DG2f | 1.10 | \|R1/R2\| | 1.45 |
| TL/EPD | 3.73 | 10 × (ImgH/SD + ImgH/TL) | 5.4 |
| f/f23 − \|f/f12\| + f/fG2f | 1.46 | \|f/fG1\| + \|f/fG2\| | 1.18 |
| 10 × T12/CTa | 0.88 | Tab [mm] | 0.005 |
| f/fG1 | 0.73 | Dra1r9/CT1 | 4.74 |
| \|R2/Ra2\| | 1.46 | 0.1 × CT2/Tab | 54.80 |
| \|R4\|/f + \|R6\|/f | 5.28E+16 | f/f1 + f/f2 | 0.69 |
| T56/CT6 + TL/ImgH | 5.75 | [R1\|/f + \|R9\|/f + \|R12\|/f | 3.33 |
| (V1 + V2)/Va | 2.54 | \|Ra2\|/f + \|Rb1\|/f | 0.64 |
| \|R3/Ra2\| | 1.69 | Dsr9/Dsr10 | 0.67 |
| f/f12 + f/f23 | 1.91 | 2 × ImgH/(Y1R1 + Y2R1) | 0.97 |
| ETa/ET5 | 1.28 | — | — |

6th Embodiment

Figure 11:
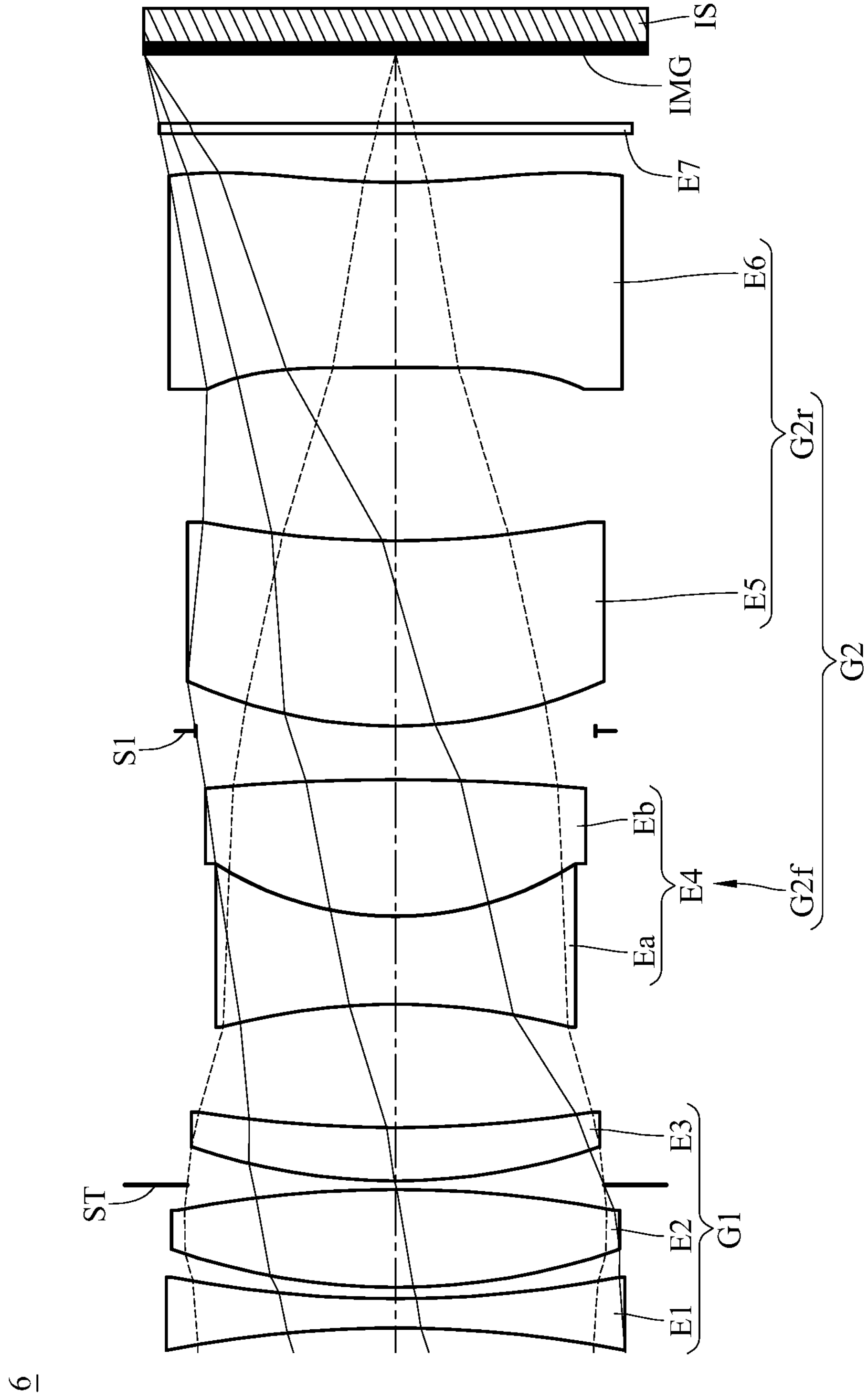
FIG. 11 is a schematic view of an image capturing unit according to the 6th embodiment of the present disclosure.
Figure 12:
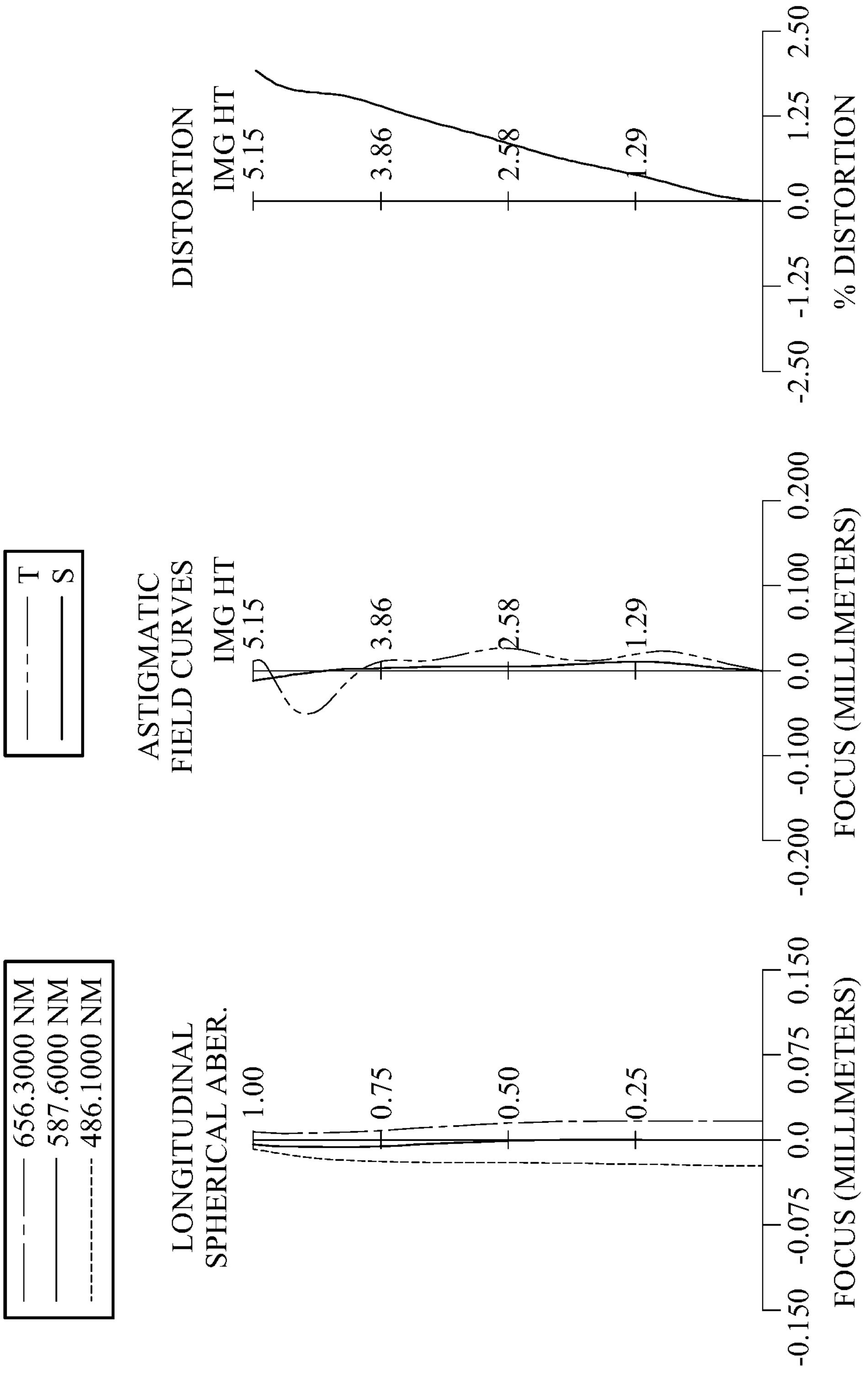
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the image capturing lens assembly (its reference numeral is omitted) of the present disclosure and an image sensor IS. The image capturing lens assembly includes, in order from an object side to an image side along an optical axis, a first lens unit E1, a second lens unit E2, an aperture stop ST, a third lens unit E3, a fourth lens unit E4, a stop S1, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with negative refractive power has an object-side surface being concave in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being convex in a paraxial region thereof. The second lens unit E2 is made of glass material and has the object-side surface and the image-side surface being both spherical.

The third lens unit E3 with positive refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being concave in a paraxial region thereof. The fifth lens unit E5 is made of glass material and has the object-side surface and the image-side surface being both spherical.

The sixth lens unit E6 with negative refractive power has an object-side surface being convex in a paraxial region thereof and an image-side surface being concave in a paraxial region thereof. The sixth lens unit E6 is made of plastic material and has the object-side surface and the image-side surface being both aspheric. The object-side surface of the sixth lens unit E6 has one inflection point. The image-side surface of the sixth lens unit E6 has one inflection point.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 6th embodiment are shown in Table 6A and the aspheric surface data are shown in Table 6B below.

TABLE 6A

| 6th Embodiment<br>f = 16.23 mm, Fno = 2.00, HFOV = 17.3 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens unit 1 | −24.4396 (SPH) | 0.600 | Glass | 1.785 | 25.7 | −15.39 |
| 2 | | 24.1371 (SPH) | 0.236 | | | | |
| 3 | Lens unit 2 | 13.9636 (SPH) | 2.003 | Glass | 1.729 | 54.7 | 12.39 |
| 4 | | −24.0706 (SPH) | 0.100 | | | | |
| 5 | Ape. Stop | Plano | 0.080 | | | | |
| 6 | Lens unit 3 | 12.8466 (SPH) | 1.093 | Glass | 1.946 | 17.9 | 26.10 |
| 7 | | 25.6701 (SPH) | 2.528 | | | | |
| 8 | Front lens of Lens unit 4 | −13.9108 (SPH) | 1.800 | Glass | 1.749 | 35.0 | −5.91 |
| 9 | | 6.8637 (SPH) | 0.008 | Cemented | 1.550 | 43.9 | — |
| 10 | Rear lens of Lens unit 4 | 6.8637 (SPH) | 2.800 | Glass | 1.788 | 47.5 | 7.70 |
| 11 | | −42.8581 (SPH) | 1.000 | | | | |
| 12 | Stop | Plano | 0.100 | | | | |
| 13 | Lens unit 5 | 10.3451 (SPH) | 3.800 | Glass | 1.747 | 51.0 | 24.14 |
| 14 | | 20.4551 (SPH) | 3.553 | | | | |
| 15 | Lens unit 6 | 419.2717 (ASP) | 3.800 | Plastic | 1.697 | 16.3 | −23.72 |
| 16 | | 15.8487 (ASP) | 1.000 | | | | |
| 17 | Filter | Plano | 0.210 | Glass | 1.517 | 64.2 | — |
| 18 | | Plano | 1.417 | | | | |
| 19 | Image | Plano | — | | | | |

Note:
Reference wavelength is 587.6 nm (d-line).

TABLE 6A-continued

| 6th Embodiment f = 16.23 mm, Fno = 2.00, HFOV = 17.3 deg. | | | | | | |
|---|---|---|---|---|---|---|
| Surface # | Curvature Radius | Thickness | Material | Index | Abbe # | Focal Length |

An effective radius of the stop S1 (Surface 12) is 4.100 mm.

TABLE 6B

| Aspheric Coefficients | | |
|---|---|---|
| Surface # | 15 | 16 |
| k= | −9.0000000E+01 | 7.0561500E+00 |
| A4= | −2.3543038E−03 | −1.4126111E−03 |
| A6= | 3.8930807E−04 | −9.0226909E−05 |
| A8= | −1.6445181E−04 | 2.9393055E−05 |
| A10= | 3.8470431E−05 | −6.1527924E−06 |
| A12= | −5.4876044E−06 | 7.8375235E−07 |
| A14= | 4.8567636E−07 | −5.9609763E−08 |
| A16= | −2.6029838E−08 | 2.6364565E−09 |
| A18= | 7.7318867E−10 | −6.2500228E−11 |
| A20= | −9.7566010E−12 | 6.1357548E−13 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Schematic Parameters | | | |
|---|---|---|---|
| f [mm] | 16.23 | Y6R2/Y1R1 | 0.99 |
| Fno | 2.00 | \|Dist\|max [%] | 1.95 |
| HFOV [deg.] | 17.3 | RU4f/RU4r | 0.32 |
| FOV [deg.] | 34.6 | \|f3 + f5\|/\|f2\| | 4.05 |
| Dra2r9/CT5 | 1.03 | DG1/DG2 | 0.24 |
| DG1/DG2f | 0.89 | \|R1/R2\| | 1.01 |
| TL/EPD | 3.22 | 10 × (ImgH/SD + ImgH/TL) | 4.5 |
| f/f23 − \|f/f12\| + f/fG2f | 1.15 | \|f/fG1\| + \|f/fG2\| | 1.31 |
| 10 × T12/CTa | 1.31 | Tab [mm] | 0.008 |
| f/fG1 | 0.98 | Dra1r9/CT1 | 9.51 |
| \|R2/Ra2\| | 3.52 | 0.1 × CT2/Tab | 25.04 |
| \|R4\|/f + \|R6\|/f | 3.06 | f/f1 + f/f2 | 0.26 |
| T56/CT6 + TL/ImgH | 6.01 | \|R1\|/f + \|R9\|/f + \|R12\|/f | 3.12 |
| (V1 + V2)/Va | 2.30 | \|Ra2\|/f + \|Rb1\|/f | 0.85 |
| \|R3/Ra2\| | 2.03 | Dsr9/Dsr10 | 0.71 |
| f/f12 + f/f23 | 2.24 | 2 × ImgH/(Y1R1 + Y2R1) | 1.11 |
| ETa/ET5 | 1.14 | — | — |

7th Embodiment

Figure 13:
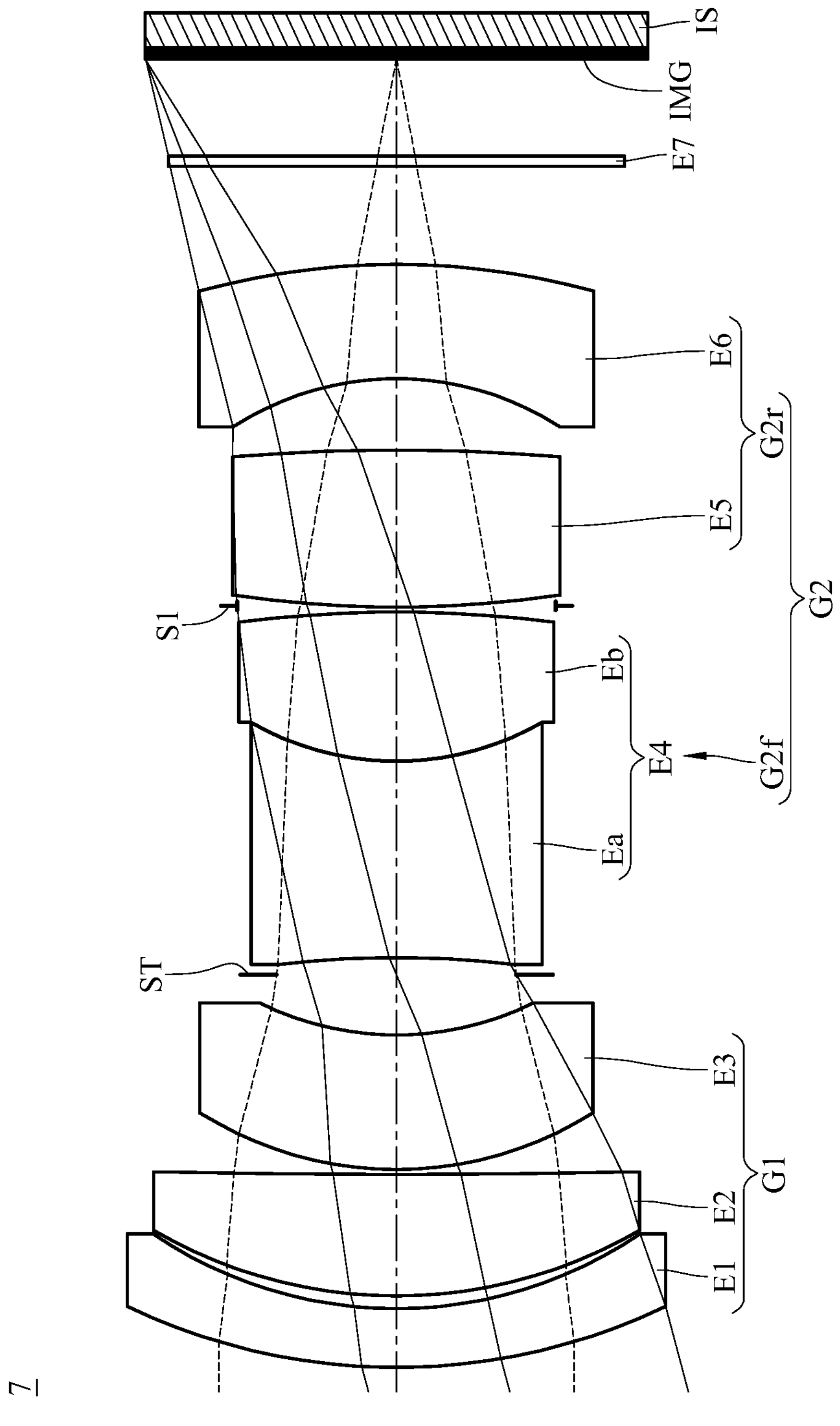
FIG. 13 is a schematic view of an image capturing unit according to the 7th embodiment of the present disclosure.
Figure 14:
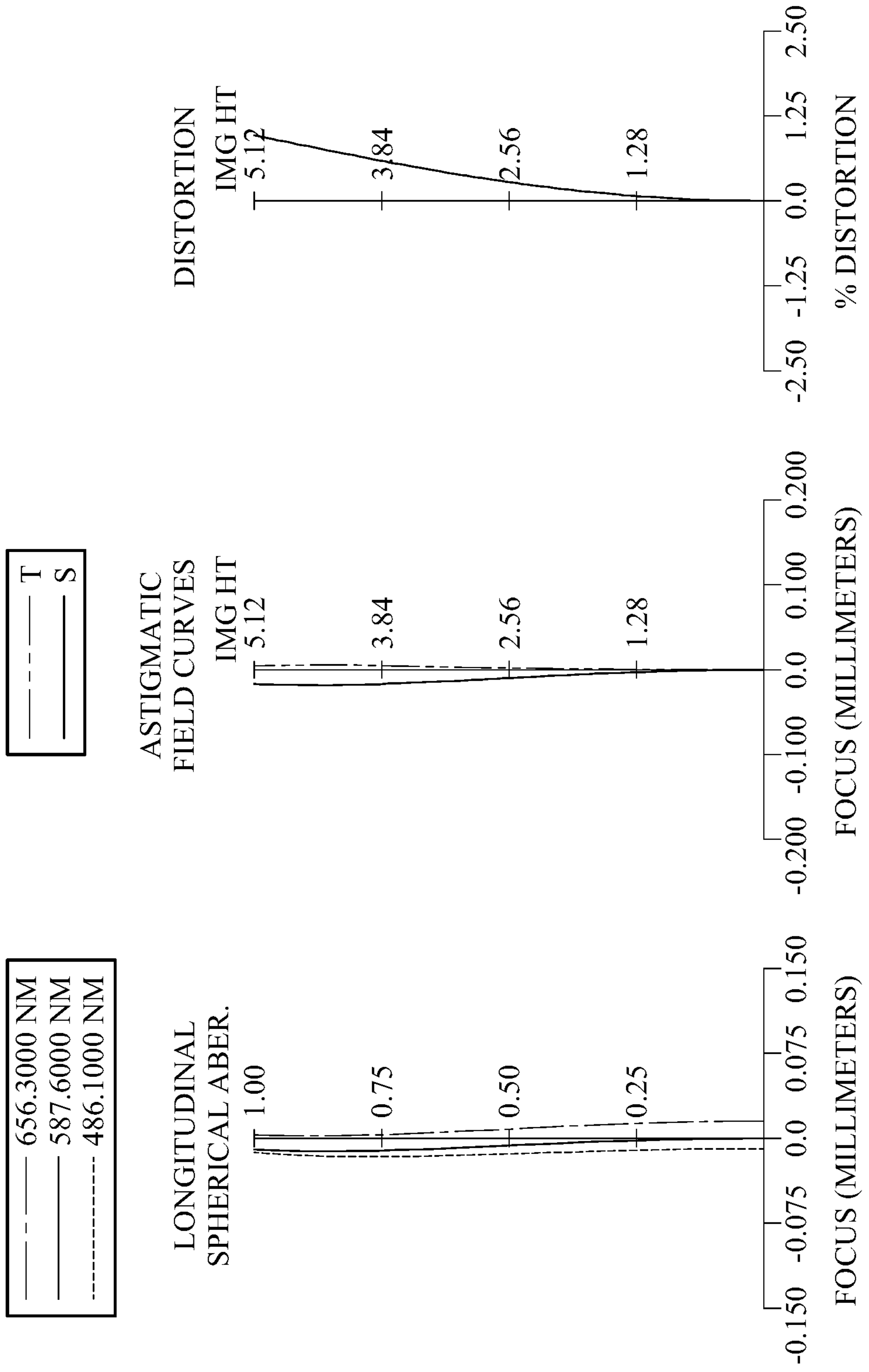
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the image capturing lens assembly (its reference numeral is omitted) of the present disclosure and an image sensor IS. The image capturing lens assembly includes, in order from an object side to an image side along an optical axis, a first lens unit E1, a second lens unit E2, a third lens unit E3, an aperture stop ST, a fourth lens unit E4, a stop S1, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is seven.

The first lens unit E1 with negative refractive power has an object-side surface being convex in a paraxial region thereof and an image-side surface being concave in a paraxial region thereof. The first lens unit E1 is made of glass material and has the object-side surface and the image-side surface being both spherical.

The second lens unit E2 with positive refractive power has an object-side surface being convex in a paraxial region thereof and an image-side surface being concave in a paraxial region thereof. The second lens unit E2 is made of glass material and has the object-side surface and the image-side surface being both spherical.

The third lens unit E3 with negative refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with negative refractive power has an object-side surface being concave in a paraxial region thereof and an image-side surface being concave in a paraxial region thereof. The front lens element Ea is made of glass material and has the object-side surface and the image-side surface being both spherical.

The rear lens element Eb with positive refractive power has an object-side surface being convex in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being convex in a paraxial region thereof. The fifth lens unit E5 is made of glass material and has the object-side surface and the image-side surface being both spherical.

The sixth lens unit E6 with negative refractive power has an object-side surface being concave in a paraxial region thereof and an image-side surface being convex in a paraxial region thereof. The sixth lens unit E6 is made of glass material and has the object-side surface and the image-side surface being both spherical.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 7th embodiment are shown in Table 7A below. In this embodiment, all lens surfaces are spherical, so Table 7B for showing the aspheric surface data is omitted.

TABLE 7A

| 7th Embodiment f = 19.05 mm, Fno = 2.63, HFOV = 14.9 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens unit 1 | 12.7369 (SPH) | 1.198 | Glass | 1.755 | 27.5 | −44.27 |
| 2 | | 8.8500 (SPH) | 0.259 | | | | |
| 3 | Lens unit 2 | 9.8376 (SPH) | 2.479 | Glass | 1.603 | 65.5 | 16.99 |
| 4 | | 222.6289 (SPH) | 0.100 | | | | |
| 5 | Lens unit 3 | 7.5253 (SPH) | 2.747 | Glass | 1.697 | 55.5 | −850.32 |
| 6 | | 6.3170 (SPH) | 1.227 | | | | |
| 7 | Ape. Stop | Plano | 0.352 | | | | |
| 8 | Front lens of Lens unit 4 | −20.2870 (SPH) | 4.000 | Glass | 1.603 | 38.0 | −7.22 |
| 9 | | 5.9649 (SPH) | 0.005 | Cemented | 1.550 | 43.9 | — |
| 10 | Rear lens of Lens unit 4 | 5.9649 (SPH) | 3.042 | Glass | 1.804 | 46.6 | 6.25 |
| 11 | | −24.6144 (SPH) | 0.128 | | | | |
| 12 | Stop | Plano | −0.028 | | | | |
| 13 | Lens unit 5 | 22.7560 (SPH) | 3.200 | Glass | 1.497 | 81.6 | 29.79 |
| 14 | | −40.4176 (SPH) | 1.460 | | | | |
| 15 | Lens unit 6 | −6.1367 (SPH) | 2.330 | Glass | 1.702 | 41.1 | −16.54 |
| 16 | | −15.0620 (SPH) | 2.000 | | | | |
| 17 | Filter | Plano | 0.210 | Glass | 1.517 | 64.2 | — |
| 18 | | Plano | 1.978 | | | | |
| 19 | Image | Plano | — | | | | |

Note:
Reference wavelength is 587.6 nm (d-line).
An effective radius of the stop S1 (Surface 12) is 3.250 mm.

In the 7th embodiment, the definitions of these parameters shown in Table 7C are the same as those stated in the 1st embodiment with corresponding values for the 7th embodiment, so an explanation in this regard will not be provided again.

Moreover, these parameters can be calculated from Table 7A as the following values and satisfy the following conditions:

TABLE 7C

| Schematic Parameters | | | |
|---|---|---|---|
| f [mm] | 19.05 | Y6R2/Y1R1 | 0.73 |
| Fno | 2.63 | \|Dist\|max [%] | 0.97 |
| HFOV [deg.] | 14.9 | RU4f/RU4r | 0.82 |
| FOV [deg.] | 29.8 | \|f3 + f5\|/\|f2\| | 48.28 |
| Dra2r9/CT5 | 0.98 | DG1/DG2 | 0.48 |
| DG1/DG2f | 0.96 | \|R1/R2\| | 1.44 |
| TL/EPD | 3.68 | 10 × (ImgH/SD + ImgH/TL) | 5.5 |

TABLE 7C-continued

| Schematic Parameters | | | |
|---|---|---|---|
| f/f23 − \|f/f12\| + f/fG2f | 1.43 | \|f/fG1\| + \|f/fG2\| | 1.16 |
| 10 × T12/CTa | 0.65 | Tab [mm] | 0.005 |
| f/fG1 | 0.75 | Dra1r9/CT1 | 5.97 |
| \|R2/Ra2\| | 1.48 | 0.1 × CT2/Tab | 49.58 |
| \|R4\|/f + \|R6\|/f | 12.02 | f/f1 + f/f2 | 0.69 |
| T56/CT6 + TL/ImgH | 5.84 | \|R1\|/f + \|R9\|/f + \|R12\|/f | 2.65 |
| (V1 + V2)/Va | 2.45 | \|Ra2\|/f + \|Rb1\|/f | 0.63 |
| \|R3/Ra2\| | 1.65 | Dsr9/Dsr10 | 0.70 |
| f/f12 + f/f23 | 1.95 | 2 × ImgH/(Y1R1 + Y2R1) | 0.98 |
| ETa/ET5 | 1.79 | — | — |

8th Embodiment

Figure 15:
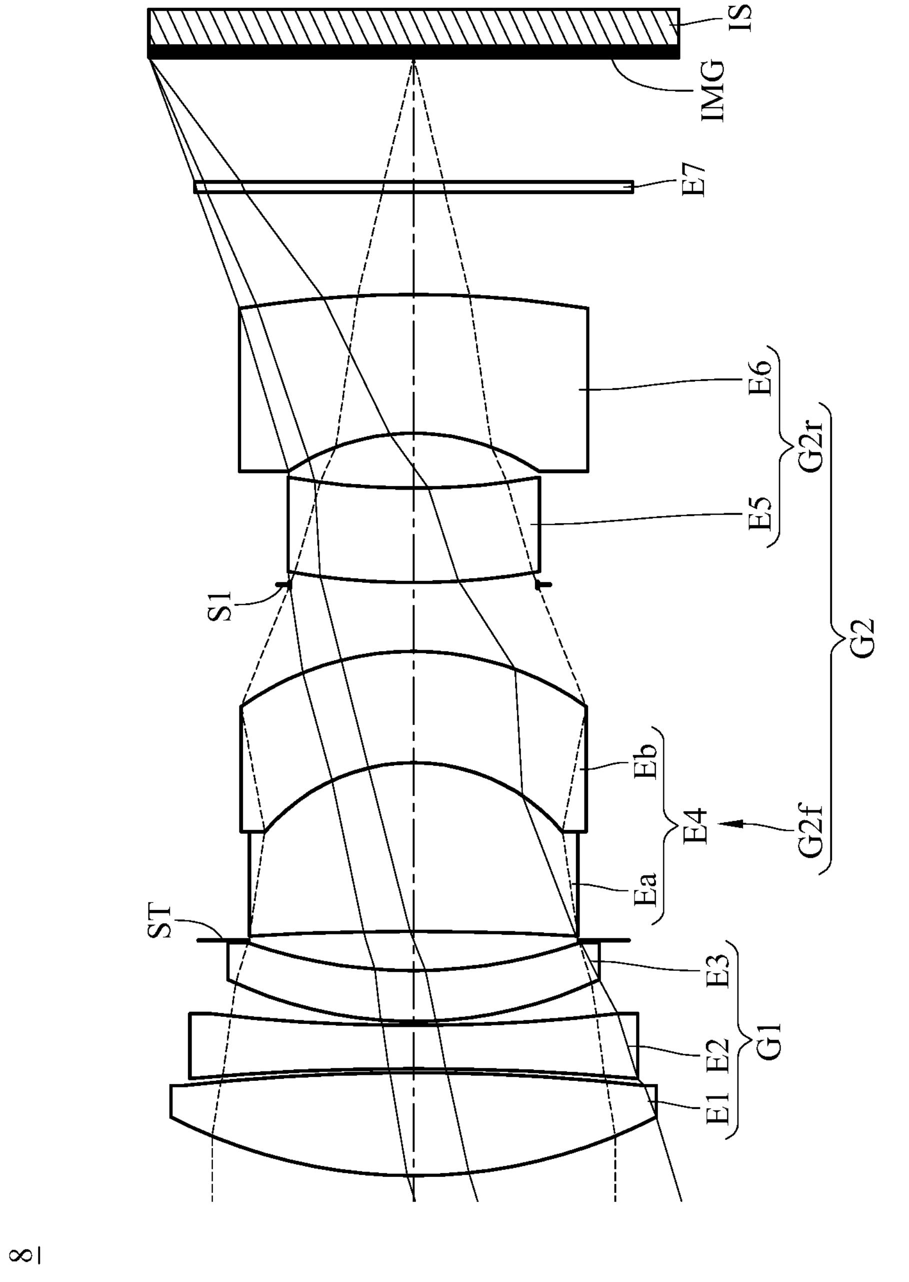
FIG. 15 is a schematic view of an image capturing unit according to the 8th embodiment of the present disclosure.
Figure 16:
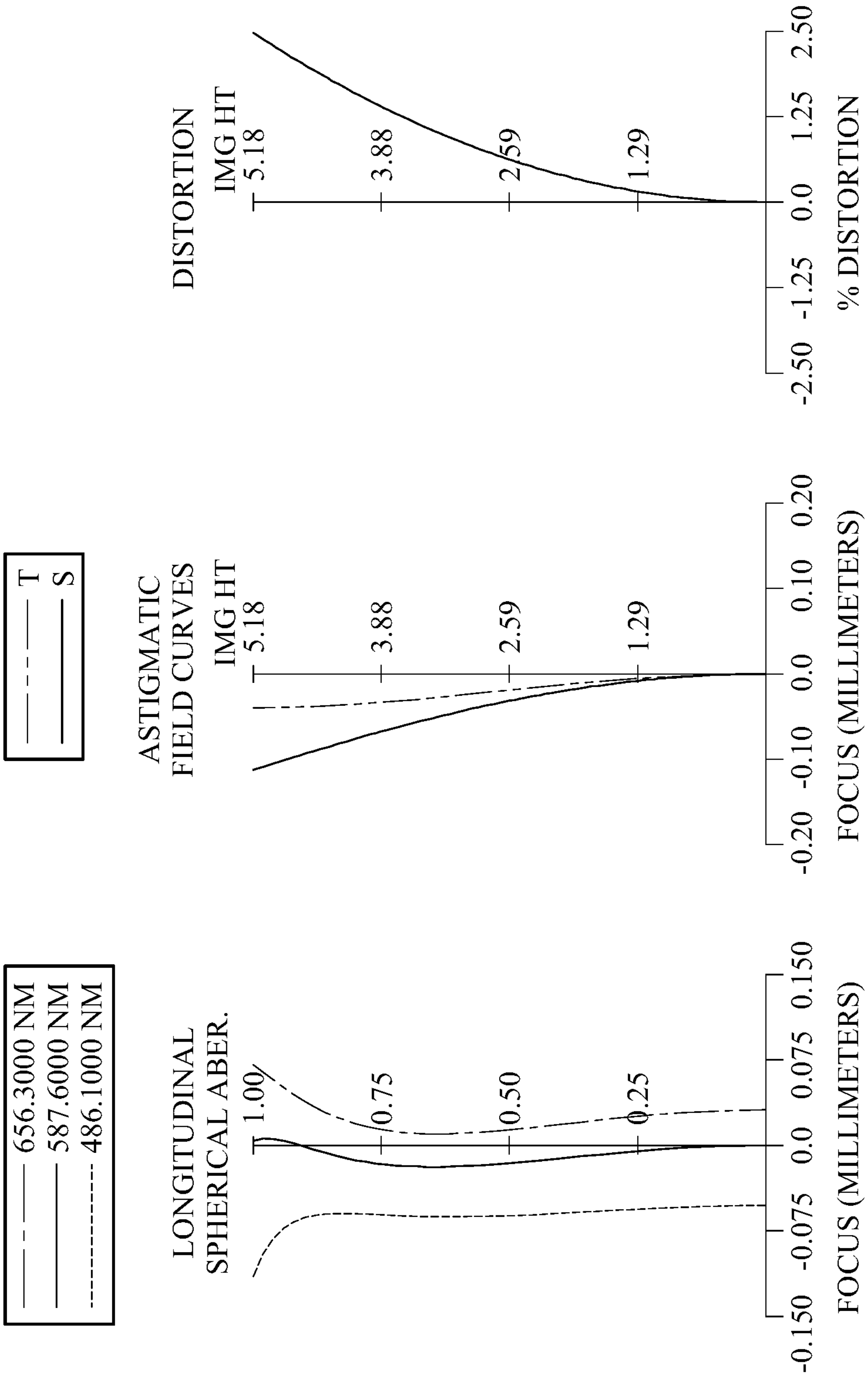
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the image capturing lens assembly (its reference numeral is omitted) of the present disclosure and an image sensor IS. The image capturing lens assembly includes, in order from an object side to an image side along an optical axis, a first lens unit E1, a second lens unit E2, a third lens unit E3, an aperture stop ST, a fourth lens unit E4, a stop S1, a fifth lens unit E5, a sixth lens unit E6, a filter E7 and an image surface IMG. Each of the first lens unit E1, the second lens unit E2, the third lens unit E3, the fifth lens unit E5 and the sixth lens unit E6 is a single lens element. The fourth lens unit E4 is composed of two cemented lens elements. The fourth lens unit E4 includes, in order from the object side to the image side along the optical path, a front lens element Ea and a rear lens element Eb. The first lens unit E1, the second lens unit E2 and the third lens unit E3 are included in a first lens group G1, the front lens element Ea and the rear lens element Eb of the fourth lens unit E4 are included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six.

The total number of lens elements of the image capturing lens assembly is seven. The first lens unit E1 with positive refractive power has an object-side surface being convex in a paraxial region thereof and an image-side surface being convex in a paraxial region thereof. The first lens unit E1 is made of glass material and has the object-side surface and the image-side surface being both spherical.

The second lens unit E2 with negative refractive power has an object-side surface being concave in a paraxial region thereof and an image-side surface being concave in a paraxial region thereof. The second lens unit E2 is made of glass material and has the object-side surface and the image-side surface being both spherical.

The third lens unit E3 with positive refractive power has an object-side surface being convex in a paraxial region thereof and an image-side surface being concave in a paraxial region thereof. The third lens unit E3 is made of glass material and has the object-side surface and the image-side surface being both spherical.

The front lens element Ea with positive refractive power has an object-side surface being concave in a paraxial region thereof and an image-side surface being convex in a paraxial region thereof. The front lens element Ea is made of glass material and has the object-side surface and the image-side surface being both spherical.

The rear lens element Eb with negative refractive power has an object-side surface being concave in a paraxial region thereof and an image-side surface being convex in a paraxial region thereof. The rear lens element Eb is made of glass material and has the object-side surface and the image-side surface being both spherical. The object-side surface of the rear lens element Eb is cemented to the image-side surface of the front lens element Ea.

The fifth lens unit E5 with positive refractive power has an object-side surface being convex in a paraxial region thereof and an image-side surface being concave in a paraxial region thereof. The fifth lens unit E5 is made of glass material and has the object-side surface and the image-side surface being both spherical.

The sixth lens unit E6 with negative refractive power has an object-side surface being concave in a paraxial region thereof and an image-side surface being convex in a paraxial region thereof. The sixth lens unit E6 is made of glass material and has the object-side surface and the image-side surface being both spherical.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 8th embodiment are shown in Table 8A below. In this embodiment, all lens surfaces are spherical, so Table 8B for showing the aspheric surface data is omitted.

TABLE 8A

| 8th Embodiment<br>f = 16.98 mm, Fno = 2.15, HFOV = 16.6 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens unit 1 | 10.3930 (SPH) | 2.023 | Glass | 1.657 | 51.1 | 12.75 |
| 2 | | −39.8093 (SPH) | 0.080 | | | | |
| 3 | Lens unit 2 | −49.6978 (SPH) | 0.843 | Glass | 1.953 | 32.3 | −21.49 |
| 4 | | 35.1620 (SPH) | 0.080 | | | | |
| 5 | Lens unit 3 | 8.4921 (SPH) | 0.995 | Glass | 1.953 | 32.3 | 43.44 |
| 6 | | 10.0715 (SPH) | 0.596 | | | | |
| 7 | Ape. Stop | Plano | 0.175 | | | | |
| 8 | Front lens of Lens unit 4 | −55.2743 (SPH) | 3.300 | Glass | 1.487 | 70.4 | 8.23 |
| 9 | | −3.8133 (SPH) | 0.005 | Cemented | 1.550 | 43.9 | — |
| 10 | Rear lens of Lens unit 4 | −3.8133 (SPH) | 2.177 | Glass | 2.000 | 25.4 | −24.46 |
| 11 | | −5.8069 (SPH) | 1.303 | | | | |
| 12 | Stop | Plano | 0.045 | | | | |
| 13 | Lens unit 5 | 14.1206 (SPH) | 1.846 | Glass | 1.953 | 32.3 | 219.25 |
| 14 | | 14.1772 (SPH) | 1.079 | | | | |
| 15 | Lens unit 6 | −4.3809 (SPH) | 2.715 | Glass | 1.456 | 90.3 | −12.61 |
| 16 | | −21.8967 (SPH) | 2.000 | | | | |
| 17 | Filter | Plano | 0.210 | Glass | 1.517 | 64.2 | — |
| 18 | | Plano | 2.429 | | | | |
| 19 | Image | Plano | — | | | | |

Note:
Reference wavelength is 587.6 nm (d-line).
An effective radius of the stop S1 (Surface 12) is 2.425 mm.

In the 8th embodiment, the definitions of these parameters shown in Table 8C are the same as those stated in the 1st embodiment with corresponding values for the 8th embodiment, so an explanation in this regard will not be provided again. Moreover, these parameters can be calculated from Table 8A as the following values and satisfy the following conditions:

TABLE 8C

| Schematic Parameters | | | |
|---|---|---|---|
| f [mm] | 16.98 | Y6R2/Y1R1 | 0.72 |
| Fno | 2.15 | \|Dist\|max [%] | 2.48 |
| HFOV [deg.] | 16.6 | RU4f/RU4r | 9.52 |
| FOV [deg.] | 33.2 | \|f3 + f5\|/\|f2\| | 12.22 |
| Dra2r9/CT5 | 1.91 | DG1/DG2 | 0.32 |
| DG1/DG2f | 0.73 | \|R1/R2\| | 0.26 |
| TL/EPD | 2.77 | 10 × (ImgH/SD + ImgH/TL) | 6.5 |
| f/f23 − \|f/f12\| + f/fG2f | −0.09 | \|f/fG1\| + \|f/fG2\| | 1.15 |
| 10 × T12/CTa | 0.24 | Tab [mm] | 0.005 |
| f/fG1 | 1.00 | Dra1r9/CT1 | 3.38 |
| \|R2/Ra2\| | 10.44 | 0.1 × CT2/Tab | 16.86 |
| \|R4\|/f + \|R6\|/f | 2.66 | f/f1 + f/f2 | 0.54 |
| T56/CT6 + TL/ImgH | 4.63 | \|R1\|/f + \|R9\|/f + \|R12\|/f | 2.73 |
| (V1 + V2)/Va | 1.18 | \|Ra2\|/f + \|Rb1\|/f | 0.45 |
| \|R3/Ra2\| | 13.03 | Dsr9/Dsr10 | 0.79 |
| f/f12 + f/f23 | 0.19 | 2 × ImgH/(Y1R1 + Y2R1) | 1.13 |
| ETa/ET5 | 1.11 | — | — |

9th Embodiment

Figure 17:
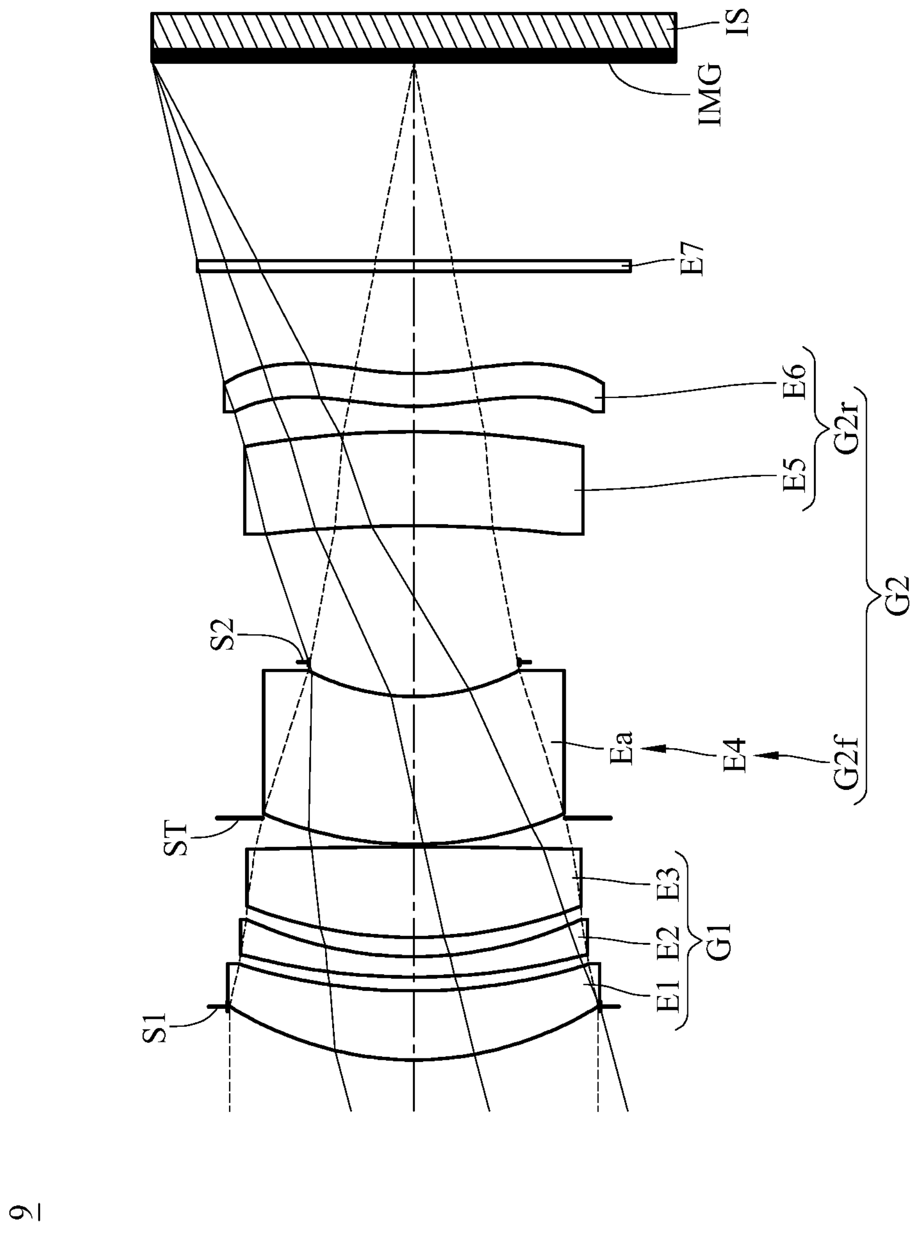
FIG. 17 is a schematic view of an image capturing unit according to the 9th embodiment of the present disclosure.
Figure 18:
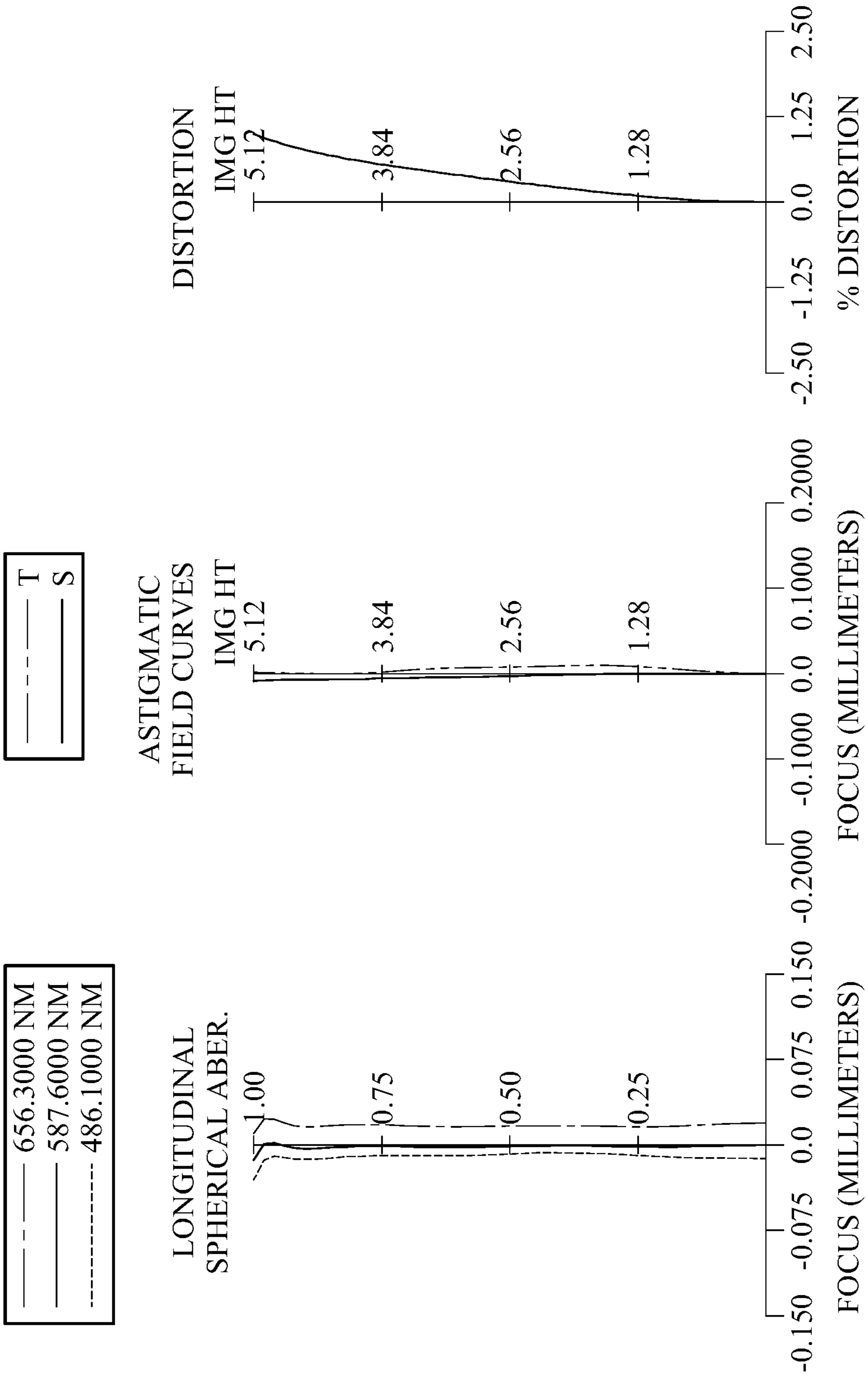
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the image capturing lens assembly (its reference numeral is omitted) of the present disclosure and an image sensor IS. The image capturing lens assembly includes, in order from an object side to an image side along an optical axis, a stop S1, a first lens unit E1, a second lens unit E2, a third lens unit E3, an aperture stop ST, a fourth lens unit E4, a stop S2, a fifth lens unit E5, a sixth lens unit E6, a filter E7 and an image surface IMG. Each of the first lens unit E1, the second lens unit E2, the third lens unit E3, the fourth lens unit E4, the fifth lens unit E5 and the sixth lens unit E6 is a single lens element. The fourth lens unit E4 includes a front lens element Ea. The first lens unit E1, the second lens unit E2 and the third lens unit E3 are included in a first lens group G1, the front lens element Ea of the fourth lens unit E4 is included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is six.

The first lens unit E1 with positive refractive power has an object-side surface being convex in a paraxial region thereof and an image-side surface being concave in a paraxial region thereof. The first lens unit E1 is made of plastic material and has the object-side surface and the image-side surface being both aspheric.

The second lens unit E2 with negative refractive power has an object-side surface being convex in a paraxial region thereof and an image-side surface being concave in a paraxial region thereof. The second lens unit E2 is made of plastic material and has the object-side surface and the image-side surface being both aspheric. The object-side surface of the second lens unit E2 has one inflection point. The image-side surface of the second lens unit E2 has one inflection point.

The third lens unit E3 with positive refractive power has an object-side surface being convex in a paraxial region thereof and an image-side surface being convex in a paraxial region thereof. The third lens unit E3 is made of glass material and has the object-side surface and the image-side surface being both spherical.

The front lens element Ea with negative refractive power has an object-side surface being convex in a paraxial region thereof and an image-side surface being concave in a paraxial region thereof. The fourth lens unit E4 is made of plastic material and has the object-side surface and the image-side surface being both aspheric.

The fifth lens unit E5 with positive refractive power has an object-side surface being concave in a paraxial region thereof and an image-side surface being convex in a paraxial region thereof. The fifth lens unit E5 is made of plastic material and has the object-side surface and the image-side surface being both aspheric. The image-side surface of the fifth lens unit E5 has one inflection point.

The sixth lens unit E6 with positive refractive power has an object-side surface being convex in a paraxial region thereof and an image-side surface being concave in a paraxial region thereof. The sixth lens unit E6 is made of plastic material and has the object-side surface and the image-side surface being both aspheric. The object-side surface of the sixth lens unit E6 has one inflection point. The image-side surface of the sixth lens unit E6 has one inflection point.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 9th embodiment are shown in Table 9A and the aspheric surface data are shown in Table 9B below.

TABLE 9A

| 9th Embodiment<br>f = 18.98 mm, Fno = 2.63, HFOV = 15.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Stop | Plano | −1.045 | | | | |
| 2 | Lens unit 1 | 6.4003 (ASP) | 1.353 | Plastic | 1.545 | 56.1 | 25.20 |
| 3 | | 11.0919 (ASP) | 0.269 | | | | |
| 4 | Lens unit 2 | 12.3613 (ASP) | 0.400 | Plastic | 1.614 | 25.6 | −28.36 |
| 5 | | 7.1397 (ASP) | 0.376 | | | | |
| 6 | Lens unit 3 | 9.0284 (SPH) | 1.775 | Glass | 1.497 | 81.6 | 16.78 |
| 7 | | −102.5312 (SPH) | 0.569 | | | | |

TABLE 9A-continued

| 9th Embodiment f = 18.98 mm, Fno = 2.63, HFOV = 15.0 deg. | | | | | | | |
|---|---|---|---|---|---|---|---|
| Surface # | | Curvature Radius | Thickness | Material | Index | Abbe # | Focal Length |
| 8 | Ape. Stop | Plano | −0.519 | | | | |
| 9 | Front lens of Lens unit 4 | 7.1893 (ASP) | 2.897 | Plastic | 1.639 | 23.5 | −29.10 |
| 10 | | 4.3699 (ASP) | 0.669 | | | | |
| 11 | Stop | Plano | 2.674 | | | | |
| 12 | Lens unit 5 | −22.8728 (ASP) | 1.843 | Plastic | 1.669 | 19.5 | 141.54 |
| 13 | | −19.0179 (ASP) | 0.498 | | | | |
| 14 | Lens unit 6 | 5.3998 (ASP) | 0.640 | Plastic | 1.534 | 56.0 | 641.48 |
| 15 | | 5.2598 (ASP) | 2.000 | | | | |
| 16 | Filter | Plano | 0.210 | Glass | 1.517 | 64.2 | — |
| 17 | | Plano | 3.898 | | | | |
| 18 | Image | Plano | - | | | | |

Note:
Reference wavelength is 587.6 nm (d-line).
An effective radius of the stop S1 (Surface 1) is 3.640 mm.
An effective radius of the stop S2 (Surface 11) is 2.060 mm.

TABLE 9B

| Aspheric Coefficients | | | | |
|---|---|---|---|---|
| Surface # | 2 | 3 | 4 | 5 |
| k= | −2.5753200E−01 | −1.3308400E+00 | 8.3678600E+00 | −4.2784000E−01 |
| A4= | −2.4899061E−04 | −7.7907519E−04 | −3.1578820E−03 | −2.6364232E−03 |
| A6= | 8.8106675E−06 | 4.0877579E−04 | 9.8014462E−04 | 7.6391646E−04 |
| A8= | −3.1929314E−06 | −1.0986836E−04 | −2.1738098E−04 | −1.3821221E−04 |
| A10= | 4.3473873E−08 | 1.5935325E−05 | 3.0372199E−05 | 1.8253558E−05 |
| A12= | 4.3288126E−08 | −1.2726897E−06 | −2.6174699E−06 | −1.5715812E−06 |
| A14= | −3.9081640E−09 | 5.2508023E−08 | 1.2180987E−07 | 7.3069514E−08 |
| A16= | 1.2590399E−10 | −8.1332465E−10 | −2.3827822E−09 | −1.4294015E−09 |
| Surface # | 9 | 10 | 12 | 13 |
| k= | −6.7393800E+00 | −7.0930000E−01 | −8.7028800E+01 | −3.2229000E+01 |
| A4= | 1.2973466E−03 | 2.2027192E−04 | 5.1380660E−04 | −2.9061653E−03 |
| A6= | −5.0503518E−05 | 5.2133873E−05 | −1.6062271E−04 | 1.2456164E−03 |
| A8= | 1.6802477E−05 | 9.8766006E−06 | 2.1288560E−05 | −3.1481432E−04 |
| A10= | −3.4183667E−06 | 9.2837048E−06 | −4.5057349E−06 | 5.3944481E−05 |
| A12= | 5.0638571E−07 | −4.2636739E−06 | 6.4095662E−07 | −6.7402728E−06 |
| A14= | −4.0614980E−08 | 8.1195413E−07 | −4.5500475E−08 | 6.0033128E−07 |
| A16= | 1.2777147E−09 | −5.6255961E−08 | 1.3706079E−09 | −3.5845956E−08 |
| A18= | — | — | — | 1.2850651E−09 |
| A20= | — | — | — | −2.0792870E−11 |

| Surface # | 14 | 15 |
|---|---|---|
| k= | −7.9960900E+00 | −6.7408100E+00 |
| A4= | −1.3611799E−02 | −1.2311006E−02 |
| A6= | 2.2779409E−03 | 1.5396202E−03 |
| A8= | −3.7879387E−04 | −1.9577338E−04 |
| A10= | 5.0153722E−05 | 1.8860859E−05 |
| A12= | −5.4558008E−06 | −1.4372973E−06 |
| A14= | 4.6618507E−07 | 8.9480727E−08 |
| A16= | −2.8527549E−08 | −4.4763406E−09 |
| A18= | 1.0731949E−09 | 1.5243375E−10 |
| A20= | −1.8040026E−11 | −2.4286120E−12 |

In the 9th embodiment, the equation of the aspheric surface profiles of the aforementioned lens elements is the same as the equation of the 1st embodiment. Also, the definitions of these parameters shown in Table 9C are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Schematic Parameters | | | |
|---|---|---|---|
| f [mm] | 18.98 | Y6R2/Y1R1 | 1.02 |
| Fno | 2.63 | \|Dist\|max [%] | 0.99 |
| HFOV [deg.] | 15.0 | RU4f/RU4r | 1.65 |
| FOV [deg.] | 30.0 | \|f3 + f5\|/\|f2\| | 5.58 |
| Dra2r9/CT5 | 1.81 | DG1/DG2 | 0.45 |
| DG1/DG2f | 1.44 | \|R1/R2\| | 0.58 |

TABLE 9C-continued

| Schematic Parameters | | | |
|---|---|---|---|
| TL/EPD | 2.71 | 10 × (ImgH/SD + ImgH/TL) | 8.5 |
| f/f23 − \|f/f12\| + f/fG2f | −0.34 | \|f/fG1\| + \|f/fG2\| | 1.65 |
| 10 × T12/CTa | 0.93 | Tab [mm] | — |
| f/fG1 | 1.16 | Dra1r9/CT1 | 4.61 |
| \|R2/Ra2\| | 2.54 | 0.1 × CT2/Tab | — |
| \|R4\|/f + \|R6\|/f | 5.78 | f/f1 + f/f2 | 0.08 |
| T56/CT6 + TL/ImgH | 4.60 | \|R1\|/f + \|R9\|/f + \|R12\|/f | 1.82 |
| (V1 + V2)/Va | 3.48 | \|Ra2\|/f + \|Rb1\|/f | — |
| \|R3/Ra2\| | 2.83 | Dsr9/Dsr10 | 0.76 |
| f/f12 + f/f23 | 0.62 | 2 × ImgH/(Y1R1 + Y2R1) | 1.45 |
| ETa/ET5 | 1.64 | — | — |

10th Embodiment

Figure 19:
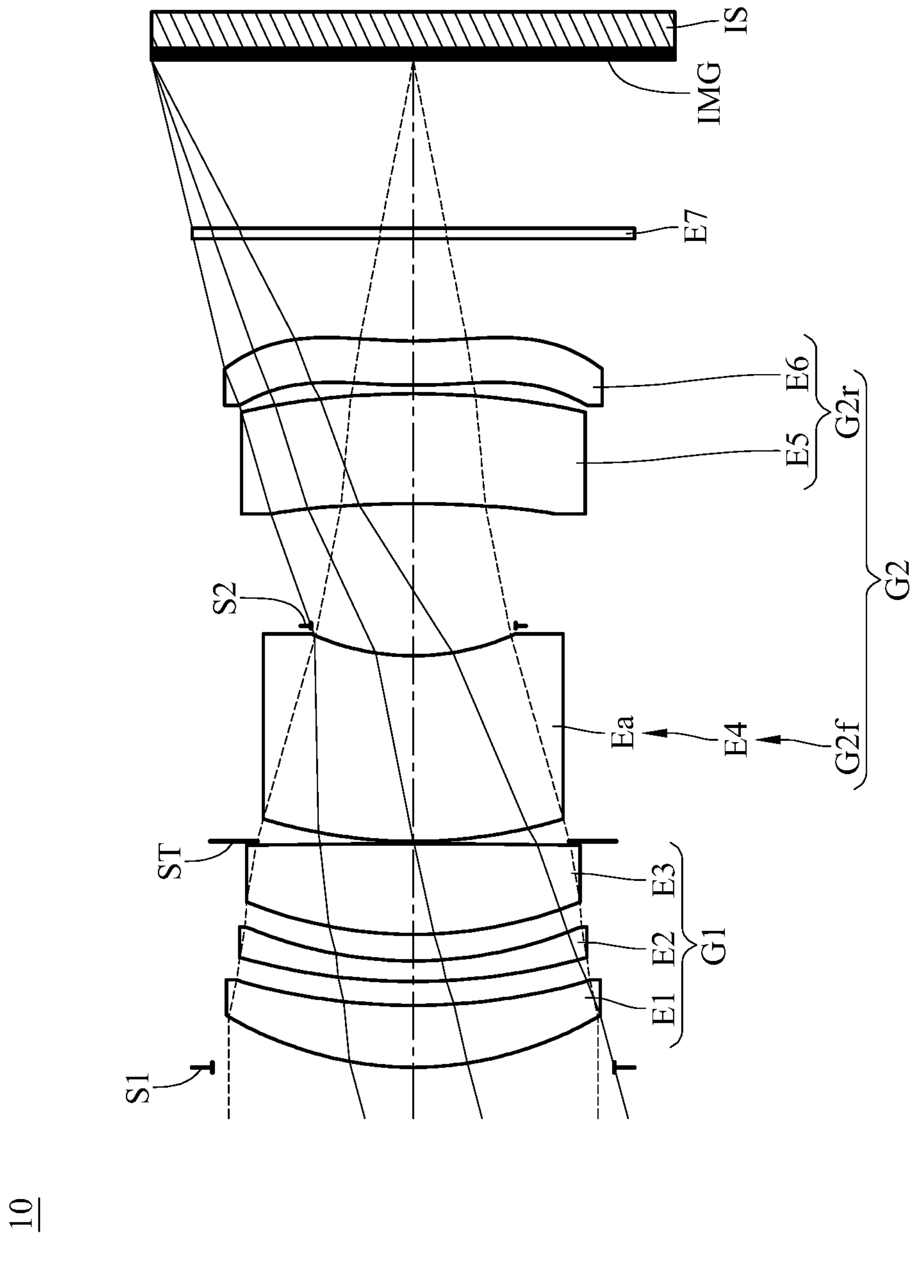
FIG. 19 is a schematic view of an image capturing unit according to the 10th embodiment of the present disclosure.
Figure 20:
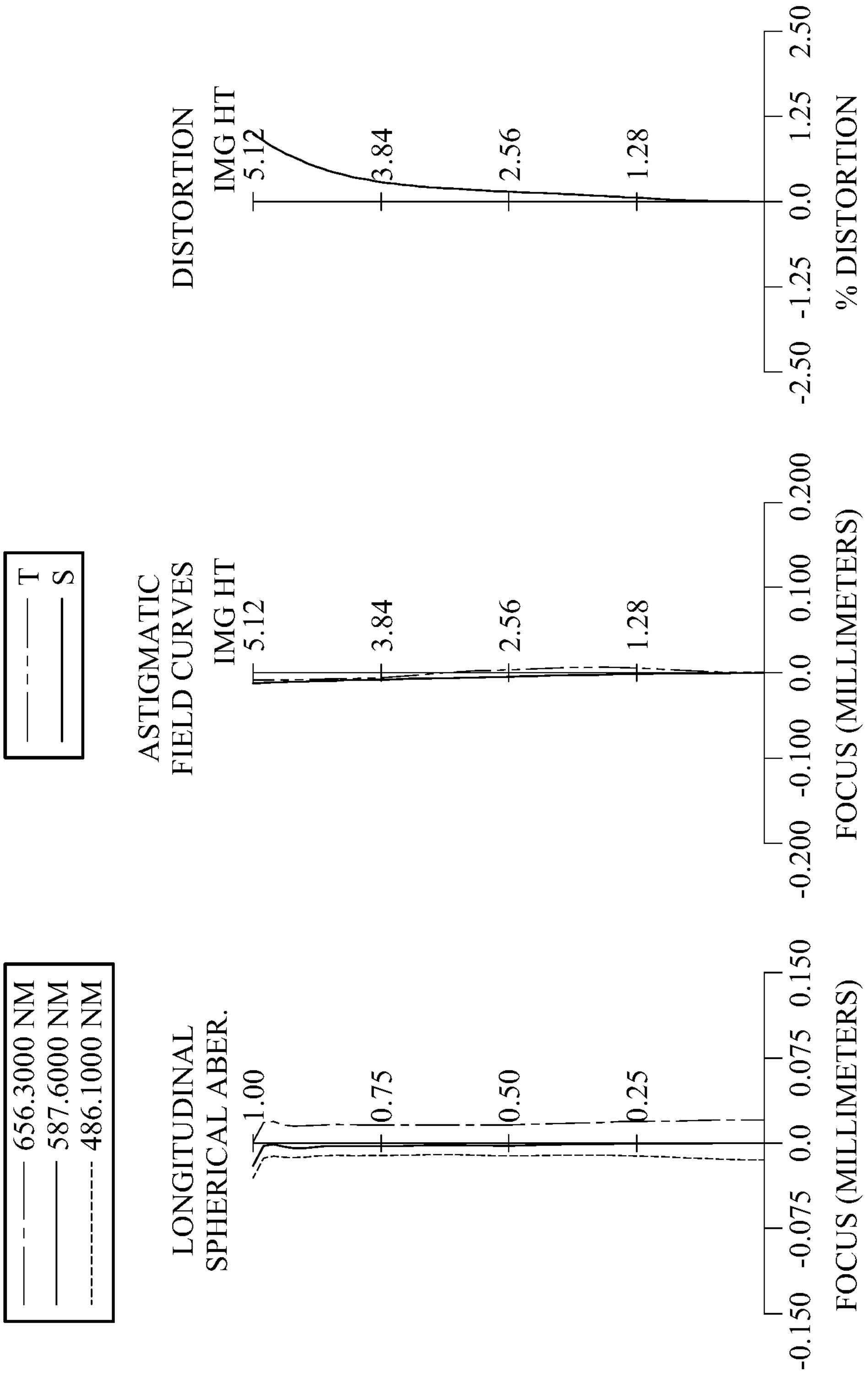
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the image capturing lens assembly (its reference numeral is omitted) of the present disclosure and an image sensor IS. The image capturing lens assembly includes, in order from an object side to an image side along an optical axis, a stop S1, a first lens unit E1, a second lens unit E2, a third lens unit E3, an aperture stop ST, a fourth lens unit E4, a stop S2, a fifth lens unit E5, a sixth lens unit E6, a filter E7 and an image surface IMG. Each of the first lens unit E1, the second lens unit E2, the third lens unit E3, the fourth lens unit E4, the fifth lens unit E5 and the sixth lens unit E6 is a single lens element. The fourth lens unit E4 includes a front lens element Ea. The first lens unit E1, the second lens unit E2 and the third lens unit E3 are included in a first lens group G1, the front lens element Ea of the fourth lens unit E4 is included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is six.

The first lens unit E1 with positive refractive power has an object-side surface being convex in a paraxial region thereof and an image-side surface being concave in a paraxial region thereof. The first lens unit E1 is made of plastic material and has the object-side surface and the image-side surface being both aspheric.

The second lens unit E2 with negative refractive power has an object-side surface being convex in a paraxial region thereof and an image-side surface being concave in a paraxial region thereof. The second lens unit E2 is made of plastic material and has the object-side surface and the image-side surface being both aspheric. The object-side surface of the second lens unit E2 has one inflection point. The image-side surface of the second lens unit E2 has one inflection point.

The third lens unit E3 with positive refractive power has an object-side surface being convex in a paraxial region thereof and an image-side surface being convex in a paraxial region thereof. The third lens unit E3 is made of glass material and has the object-side surface and the image-side surface being both spherical.

The front lens element Ea with negative refractive power has an object-side surface being convex in a paraxial region thereof and an image-side surface being concave in a paraxial region thereof. The fourth lens unit E4 is made of plastic material and has the object-side surface and the image-side surface being both aspheric.

The fifth lens unit E5 with positive refractive power has an object-side surface being concave in a paraxial region thereof and an image-side surface being convex in a paraxial region thereof. The fifth lens unit E5 is made of plastic material and has the object-side surface and the image-side surface being both aspheric.

The sixth lens unit E6 with negative refractive power has an object-side surface being convex in a paraxial region thereof and an image-side surface being concave in a paraxial region thereof. The sixth lens unit E6 is made of plastic material and has the object-side surface and the image-side surface being both aspheric. The object-side surface of the sixth lens unit E6 has one inflection point. The image-side surface of the sixth lens unit E6 has one inflection point.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 10th embodiment are shown in Table 10A and the aspheric surface data are shown in Table 10B below.

TABLE 10A

| 10th Embodiment<br>f = 18.98 mm, Fno = 2.63, HFOV = 15.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Stop | Plano | 0.000 | | | | |
| 2 | Lens unit 1 | 6.7491 (ASP) | 1.213 | Plastic | 1.545 | 56.1 | 26.36 |
| 3 | | 11.9225 (ASP) | 0.470 | | | | |
| 4 | Lens unit 2 | 11.9581 (ASP) | 0.402 | Plastic | 1.614 | 25.6 | −39.59 |
| 5 | | 7.9117 (ASP) | 0.516 | | | | |
| 6 | Lens unit 3 | 8.6408 (SPH) | 1.778 | Glass | 1.497 | 81.6 | 16.80 |
| 7 | | −232.2022 (SPH) | 0.050 | | | | |
| 8 | Ape. Stop | Plano | 0.000 | | | | |
| 9 | Front lens of Lens unit 4 | 9.5750 (ASP) | 3.634 | Plastic | 1.639 | 23.5 | −21.71 |

TABLE 10A-continued

| 10th Embodiment f = 18.98 mm, Fno = 2.63, HFOV = 15.0 deg. | | | | | | | |
|---|---|---|---|---|---|---|---|
| Surface # | | Curvature Radius | Thickness | Material | Index | Abbe # | Focal Length |
| 10 | | 4.8262 (ASP) | 0.588 | | | | |
| 11 | Stop | Plano | 2.394 | | | | |
| 12 | Lens unit 5 | −19.9450 (ASP) | 2.155 | Plastic | 1.669 | 19.5 | 90.76 |
| 13 | | −15.6640 (ASP) | 0.168 | | | | |
| 14 | Lens unit 6 | 10.7809 (ASP) | 0.863 | Plastic | 1.534 | 56.0 | −198.22 |
| 15 | | 9.5121 (ASP) | 2.000 | | | | |
| 16 | Filter | Plano | 0.210 | Glass | 1.517 | 64.2 | – |
| 17 | | Plano | 3.295 | | | | |
| 18 | Image | Plano | — | | | | |

Note:
Reference wavelength is 587.6 nm (d-line).
An effective radius of the stop S1 (Surface 1) is 3.934 mm.
An effective radius of the stop S2 (Surface 11) is 2.000 mm.

TABLE 10B

| Aspheric Coefficients | | | | |
|---|---|---|---|---|
| Surface # | 2 | 3 | 4 | 5 |
| k= | −2.9225400E−01 | −1.8431200E+00 | 8.2540700E+00 | −2.4983600E−01 |
| A4= | −3.2073299E−04 | −7.5332271E−04 | −2.9133192E−03 | −2.3694045E−03 |
| A6= | 3.7198112E−05 | 3.8647431E−04 | 1.0555238E−03 | 9.1634341E−04 |
| A8= | −1.1442429E−05 | −1.1362208E−04 | −2.8558522E−04 | −2.3343110E−04 |
| A10= | 1.5669009E−06 | 1.8280737E−05 | 4.6093959E−05 | 3.9013880E−05 |
| A12= | −1.0454765E−07 | −1.6266443E−06 | −4.3843064E−06 | −3.8859069E−06 |
| A14= | 3.3722004E−09 | 7.5768547E−08 | 2.2130897E−07 | 2.0549474E−07 |
| A16= | −2.0846838E−11 | −1.4048596E−09 | −4.6346553E−09 | −4.4901516E−09 |
| Surface # | 9 | 10 | 12 | 13 |
| k= | −1.0787500E+01 | −6.4683200E−01 | −5.8921800E+00 | −9.0000000E+01 |
| A4= | 7.3093677E−04 | 1.8307831E−04 | 1.2522405E−03 | −2.4578490E−03 |
| A6= | 3.4020225E−05 | 3.1131279E−05 | −3.8333224E−04 | 2.3535397E−04 |
| A8= | −1.6535348E−05 | 5.2313986E−05 | 5.6226825E−05 | 2.4264459E−05 |
| A10= | 4.5710555E−06 | −1.6981475E−05 | −7.1288829E−06 | −1.1537081E−05 |
| A12= | −6.1260590E−07 | 3.3644880E−06 | 5.4328742E−07 | 1.4136888E−06 |
| A14= | 4.1876313E−08 | −2.6546378E−07 | −1.9878532E−08 | −5.7804814E−08 |
| A16= | −1.1899628E−09 | 2.4410341E−09 | 1.7092756E−10 | −2.9574871E−09 |
| A18= | — | — | — | 3.6581638E−10 |
| A20= | — | — | — | −9.8891499E−12 |

| Surface # | 14 | 15 |
|---|---|---|
| k= | −2.8436700E+01 | −4.0556900E+01 |
| A4= | −8.5811194E−03 | −5.9719201E−03 |
| A6= | 1.2105306E−04 | −3.7612240E−04 |
| A8= | 1.0913176E−04 | 1.7732661E−04 |
| A10= | −1.8509354E−05 | −3.3009153E−05 |
| A12= | 2.1539160E−07 | 3.6971919E−06 |
| A14= | 2.6443787E−07 | −2.6442656E−07 |
| A16= | −3.3909301E−08 | 1.1815188E−08 |
| A18= | 1.7897294E−09 | −3.0135398E−10 |
| A20= | −3.5789173E−11 | 3.4076087E−12 |

In the 10th embodiment, the equation of the aspheric surface profiles of the aforementioned lens elements is the same as the equation of the 1st embodiment. Also, the definitions of these parameters shown in Table 10C are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

| Schematic Parameters | | | |
|---|---|---|---|
| f [mm] | 18.98 | Y6R2/Y1R1 | 0.97 |
| Fno | 2.63 | \|Dist\|max [%] | 0.99 |
| HFOV [deg.] | 15.0 | RU4f/RU4r | 1.98 |
| FOV [deg.] | 29.9 | \|f3 + f5\|/\|f2\| | 2.72 |
| Dra2r9/CT5 | 1.38 | DG1/DG2 | 0.45 |
| DG1/DG2f | 1.21 | \|R1/R2\| | 0.57 |
| TL/EPD | 2.73 | 10 × (ImgH/SD + ImgH/TL) | 7.8 |
| f/f23 − \|f/f12\| + f/fG2f | −0.52 | \|f/fG1\| + \|f/fG2\| | 2.04 |
| 10 × T12/CTa | 1.29 | Tab [mm] | — |

TABLE 10C-continued

| Schematic Parameters | | | |
|---|---|---|---|
| f/fG1 | 1.30 | Dra1r9/CT1 | 5.45 |
| R2/Ra2\| | 2.47 | 0.1 × CT2/Tab | — |
| \|R4\|/f + \|R6\|/f | 12.65 | f/f1 + f/f2 | 0.24 |
| T56/CT6 + TL/ImgH | 4.05 | \|R1\|/f + \|R9\|/f + \|R12\|/f | 1.91 |
| (V1 + V2)/Va | 3.48 | \|Ra2\|/f + \|Rb1\|/f | — |
| \|R3/Ra2\| | 2.48 | Dsr9/Dsr10 | 0.75 |
| f/f12 + f/f23 | 0.95 | 2 × ImgH/(Y1R1 + Y2R1) | 1.39 |
| ETa/ET5 | 1.82 | — | — |

11th Embodiment

Figure 21:
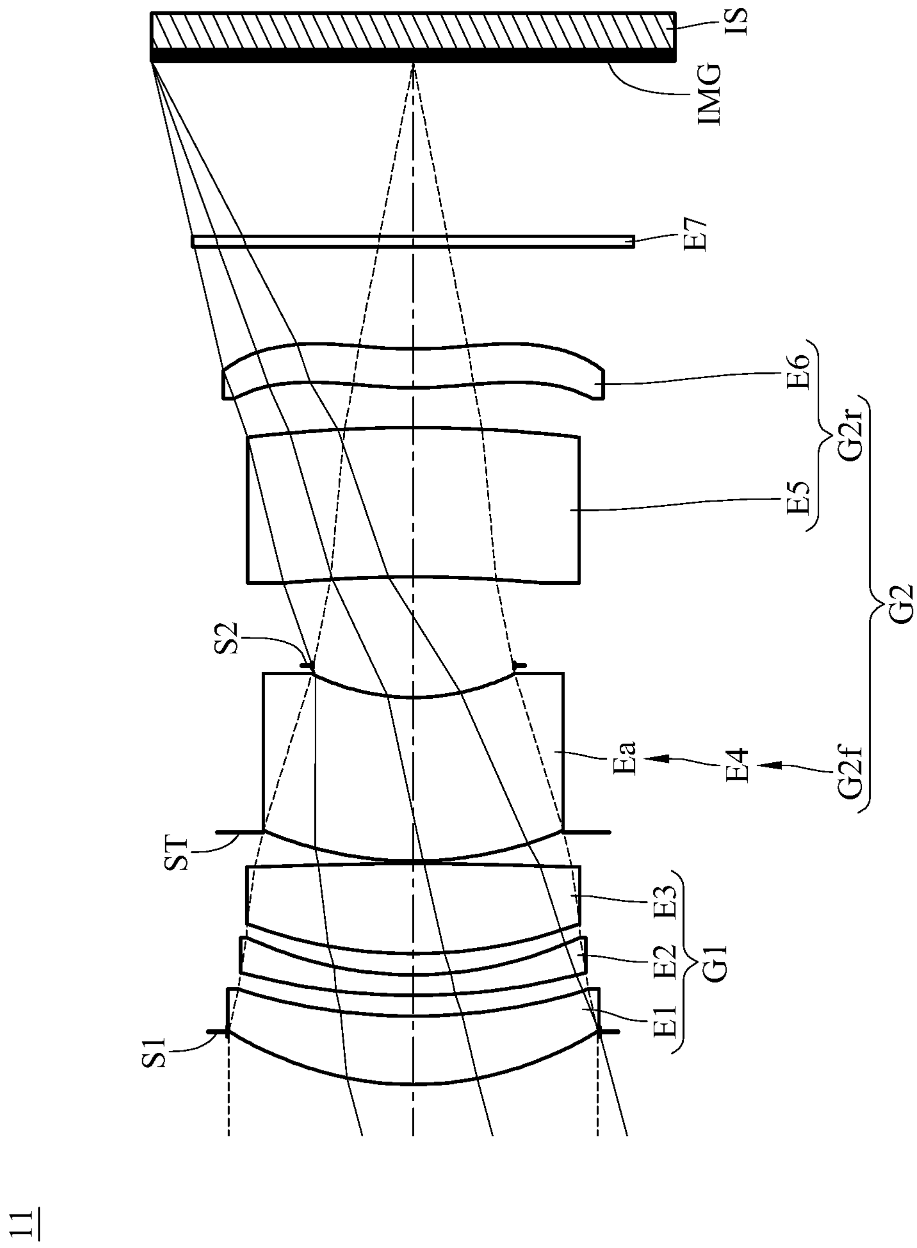
FIG. 21 is a schematic view of an image capturing unit according to the 11th embodiment of the present disclosure.
Figure 22:
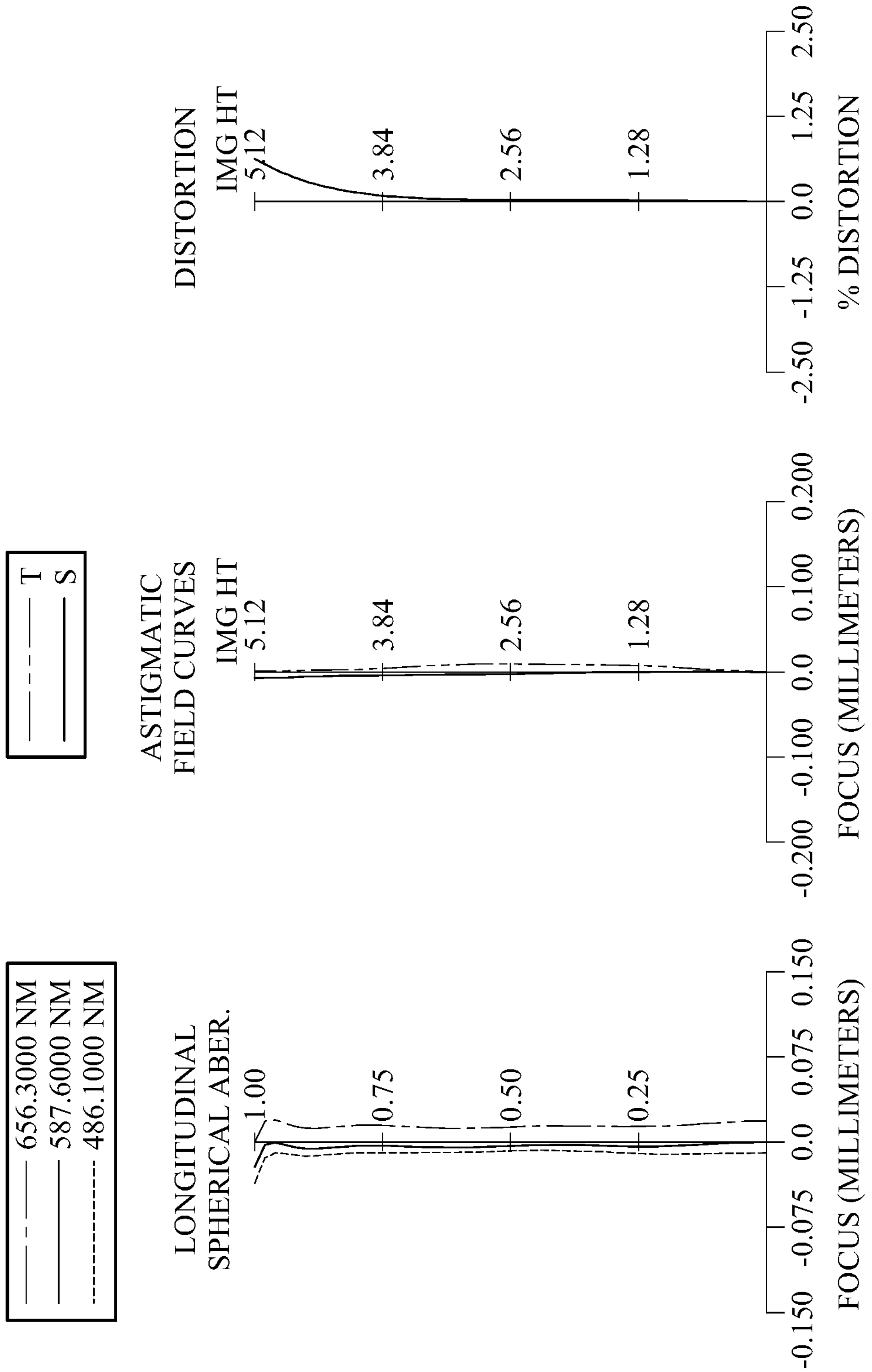
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit 11 includes the image capturing lens assembly (its reference numeral is omitted) of the present disclosure and an image sensor IS. The image capturing lens assembly includes, in order from an object side to an image side along an optical axis, a stop S1, a first lens unit E1, a second lens unit E2, a third lens unit E3, an aperture stop ST, a fourth lens unit E4, a stop S2, a fifth lens unit E5, a sixth lens unit E6, a filter E7 and an image surface IMG. Each of the first lens unit E1, the second lens unit E2, the third lens unit E3, the fourth lens unit E4, the fifth lens unit E5 and the sixth lens unit E6 is a single lens element. The fourth lens unit E4 includes a front lens element Ea. The first lens unit E1, the second lens unit E2 and the third lens unit E3 are included in a first lens group G1, the front lens element Ea of the fourth lens unit E4 is included in a front lens group G2f of a second lens group G2, and the fifth lens unit E5 and the sixth lens unit E6 are included in a rear lens group G2r of the second lens group G2. The image capturing lens assembly includes two lens groups (G1 and G2), and the two lens groups include six lens units (E1, E2, E3, E4, E5 and E6) with no additional lens element disposed between each of the adjacent six lens units. The total number of lens groups of the image capturing lens assembly is two. The total number of lens units of the image capturing lens assembly is six. The total number of lens elements of the image capturing lens assembly is six.

The first lens unit E1 with positive refractive power has an object-side surface being convex in a paraxial region thereof and an image-side surface being concave in a paraxial region thereof. The first lens unit E1 is made of plastic material and has the object-side surface and the image-side surface being both aspheric.

The second lens unit E2 with negative refractive power has an object-side surface being convex in a paraxial region thereof and an image-side surface being concave in a paraxial region thereof. The second lens unit E2 is made of plastic material and has the object-side surface and the image-side surface being both aspheric. The object-side surface of the second lens unit E2 has one inflection point. The image-side surface of the second lens unit E2 has one inflection point.

The third lens unit E3 with positive refractive power has an object-side surface being convex in a paraxial region thereof and an image-side surface being convex in a paraxial region thereof. The third lens unit E3 is made of glass material and has the object-side surface and the image-side surface being both spherical.

The front lens element Ea with negative refractive power has an object-side surface being convex in a paraxial region thereof and an image-side surface being concave in a paraxial region thereof. The fourth lens unit E4 is made of plastic material and has the object-side surface and the image-side surface being both aspheric.

The fifth lens unit E5 with negative refractive power has an object-side surface being concave in a paraxial region thereof and an image-side surface being convex in a paraxial region thereof. The fifth lens unit E5 is made of plastic material and has the object-side surface and the image-side surface being both aspheric. The image-side surface of the fifth lens unit E5 has one inflection point.

The sixth lens unit E6 with positive refractive power has an object-side surface being convex in a paraxial region thereof and an image-side surface being concave in a paraxial region thereof. The sixth lens unit E6 is made of plastic material and has the object-side surface and the image-side surface being both aspheric. The object-side surface of the sixth lens unit E6 has one inflection point. The image-side surface of the sixth lens unit E6 has one inflection point.

The filter E7 is made of glass material and located between the sixth lens unit E6 and the image surface IMG, and will not affect the focal length of the image capturing lens assembly. The image sensor IS is disposed on or near the image surface IMG of the image capturing lens assembly.

The detailed optical data of the 11th embodiment are shown in Table 11A and the aspheric surface data are shown in Table 11B below.

TABLE 11A

| 11th Embodiment<br>f = 18.98 mm, Fno = 2.63, HFOV = 15.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Stop | Plano | −1.037 | | | | |
| 2 | Lens unit 1 | 6.4391 (ASP) | 1.340 | Plastic | 1.545 | 56.1 | 25.37 |
| 3 | | 11.1667 (ASP) | 0.407 | | | | |
| 4 | Lens unit 2 | 12.3175 (ASP) | 0.400 | Plastic | 1.614 | 25.6 | −27.64 |
| 5 | | 7.0480 (ASP) | 0.414 | | | | |
| 6 | Lens unit 3 | 9.3823 (SPH) | 1.766 | Glass | 1.497 | 81.6 | 16.91 |
| 7 | | −75.3819 (SPH) | 0.611 | | | | |
| 8 | Ape. Stop | Plano | −0.561 | | | | |
| 9 | Front lens of Lens unit 4 | 7.1845 (ASP) | 3.205 | Plastic | 1.639 | 23.5 | −32.82 |
| 10 | | 4.4202 (ASP) | 0.624 | | | | |

TABLE 11A-continued

| 11th Embodiment f = 18.98 mm, Fno = 2.63, HFOV = 15.0 deg. | | | | | | | |
|---|---|---|---|---|---|---|---|
| Surface # | | Curvature Radius | Thickness | Material | Index | Abbe # | Focal Length |
| 11 | Stop | Plano | 1.735 | | | | |
| 12 | Lens unit 5 | −27.0791 (ASP) | 2.927 | Plastic | 1.669 | 19.5 | −637.91 |
| 13 | | −30.1664 (ASP) | 0.780 | | | | |
| 14 | Lens unit 6 | 7.5830 (ASP) | 0.761 | Plastic | 1.534 | 56.0 | 151.21 |
| 15 | | 8.0760 (ASP) | 2.000 | | | | |
| 16 | Filter | Plano | 0.210 | Glass | 1.517 | 64.2 | — |
| 17 | | Plano | 3.424 | | | | |
| 18 | Image | Plano | — | | | | |

Note:
Reference wavelength is 587.6 nm (d-line).
An effective radius of the stop S1 (Surface 1) is 3.640 mm.
An effective radius of the stop S2 (Surface 11) is 1.980 mm.

TABLE 11B

| Aspheric Coefficients | | | | |
|---|---|---|---|---|
| Surface # | 2 | 3 | 4 | 5 |
| k= | −2.7593700E−01 | −1.1690400E+00 | 8.3128100E+00 | −4.4782600E−01 |
| A4= | −2.0725543E−04 | −3.4716854E−04 | −3.0409174E−03 | −2.9430003E−03 |
| A6= | 4.5292451E−06 | 2.0333479E−04 | 8.8268401E−04 | 8.7533005E−04 |
| A8= | −4.9749467E−06 | −6.7082271E−05 | −1.8615216E−04 | −1.5426775E−04 |
| A10= | 5.3578623E−07 | 1.1290558E−05 | 2.6367672E−05 | 2.0413360E−05 |
| A12= | −5.3153300E−09 | −1.0093611E−06 | −2.4296619E−06 | −1.8940521E−06 |
| A14= | −1.5622426E−09 | 4.5891758E−08 | 1.2227633E−07 | 9.9084411E−08 |
| A16= | 7.8118850E−11 | −7.8181476E−10 | −2.5639380E−09 | −2.1859148E−09 |
| Surface # | 9 | 10 | 12 | 13 |
| k= | −6.3112300E+00 | −6.4789000E−01 | −2.2057700E+01 | −8.5231000E+01 |
| A4= | 1.1944680E−03 | 1.9576779E−04 | 2.4159636E−04 | −2.3145947E−03 |
| A6= | −1.7695981E−05 | 1.4730265E−04 | −4.7354762E−05 | 7.0480639E−04 |
| A8= | 1.3307408E−05 | −6.2314595E−05 | −2.1264231E−06 | −1.2295728E−04 |
| A10= | −3.3543725E−06 | 4.5085241E−05 | −2.1339263E−06 | 1.3051540E−05 |
| A12= | 5.0986218E−07 | −1.4897345E−05 | 7.2755339E−07 | −7.3624284E−07 |
| A14= | −4.0116323E−08 | 2.5013062E−06 | −9.5016109E−08 | −7.9656572E−09 |
| A16= | 1.2473650E−09 | −1.6487676E−07 | 5.0787758E−09 | 4.1137196E−09 |
| A18= | — | — | — | −2.3463234E−10 |
| A20= | — | — | — | 4.7227286E−12 |
| Surface # | 14 | 15 | | |
| k= | −7.1719600E+00 | −8.8549300E+00 | | |
| A4= | −1.2218779E−02 | −1.0825085E−02 | | |
| A6= | 1.5494806E−03 | 1.0727658E−03 | | |
| A8= | −2.0439101E−04 | −1.1462785E−04 | | |
| A10= | 2.8575249E−05 | 1.1332903E−05 | | |
| A12= | −4.3861965E−06 | −1.2515476E−06 | | |
| A14= | 5.3395425E−07 | 1.2363836E−07 | | |
| A16= | −4.1818901E−08 | −8.3143593E−09 | | |
| A18= | 1.8070479E−09 | 3.0995190E−10 | | |
| A20= | −3.2100054E−11 | −4.6692316E−12 | | |

In the 11th embodiment, the equation of the aspheric surface profiles of the aforementioned lens elements is the same as the equation of the 1st embodiment. Also, the definitions of these parameters shown in Table 11C are the same as those stated in the 1st embodiment with corresponding values for the 11th embodiment, so an explanation in this regard will not be provided again.

Moreover, these parameters can be calculated from Table 11A and Table 11B as the following values and satisfy the following conditions:

TABLE 11C

| Schematic Parameters | | | |
|---|---|---|---|
| f [mm] | 18.98 | Y6R2/Y1R1 | 1.02 |
| Fno | 2.63 | \|Dist\|max [%] | 0.63 |
| HFOV [deg.] | 15.0 | RU4f/RU4r | 1.63 |
| FOV [deg.] | 30.0 | \|f3 + f5\|/\|f2\| | 22.47 |
| Dra2r9/CT5 | 0.81 | DG1/DG2 | 0.43 |
| DG1/DG2f | 1.35 | \|R1/R2\| | 0.58 |
| TL/EPD | 2.78 | 10 × (ImgH/SD + ImgH/TL) | 8.0 |
| f/f23 − \|f/f12\| + f/fG2f | −0.27 | \|f/fG1\| + \|f/fG2\| | 1.61 |
| 10 × T12/CTa | 1.27 | Tab [mm] | — |
| f/fG1 | 1.13 | Dra1r9/CT1 | 4.15 |

TABLE 11C-continued

| Schematic Parameters | | | |
| --- | --- | --- | --- |
| \|R2/Ra2\| | 2.53 | 0.1 × CT2/Tab | — |
| \|R4\|/f + \|R6\|/f | 4.34 | f/f1 + f/f2 | 0.06 |
| T56/CT6 + TL/ImgH | 4.94 | \|R1\|/f + \|R9\|/f + \|R12\|/f | 2.19 |
| (V1 + V2)/Va | 3.48 | \|Ra2\|/f + \|Rb1\|/f | — |
| \|R3/Ra2\| | 2.79 | Dsr9/Dsr10 | 0.63 |
| f/f12 + f/f23 | 0.58 | 2 × ImgH/(Y1R1 + Y2R1) | 1.46 |
| ETa/ET5 | 1.08 | — | — |

12th Embodiment

Figure 23:
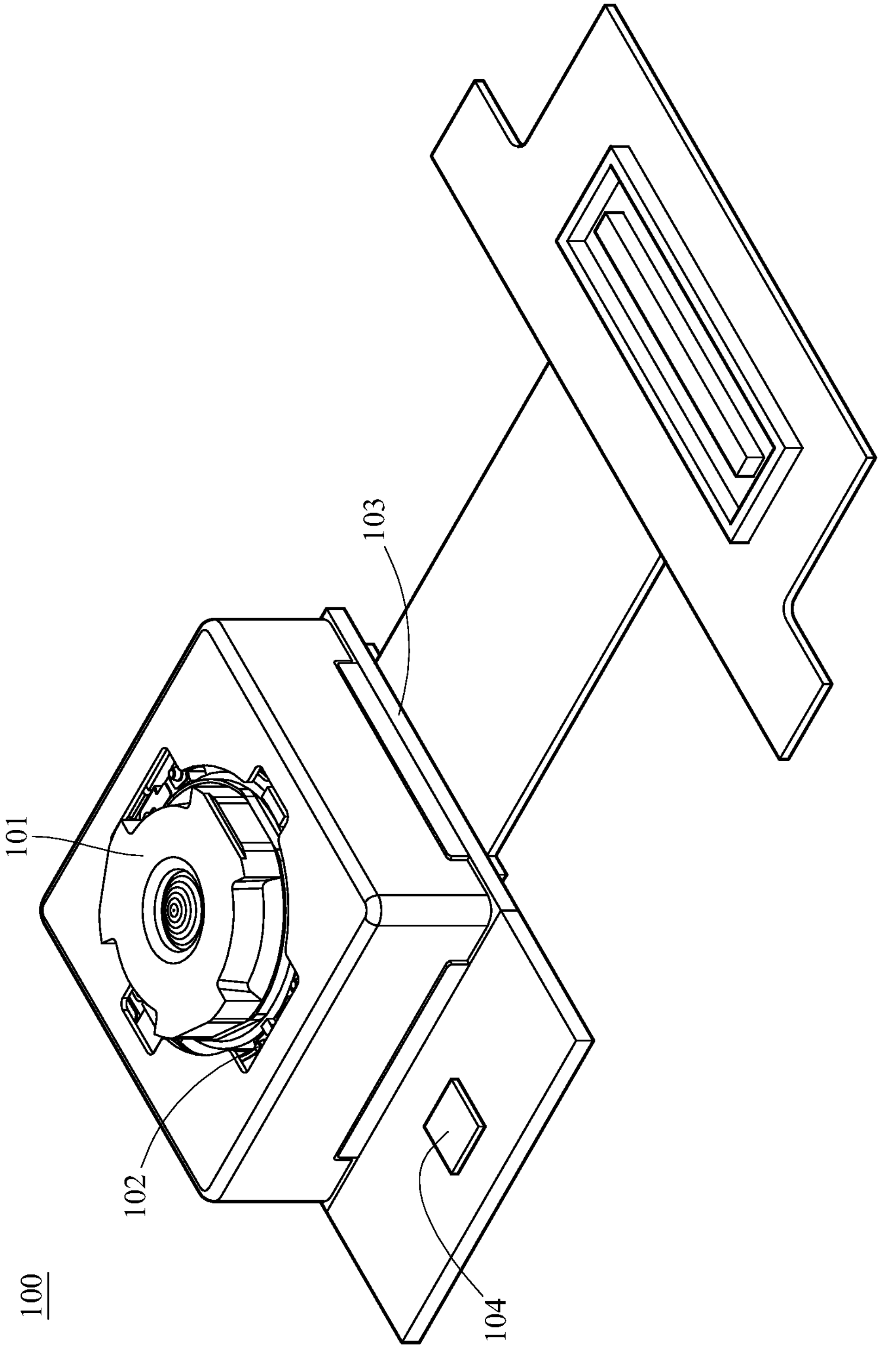
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 100 is a camera module including a lens unit 101, a driving device 102, an image sensor 103 and an image stabilizer 104. The lens unit 101 includes the image capturing lens assembly disclosed in the 1st embodiment, a barrel and a holder member (their reference numerals are omitted) for holding the image capturing lens assembly. However, the lens unit 101 may alternatively be provided with the image capturing lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the image capturing lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

13th Embodiment

Figure 24:
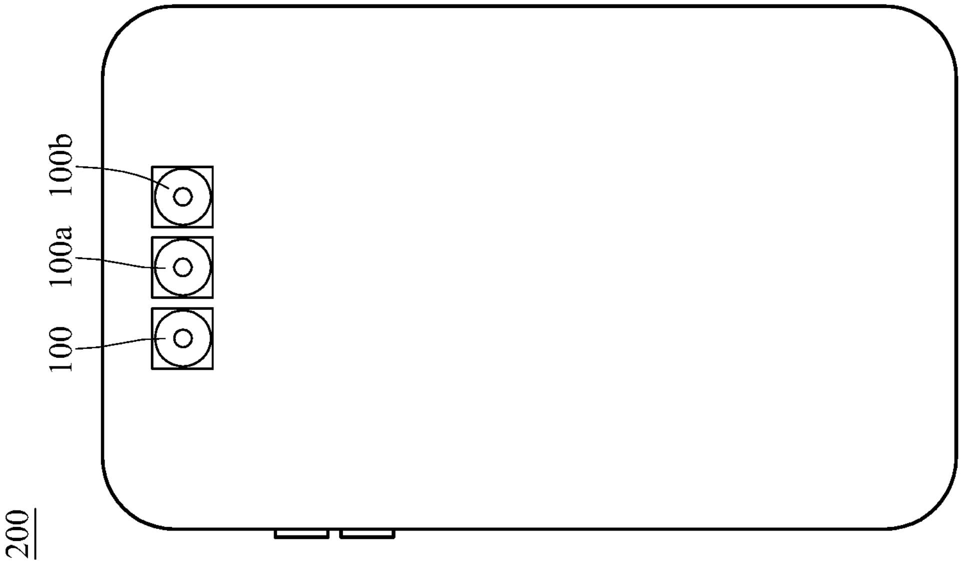
FIG. 24 is one perspective view of an electronic device according to the 13th embodiment of the present disclosure.
Figure 25:
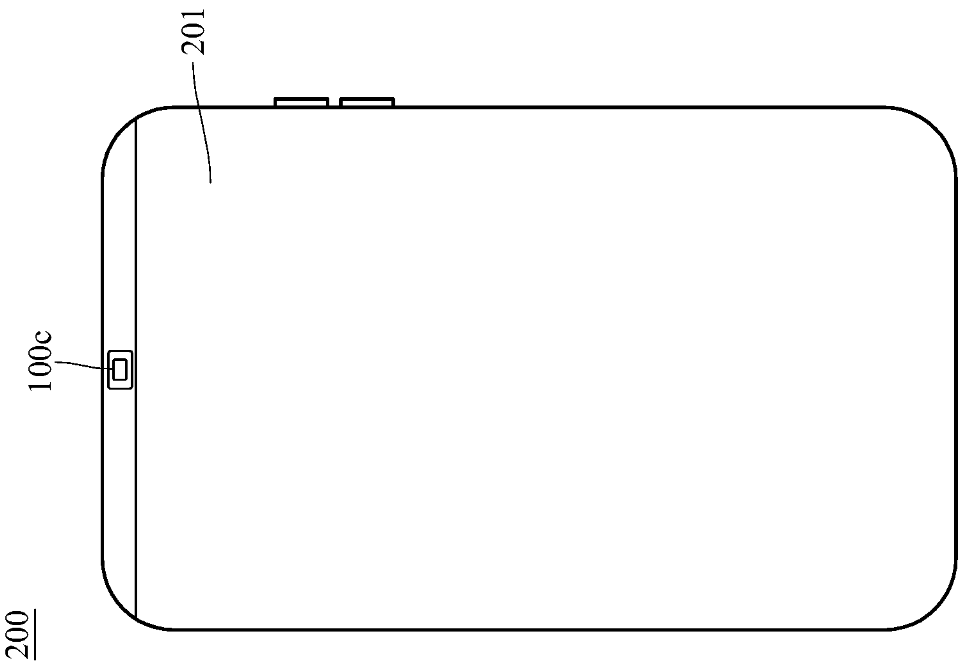
FIG. 25 is another perspective view of the electronic device in FIG. 24.

FIG. 24 is one perspective view of an electronic device according to the 13th embodiment of the present disclosure. FIG. 25 is another perspective view of the electronic device in FIG. 24.

In this embodiment, an electronic device 200 is a smartphone including the image capturing unit 100 disclosed in the 12th embodiment, an image capturing unit 100*a*, an image capturing unit 100*b*, an image capturing unit 100*c* and a display unit 201. As shown in FIG. 24, the image capturing unit 100, the image capturing unit 100*a* and the image capturing unit 100*b* are disposed on the same side of the electronic device 200 and face the same side, and each of the image capturing units 100, 100*a* and 100*b* has a single focal point. As shown in FIG. 25, the image capturing unit 100*c* and the display unit 201 are disposed on the opposite side of the electronic device 200, such that the image capturing unit 100*c* can be a front-facing camera of the electronic device 200 for taking selfies, but the present disclosure is not limited thereto. Furthermore, each of the image capturing units 100*a*, 100*b* and 100*c* can include the image capturing lens assembly of the present disclosure and can have a configuration similar to that of the image capturing unit 100. In detail, each of the image capturing units 100*a*, 100*b* and 100*c* can include a lens unit, a driving device, an image sensor and an image stabilizer, and each of the lens unit can include an image capturing lens assembly such as the image capturing lens assembly of the present disclosure, a barrel and a holder member for holding the image capturing lens assembly.

The image capturing unit 100 is a telephoto image capturing unit, the image capturing unit 100*a* is a wide-angle image capturing unit, the image capturing unit 100*b* is an ultra-wide-angle image capturing unit, and the image capturing unit 100*c* is a wide-angle image capturing unit. In this embodiment, the image capturing units 100, 100*a* and 100*b* have different fields of view, such that the electronic device 200 can have various magnification ratios so as to meet the requirement of optical zoom functionality. Moreover, as shown in FIG. 25, the image capturing unit 100*c* can have a non-circular opening, and the lens barrel or the lens elements in the image capturing unit 100*c* can have one or more trimmed edges at outer diameter positions thereof for corresponding to the non-circular opening. Therefore, it is favorable for further reducing the length of the image capturing unit 100*c* along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100*a*, 100*b* and 100*c*, but the present disclosure is not limited to the number and arrangement of image capturing units.

14th Embodiment

Figure 26:
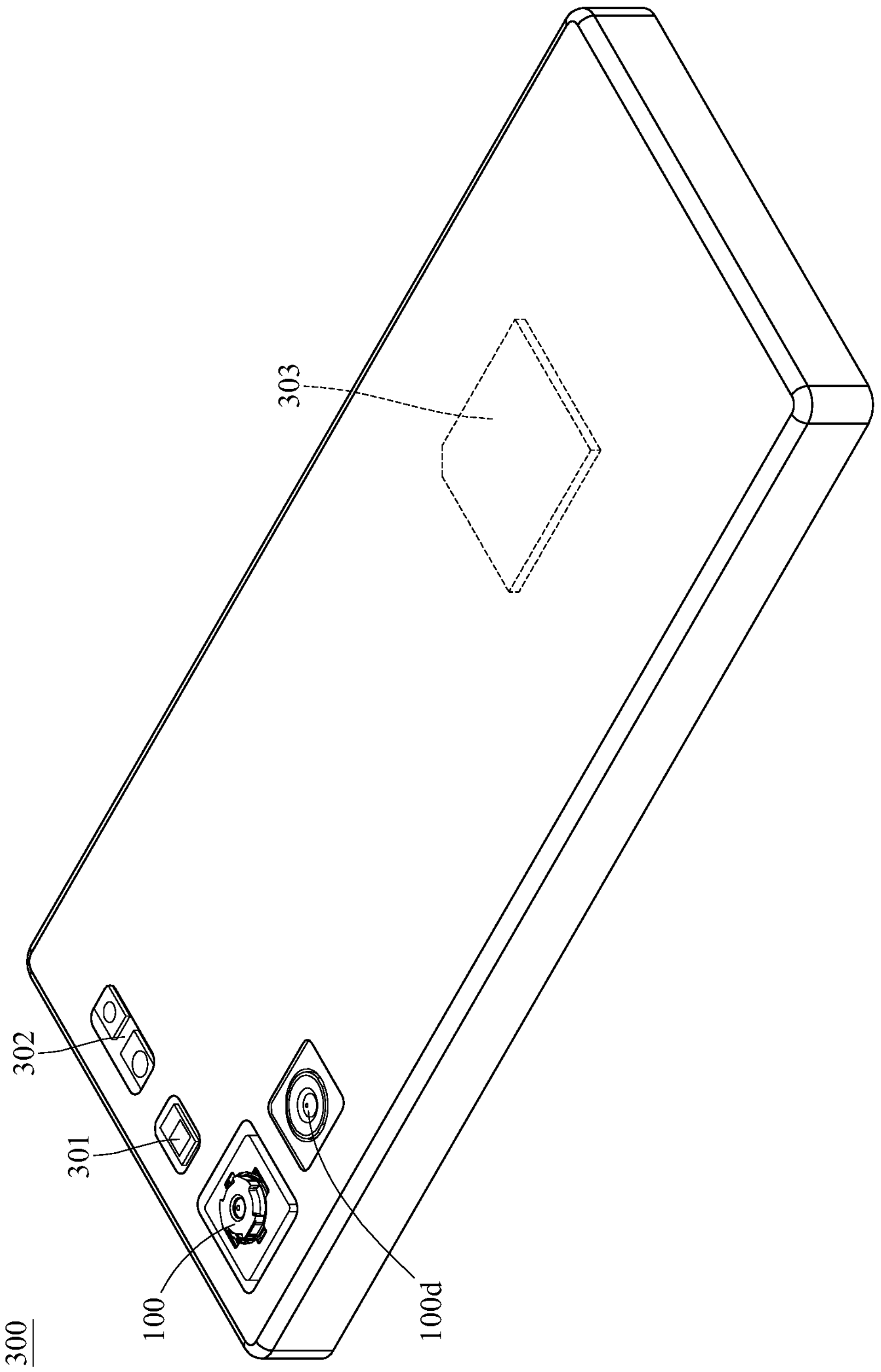
FIG. 26 is one perspective view of an electronic device according to the 14th embodiment of the present disclosure.
Figure 27:
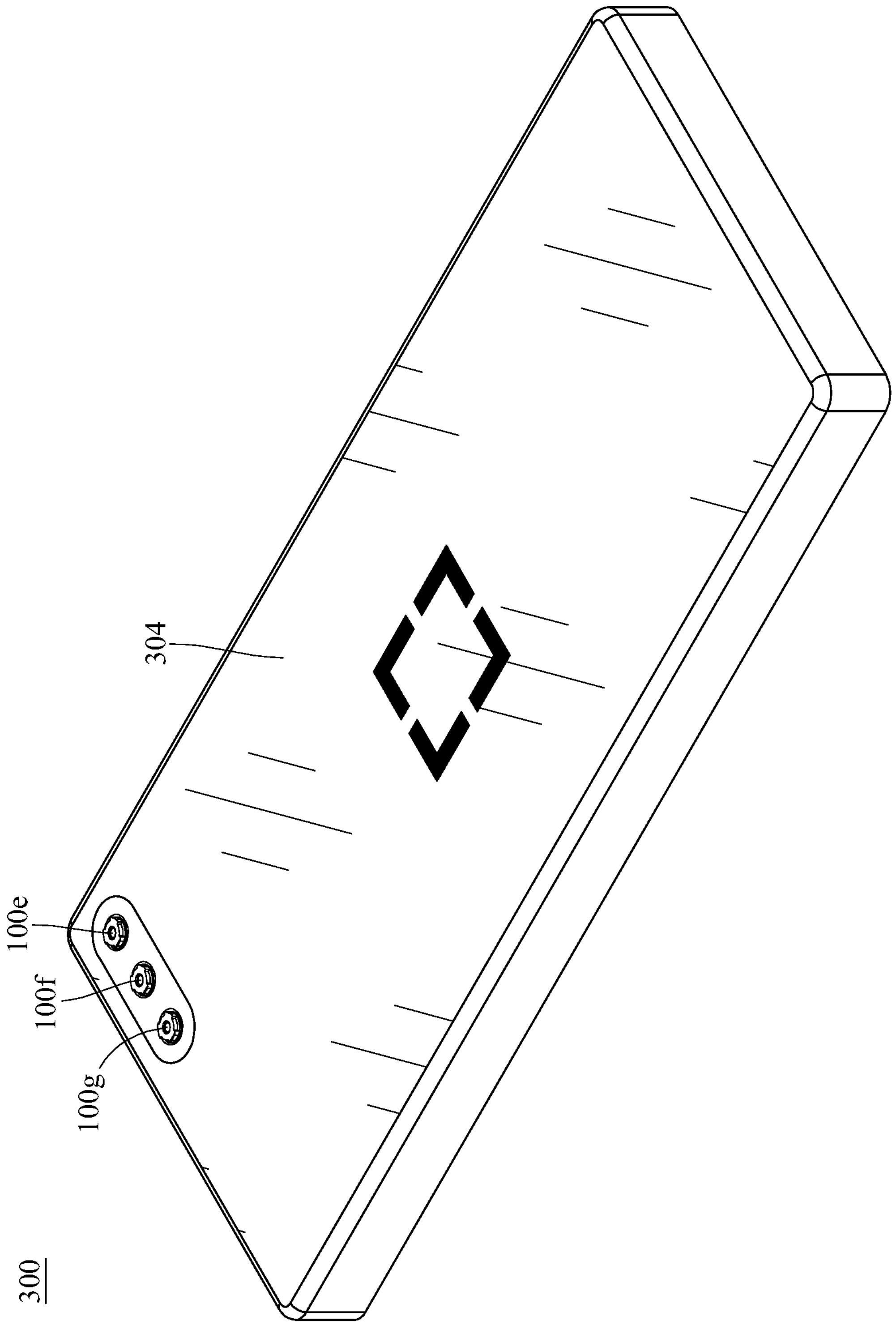
FIG. 27 is another perspective view of the electronic device in FIG. 26.
Figure 28:
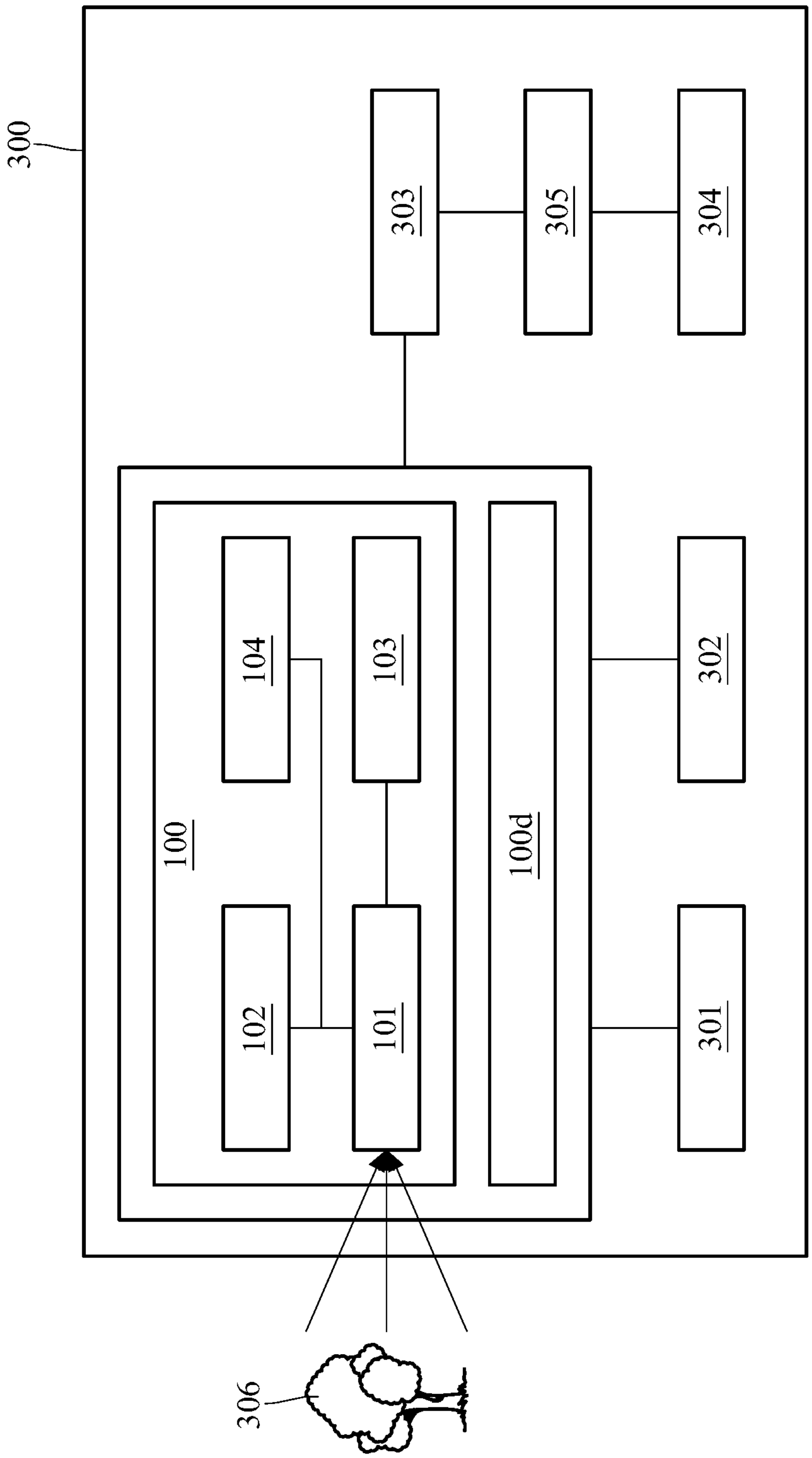
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26.

In this embodiment, an electronic device 300 is a smartphone including the image capturing unit 100 disclosed in the 12th embodiment, an image capturing unit 100*d*, an image capturing unit 100*e*, an image capturing unit 100*f*, an image capturing unit 100*g*, a flash module 301, a focus assist module 302, an image signal processor 303, a display module 304 and an image software processor 305. The image capturing unit 100 and the image capturing unit 100*d* are disposed on the same side of the electronic device 300. The focus assist module 302 can be a laser rangefinder or a ToF (time of flight) module, but the present disclosure is not limited thereto. The image capturing unit 100*e*, the image capturing unit 100*f*, the image capturing unit 100*g* and the display module 304 are disposed on the opposite side of the electronic device 300, and the display module 304 can be a user interface, such that the image capturing units 100*e*, 100*f*, 100*g* can be front-facing cameras of the electronic device 300 for taking selfies, but the present disclosure is not limited thereto. Furthermore, each of the image capturing units 100*d*, 100*e*, 100*f* and 100*g* can include the image capturing lens assembly of the present disclosure and can have a configuration similar to that of the image capturing unit 100. In detail, each of the image capturing units 100*d*, 100*e*, 100*f* and 100*g* can include a lens unit, a driving device, an image sensor and an image stabilizer, and each of the lens unit can include an image capturing lens assembly such as the image capturing lens assembly of the present disclosure, a barrel and a holder member for holding the image capturing lens assembly.

The image capturing unit 100 is a telephoto image capturing unit, the image capturing unit 100*d* is a wide-angle image capturing unit, the image capturing unit 100*e* is a wide-angle image capturing unit, the image capturing unit 100*f* is an ultra-wide-angle image capturing unit, and the image capturing unit 100*g* is a ToF image capturing unit. In this embodiment, the image capturing units 100 and 100*d* have different fields of view, such that the electronic device 300 can have various magnification ratios so as to meet the requirement of optical zoom functionality. In addition, the image capturing unit 100*g* can determine depth information of the imaged object. In this embodiment, the electronic device 300 includes multiple image capturing units 100, 100*d*, 100*e*, 100*f* and 100*g*, but the present disclosure is not limited to the number and arrangement of image capturing units.

When a user captures images of an object 306, the light rays converge in the image capturing unit 100 or the image capturing unit 100*d* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*e*, 100*f* or 100*g* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

15th Embodiment

Figure 29:
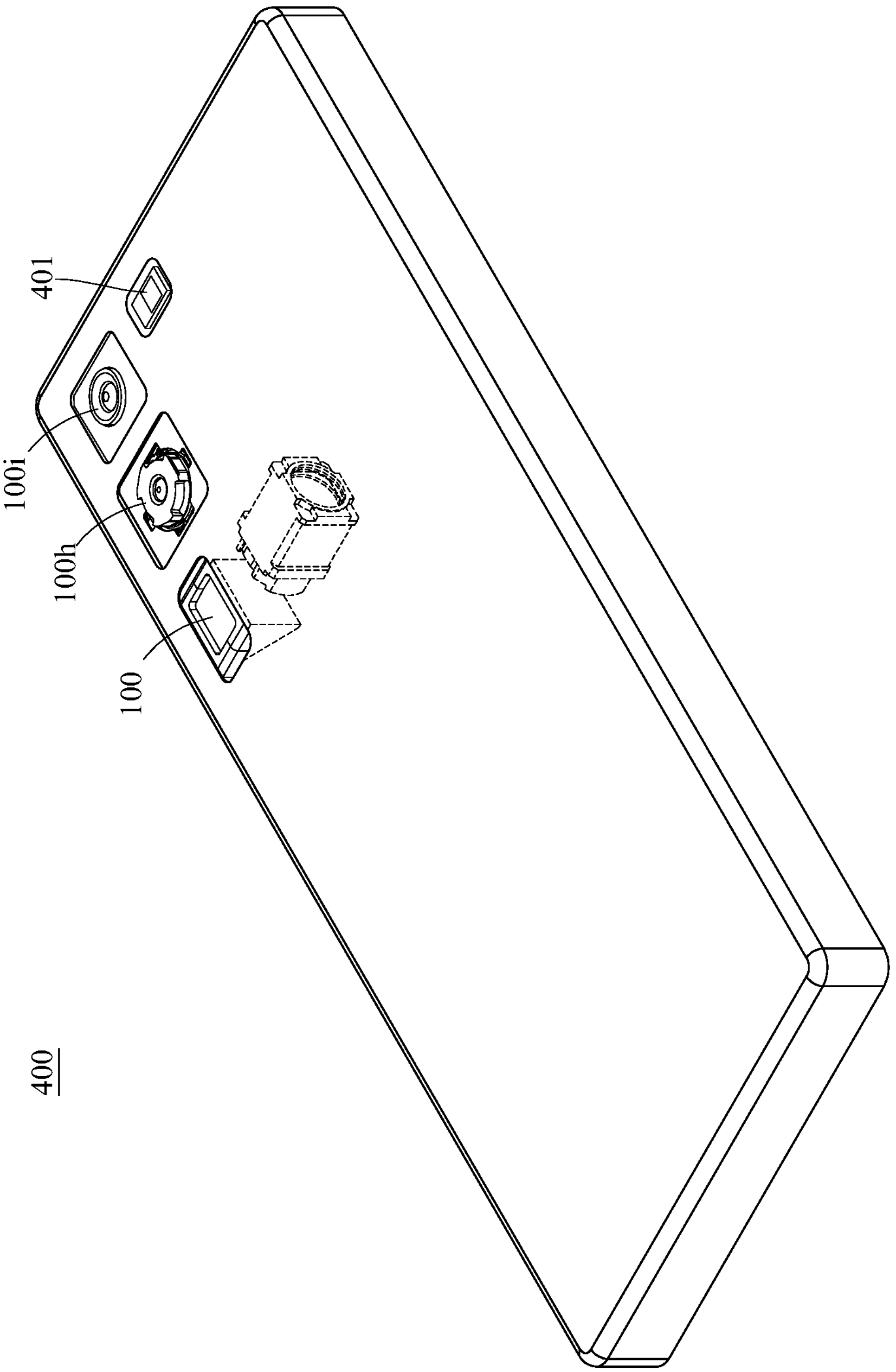
FIG. 29 is one perspective view of an electronic device according to the 15th embodiment of the present disclosure.

FIG. 29 is one perspective view of an electronic device according to the 15th embodiment of the present disclosure.

In this embodiment, an electronic device 400 is a smartphone including the image capturing unit 100 disclosed in the 12th embodiment, an image capturing unit 100*h*, an image capturing unit 100*i*, a flash module 401, a focus assist module, an image signal processor, a display module and an image software processor (not shown). The image capturing unit 100, the image capturing unit 100*h* and the image capturing unit 100*i* are disposed on the same side of the electronic device 400, while the display module is disposed on the opposite side of the electronic device 400. Furthermore, each of the image capturing units 100*h* and 100*i* can include the image capturing lens assembly of the present disclosure and can have a configuration similar to that of the image capturing unit 100, and the details in this regard will not be provided again.

The image capturing unit 100 is a telephoto image capturing unit, the image capturing unit 100*h* is a wide-angle image capturing unit, and the image capturing unit 100*i* is an ultra-wide-angle image capturing unit. In this embodiment, the image capturing units 100, 100*h* and 100*i* have different fields of view, such that the electronic device 400 can have various magnification ratios so as to meet the requirement of optical zoom functionality. Moreover, the image capturing unit 100*h* can be a telephoto image capturing unit having a light-folding element configuration, such that the total track length of the image capturing unit 100*h* is not limited by the thickness of the electronic device 400. Moreover, the light-folding element configuration of the image capturing unit 100*h* can be similar to, for example, one of the structures shown in FIG. 39 to FIG. 41, which can be referred to foregoing descriptions corresponding to FIG. 39 to FIG. 41, and the details in this regard will not be provided again. In this embodiment, the electronic device 400 includes multiple image capturing units 100, 100*h* and 100*i*, but the present disclosure is not limited to the number and arrangement of image capturing units. When a user captures images of an object, light rays converge in the image capturing unit 100, 100*h* or 100*i* to generate images, and the flash module 401 is activated for light supplement. Further, the subsequent processes are performed in a manner similar to the abovementioned embodiment, so the details in this regard will not be provided again.

16th Embodiment

Figure 30:
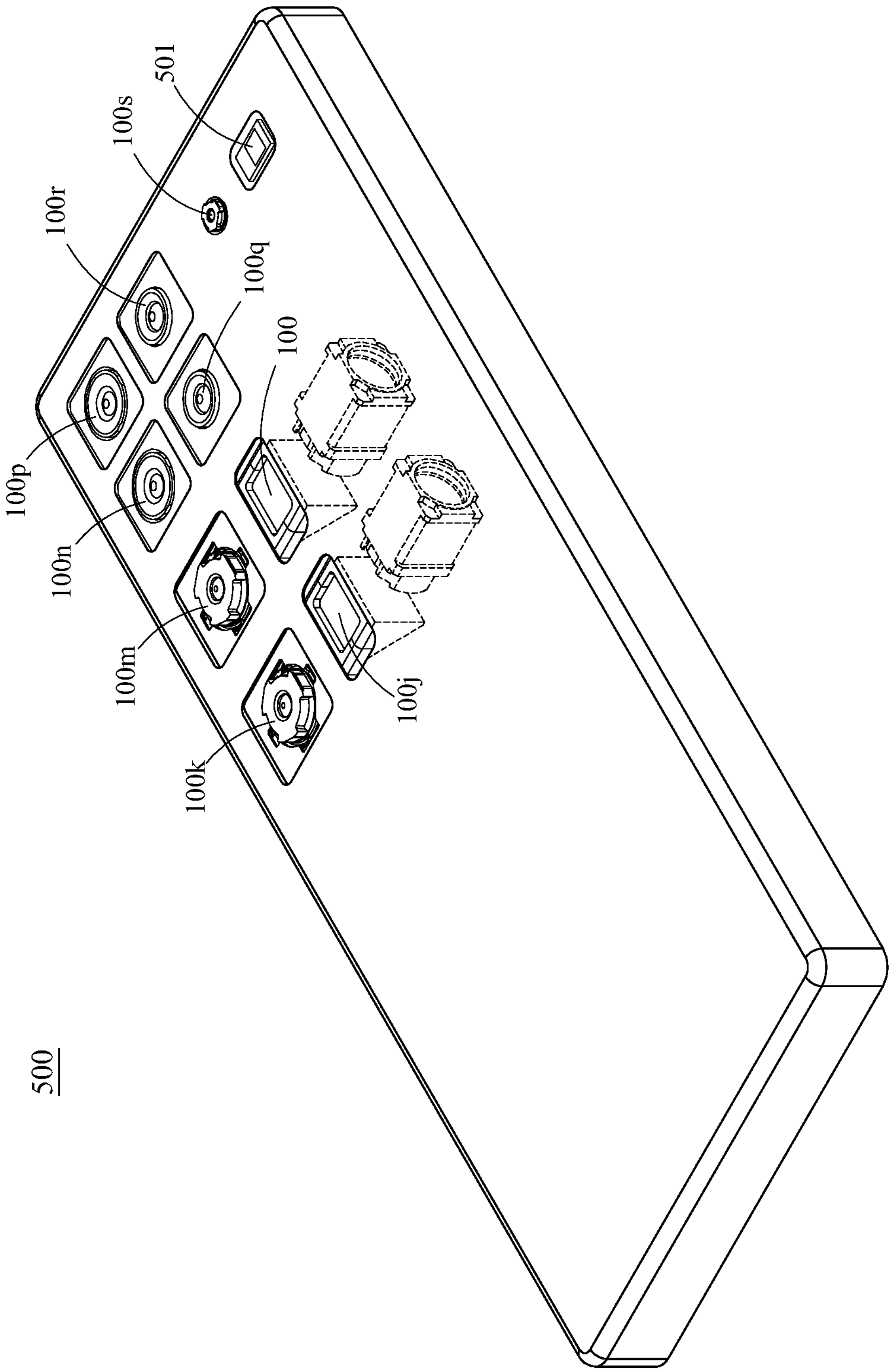
FIG. 30 is one perspective view of an electronic device according to the 16th embodiment of the present disclosure.

FIG. 30 is one perspective view of an electronic device according to the 16th embodiment of the present disclosure.

In this embodiment, an electronic device 500 is a smartphone including the image capturing unit 100 disclosed in the 12th embodiment, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, an image capturing unit 100*s*, a flash module 501, a focus assist module, an image signal processor, a display module and an image software processor (not shown). The image capturing units 100, 100*j*, 100*k*, 100*m*, 100*n*, 100*p*, 100*q*, 100*r* and 100*s* are disposed on the same side of the electronic device 500, while the display module is disposed on the opposite side of the electronic device 500. Furthermore, each of the image capturing units 100*j*, 100*k*, 100*m*, 100*n*, 100*p*, 100*q*, 100*r* and 100*s* can include the image capturing lens assembly of the present disclosure and can have a configuration similar to that of the image capturing unit 100, and the details in this regard will not be provided again.

The image capturing unit 100 is a telephoto image capturing unit, the image capturing unit 100*j* is a telephoto image capturing unit, the image capturing unit 100*k* is a wide-angle image capturing unit, the image capturing unit 100*m* is a wide-angle image capturing unit, the image capturing unit 100*n* is an ultra-wide-angle image capturing unit, the image capturing unit 100*p* is an ultra-wide-angle image capturing unit, the image capturing unit 100*q* is a telephoto image capturing unit, the image capturing unit 100*r* is a telephoto image capturing unit, and the image capturing unit 100*s* is a ToF image capturing unit. In this embodiment, the image capturing units 100, 100*j*, 100*k*, 100*m*, 100*n*, 100*p*, 100*q* and 100*r* have different fields of view, such that the electronic device 500 can have various magnification ratios so as to meet the requirement of optical zoom functionality. Moreover, each of the image capturing units 100 and 100*j* can be a telephoto image capturing unit having a light-folding element configuration. Moreover, the light-folding element configuration of each of the image capturing unit 100 and 100*j* can be similar to, for example, one of the structures shown in FIG. 39 to FIG. 41, which can be referred to foregoing descriptions corresponding to FIG. 39 to FIG. 41, and the details in this regard will not be provided again. In addition, the image capturing unit 100*s* can determine depth information of the imaged object. In this embodiment, the electronic device 500 includes multiple image capturing units 100, 100*j*, 100*k*, 100*m*, 100*n*, 100*p*, 100*q*, 100*r* and 100*s*, but the present disclosure is not limited to the number and arrangement of image capturing units. When a user captures images of an object, the light rays converge in the image capturing unit 100, 100*j*, 100*k*, 100*m*, 100*n*, 100*p*, 100*q*, 100*r* or 100*s* to generate images, and the flash module 501 is activated for light supplement. Further, the subsequent processes are performed in a manner similar to the abovementioned embodiments, and the details in this regard will not be provided again.

17th Embodiment

Figure 31:
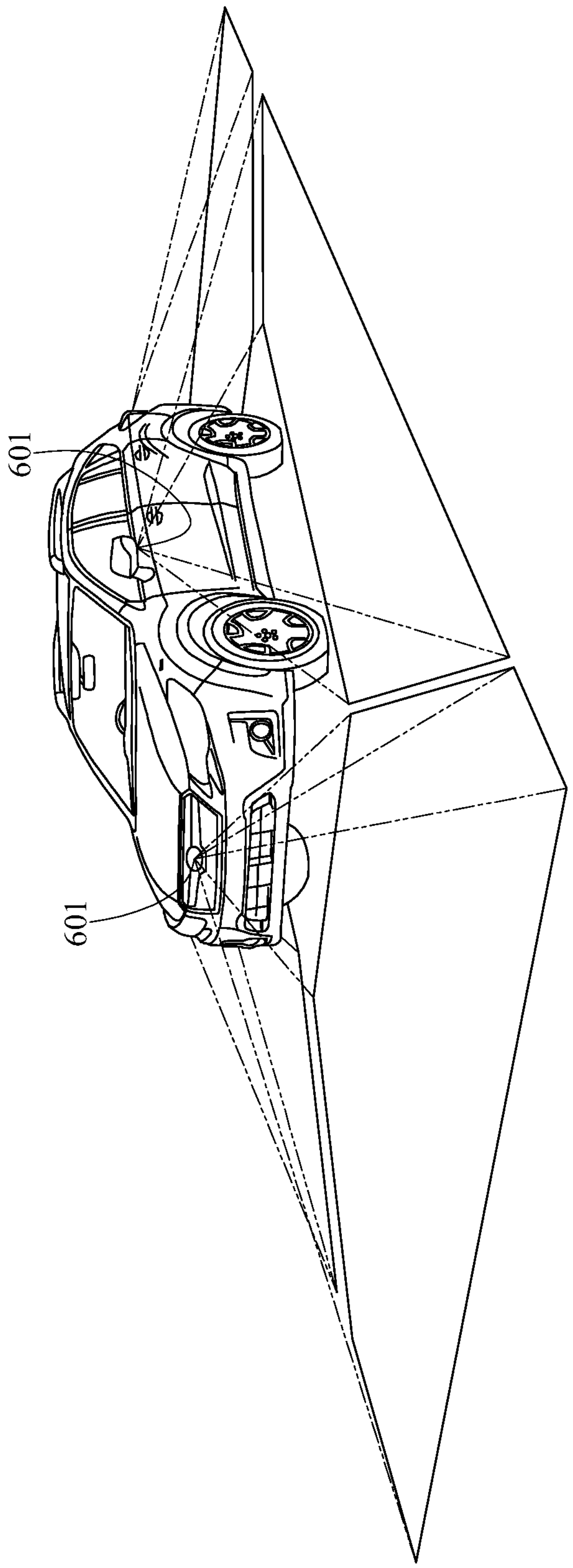
FIG. 31 is a perspective view of an electronic device according to the 17th embodiment of the present disclosure.
Figure 32:
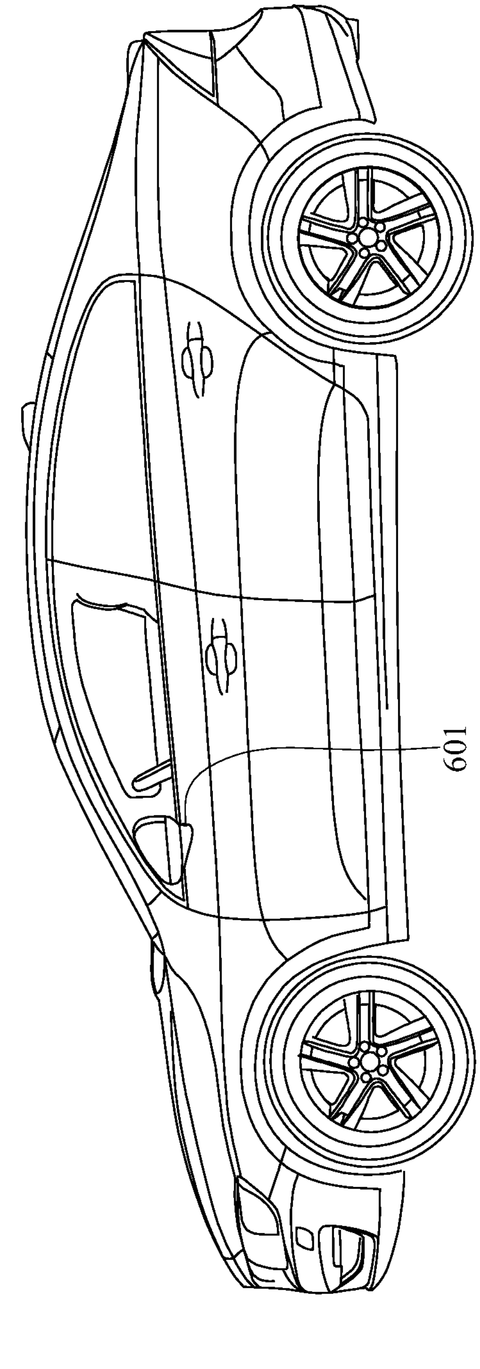
FIG. 32 is a side view of the electronic device in FIG. 31.
Figure 33:
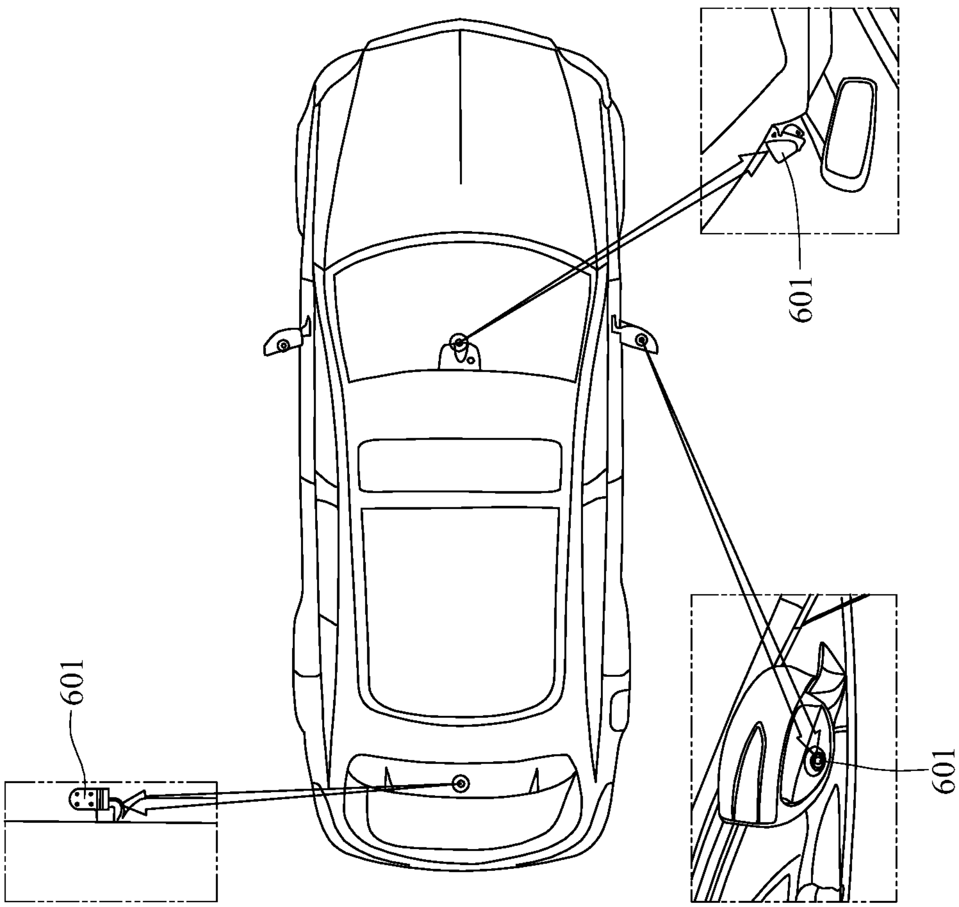
FIG. 33 is a top view of the electronic device in FIG. 31.

FIG. 31 is a perspective view of an electronic device according to the 17th embodiment of the present disclosure. FIG. 32 is a side view of the electronic device in FIG. 31. FIG. 33 is a top view of the electronic device in FIG. 31.

In this embodiment, an electronic device 600 is a mobile vehicle, such as a car. The electronic device 600 includes a plurality of image capturing units 601, and each of the image capturing units 601 includes, for example, the image capturing lens assembly of the present disclosure. The image capturing units 601 can be served as, for example, panoramic view car cameras, dashboard cameras and vehicle backup cameras. The image capturing units 601 can be wide-angle image capturing units.

As shown in FIG. 31 to FIG. 33, the image capturing units 601 are, for example, disposed at the front side, the rear side, the lateral sides, inner side or on the backmirror of the car to capture peripheral images of the car, which is favorable for obtaining external traffic information so as to achieve an advanced driver-assistance function. In addition, the image software processor may stitch the peripheral images into one panoramic view image for the driver's checking every corner surrounding the car, thereby assisting in parking and driving.

As shown in FIG. 32, the image capturing units 601 are, for example, disposed on the lower portion of the side mirrors for capturing image information of the left and right lanes. As shown in FIG. 33, the image capturing units 601 can also be, for example, disposed on the lower portion of the side mirrors and inside the front and rear windshields for providing external information to the driver, and also providing more viewing angles so as to reduce blind spots, thereby improving driving safety. Please be noted the arrangement of the image capturing units 601 in the drawings is only exemplary, and the number, the positions and the image capturing directions of the image capturing units 601 can be adjusted according to actual requirements.

18th Embodiment

Figure 34:
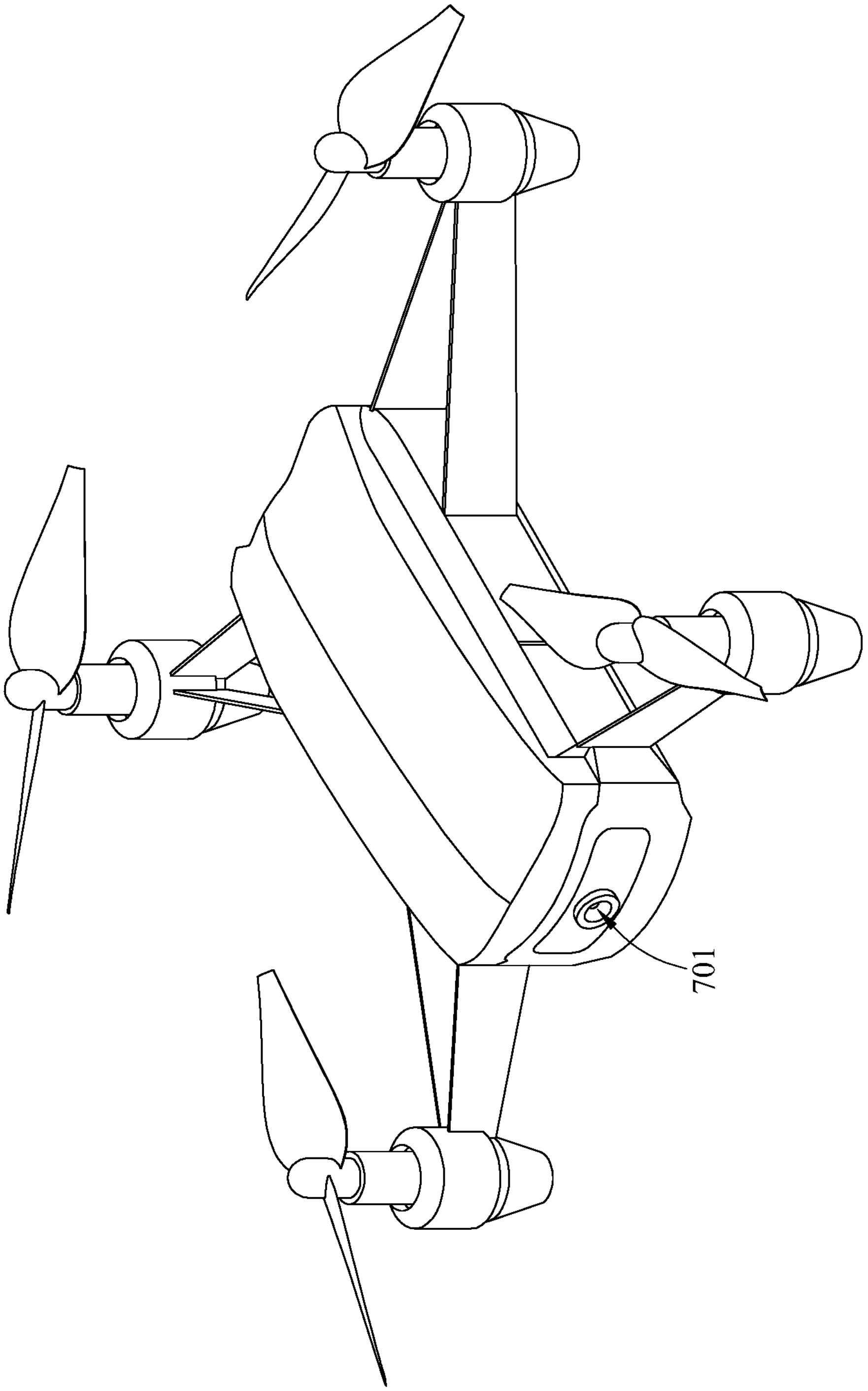
FIG. 34 is a schematic view of an electronic device according to the 18th embodiment of the present disclosure.

FIG. 34 is a schematic view of an electronic device according to the 18th embodiment of the present disclosure.

In this embodiment, an electronic device 700 may be a lightweight unmanned aerial vehicle, such as a drone camera. The electronic device 700 includes an image capturing unit 701. The image capturing unit 701 includes the image capturing lens assembly disclosed in the 1st embodiment. The image capturing unit 701 can be a telephoto image capturing unit. The image capturing unit 701, which is similar to the image capturing unit 100, can further include a barrel, a holder member or a combination thereof. The electronic device 700 captures an image by the image capturing unit 701. Preferably, the electronic device may further include a control unit, a display unit, a storage unit, a random access memory unit (RAM) or a combination thereof.

The smartphone, the camera, the mobile vehicle and the unmanned aerial vehicle in several embodiments are only exemplary for showing the image capturing unit of the present disclosure installed in an electronic device, and the present disclosure is not limited thereto. The image capturing unit can be optionally applied to optical systems with a movable focus. Furthermore, the image capturing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-11C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising two lens groups, the two lens groups being, in order from an object side to an image side along an optical path, a first lens group and a second lens group, the two lens groups comprising six lens units, the six lens units being, in order from the object side to the image side along the optical path, a first lens unit, a second lens unit, a third lens unit, a fourth lens unit, a fifth lens unit and a sixth lens unit, the first lens group comprising the first lens unit, the second lens unit and the third lens unit, the second lens group comprising a front lens group and a rear lens group, the front lens group comprising the fourth lens unit, and the rear lens group comprising the fifth lens unit and the sixth lens unit;

wherein each of the first lens unit, the second lens unit, the third lens unit, the fifth lens unit and the sixth lens unit is a single lens element;

wherein the fourth lens unit is a single lens element or is composed of two lens elements; when the fourth lens unit is a single lens element, the fourth lens unit comprises a front lens element; when the fourth lens unit is composed of two lens elements, the fourth lens unit comprises, in order from the object side to the image side along the optical path, a front lens element and a rear lens element;

wherein a total number of lens groups of the image capturing lens assembly is two, a total number of lens units of the image capturing lens assembly is six, a total number of lens elements of the image capturing lens assembly is six to seven, each lens element of the image capturing lens assembly has an object-side surface facing toward the object side and an image-side surface facing toward the image side, and there is no additional lens element disposed between each of adjacent two of the six lens units;

wherein the image-side surface of the first lens unit is concave in a paraxial region thereof, the object-side surface of the third lens unit is convex in a paraxial region thereof, the front lens element has negative refractive power, and the image-side surface of the front lens element is concave in a paraxial region thereof;

wherein a maximum field of view of the image capturing lens assembly is FOV, an axial distance between the image-side surface of the front lens element and the object-side surface of the fifth lens unit is Dra2r9, an axial distance of the first lens group is DG1, an axial distance of the front lens group is DG2f, a central thickness of the front lens element is CTa, a central thickness of the fifth lens unit is CT5, an axial distance between the object-side surface of the first lens unit and an image surface is TL, an axial distance between the first lens unit and the second lens unit is T12, an entrance pupil diameter of the image capturing lens assembly is EPD, a focal length of the image capturing lens assembly is f, a composite focal length of the first lens unit and the second lens unit is f12, a composite focal length of the second lens unit and the third lens unit is f23, a focal length of the front lens group is fG2f, and the following conditions are satisfied:

$$10.0 \text{ degrees} < FOV < 45.0 \text{ degrees};$$

$$0.65 < Dra2r9/CT5 < 2.10;$$

$$DG1/DG2f < 1.68;$$

$$2.40 < TL/EPD < 4.10;$$

$$-1.30 < f/f23 - |f/f12| + f/fG2f < 3.00;$$

and $$10 \times T12/CTa < 2.50.$$

2. The image capturing lens assembly of claim 1, further comprising an aperture stop disposed at an object side of the second lens group, wherein at least one of the object-side surface and the image-side surface of at least one lens element of the first lens group is spherical.

3. The image capturing lens assembly of claim 1, wherein the focal length of the image capturing lens assembly is f, a focal length of the first lens group is fG1, a curvature radius of the image-side surface of the first lens unit is R2, a curvature radius of the image-side surface of the front lens element is Ra2, and the following conditions are satisfied:

$$0.10 < f/fG1 < 1.60;$$

and

-continued $$0.80 < |R2/Ra2| < 15.00.$$

4. The image capturing lens assembly of claim 1, wherein a curvature radius of the image-side surface of the second lens unit is R4, a curvature radius of the image-side surface of the third lens unit is R6, the focal length of the image capturing lens assembly is f, an axial distance between the fifth lens unit and the sixth lens unit is T56, the axial distance between the object-side surface of the first lens unit and the image surface is TL, a central thickness of the sixth lens unit is CT6, a maximum image height of the image capturing lens assembly is ImgH, and the following conditions are satisfied:

$$2.50 < |R4|/f + |R6|/f;$$

and $$3.30 < T56/CT6 + TL/ImgH < 10.50.$$

5. The image capturing lens assembly of claim 1, wherein an Abbe number of the first lens unit is V1, an Abbe number of the second lens unit is V2, an Abbe number of the front lens element is Va, and the following condition is satisfied:

$$1.00 < (V1 + V2)/Va < 3.80.$$

6. The image capturing lens assembly of claim 1, wherein a curvature radius of the object-side surface of the second lens unit is R3, a curvature radius of the image-side surface of the front lens element is Ra2, the focal length of the image capturing lens assembly is f, the composite focal length of the first lens unit and the second lens unit is f12, the composite focal length of the second lens unit and the third lens unit is f23, and the following conditions are satisfied:

$$0.60 < |R3/Ra2| < 20.00;$$

and $$0.00 < f/f12 + f/f23.$$

7. The image capturing lens assembly of claim 1, wherein the fourth lens unit is composed of two lens elements, and the sixth lens unit has negative refractive power.

8. The image capturing lens assembly of claim 7, wherein the rear lens element has positive refractive power, and at least one lens element of the image capturing lens assembly is made of glass material.

9. The image capturing lens assembly of claim 1, wherein a distance in parallel with an optical axis between a maximum effective radius position of the object-side surface of the front lens element and a maximum effective radius position of the image-side surface of the front lens element is ETa, a distance in parallel with the optical axis between a maximum effective radius position of the object-side surface of the fifth lens unit and a maximum effective radius position of the image-side surface of the fifth lens unit is ET5, a maximum effective radius of the object-side surface of the first lens unit is Y1R1, a maximum effective radius of the image-side surface of the sixth lens unit is Y6R2, a maximum value of an absolute value of a distortion aberration on the image surface at various fields of view is |Dist|max, and the following conditions are satisfied:

$$0.80 < ETa/ET5 < 3.50;$$

$$0.50 < Y6R2/Y1R1 < 1.60; \text{ and}$$

$$|Dist|\max < 5.00\%.$$

10. An image capturing unit, comprising:
the image capturing lens assembly of claim 1; and
an image sensor disposed on the image surface of the image capturing lens assembly.

11. An electronic device, comprising:
the image capturing unit of claim 10.

12. An image capturing lens assembly comprising two lens groups, the two lens groups being, in order from an object side to an image side along an optical path, a first lens group and a second lens group, the two lens groups comprising six lens units, the six lens units being, in order from the object side to the image side along the optical path, a first lens unit, a second lens unit, a third lens unit, a fourth lens unit, a fifth lens unit and a sixth lens unit, the first lens group comprising the first lens unit, the second lens unit and the third lens unit, the second lens group comprising a front lens group and a rear lens group, the front lens group comprising the fourth lens unit, and the rear lens group comprising the fifth lens unit and the sixth lens unit;
wherein each of the first lens unit, the second lens unit, the third lens unit, the fifth lens unit and the sixth lens unit is a single lens element;
wherein the fourth lens unit is a single lens element or is composed of two cemented lens elements; when the fourth lens unit is a single lens element, the fourth lens unit comprises a front lens element; when the fourth lens unit is composed of two cemented lens elements, the fourth lens unit comprises, in order from the object side to the image side along the optical path, a front lens element and a rear lens element;
wherein a total number of lens groups of the image capturing lens assembly is two, a total number of lens units of the image capturing lens assembly is six, a total number of lens elements of the image capturing lens assembly is six to seven, each lens element of the image capturing lens assembly has an object-side surface facing toward the object side and an image-side surface facing toward the image side, and there is no additional lens element disposed between each of adjacent two of the six lens units;
wherein the image-side surface of the first lens unit is concave in a paraxial region thereof, the object-side surface of the third lens unit is convex in a paraxial region thereof, the front lens element has negative refractive power, and the image-side surface of the front lens element is concave in a paraxial region thereof;
wherein a maximum field of view of the image capturing lens assembly is FOV, an axial distance of the first lens group is DG1, an axial distance of the front lens group is DG2f, an axial distance between the object-side surface of the first lens unit and an image surface is TL, an entrance pupil diameter of the image capturing lens assembly is EPD, a curvature radius of a most-object-side surface of the fourth lens unit is RU4f, a curvature radius of a most-image-side surface of the fourth lens unit is RU4r, a focal length of the second lens unit is f2, a focal length of the third lens unit is f3, a focal length of the fifth lens unit is f5, and the following conditions are satisfied:

$$15.0 \text{ degrees} < FOV < 42.0 \text{ degrees};$$

$$DG1/DG2f < 1.68;$$

$$2.40 < TL/EPD < 4.10;$$

$$RU4f/RU4r < 7.50; \text{ and}$$

$$1.60 < |f3 + f5|/|f2|.$$

13. The image capturing lens assembly of claim 12, wherein at least one of the object-side surface and the image-side surface of at least one lens element of the first lens group is spherical.

14. The image capturing lens assembly of claim 12, wherein the axial distance of the first lens group is DG1, an axial distance of the second lens group is DG2, an Abbe number of the first lens unit is V1, an Abbe number of the second lens unit is V2, an Abbe number of the front lens element is Va, and the following conditions are satisfied:

$$0.20 < DG1/DG2 < 0.65; \text{ and}$$

$$1.00 < (V1 + V2)/Va < 3.80.$$

15. The image capturing lens assembly of claim 12, wherein an axial distance between the fifth lens unit and the sixth lens unit is T56, the axial distance between the object-side surface of the first lens unit and the image surface is TL, a central thickness of the sixth lens unit is CT6, a maximum image height of the image capturing lens assembly is ImgH, a curvature radius of the object-side surface of the first lens unit is R1, a curvature radius of the image-side surface of the first lens unit is R2, and the following conditions are satisfied:

$$3.30 < T56/CT6 + TL/ImgH < 10.50; \text{ and}$$

$$0.25 < |R1/R2|.$$

16. The image capturing lens assembly of claim 12, wherein a focal length of the image capturing lens assembly is f, a composite focal length of the first lens unit and the second lens unit is f12, a composite focal length of the second lens unit and the third lens unit is f23, a focal length of the front lens group is fG2f, and the following condition is satisfied:

$$-1.50 < f/f23 - |f/f12| + f/fG2f < 3.50.$$

17. The image capturing lens assembly of claim 12, further comprising an aperture stop, wherein a maximum image height of the image capturing lens assembly is ImgH, an axial distance between the aperture stop and the image-side surface of the sixth lens unit is SD, the axial distance between the object-side surface of the first lens unit and the image surface is TL, and the following condition is satisfied:

$$4.30 < 10 \times (ImgH/SD + ImgH/TL) < 8.90.$$

18. The image capturing lens assembly of claim 12, wherein a focal length of the image capturing lens assembly is f, a focal length of the first lens group is fG1, a focal length of the second lens group is fG2, an axial distance between the image-side surface of the front lens element and the object-side surface of the fifth lens unit is Dra2r9, a central thickness of the fifth lens unit is CT5, and the following conditions are satisfied:

$$0.25 < |f/fG1| + |f/fG2|; \text{ and}$$

$$0.65 < Dra2r9/CT5 < 2.10.$$

19. The image capturing lens assembly of claim 12, wherein the fourth lens unit is composed of two cemented lens elements, and the rear lens element has positive refractive power;

wherein an axial distance between the front lens element and the rear lens element is Tab, and the following condition is satisfied:

$$0.001 \text{ millimeters} < Tab < 0.020 \text{ millimeters}.$$

20. The image capturing lens assembly of claim 12, wherein the maximum field of view of the image capturing lens assembly is FOV, an axial distance between the image-side surface of the front lens element and the object-side surface of the fifth lens unit is Dra2r9, the axial distance of the first lens group is DG1, the axial distance of the front lens group is DG2f, a central thickness of the front lens element is CTa, a central thickness of the fifth lens unit is CT5, the axial distance between the object-side surface of the first lens unit and the image surface is TL, an axial distance between the first lens unit and the second lens unit is T12, the entrance pupil diameter of the image capturing lens assembly is EPD, a focal length of the image capturing lens assembly is f, the focal length of the second lens unit is f2, the focal length of the third lens unit is f3, the focal length of the fifth lens unit is f5, a composite focal length of the first lens unit and the second lens unit is f12, a composite focal length of the second lens unit and the third lens unit is f23, a focal length of the front lens group is fG2f, the curvature radius of the most-object-side surface of the fourth lens unit is RU4f, the curvature radius of the most-image-side surface of the fourth lens unit is RU4r, and the following conditions are satisfied:

$$29.8 \text{ degrees} \leq FOV \leq 37.0 \text{ degrees};$$

$$0.81 \leq Dra2r9/CT5 \leq 1.81;$$

$$0.60 \leq DG1/DG2f \leq 1.44;$$

$$2.71 \leq TL/EPD \leq 3.73;$$

$$-0.81 \leq f/f23 - |f/f12| + f/fG2f \leq 2.28;$$

$$0.06 \leq 10 \times T12/CTa \leq 1.31;$$

$$-2.91 \leq RU4f/RU4r \leq 1.98; \text{ and}$$

$$1.75 \leq |f3 + f5|/|f2| \leq 48.28.$$

21. An image capturing lens assembly comprising two lens groups, the two lens groups being, in order from an object side to an image side along an optical path, a first lens group and a second lens group, the two lens groups comprising six lens units, the six lens units being, in order from the object side to the image side along the optical path, a first lens unit, a second lens unit, a third lens unit, a fourth lens unit, a fifth lens unit and a sixth lens unit, the first lens group comprising the first lens unit, the second lens unit and the third lens unit, the second lens group comprising a front lens group and a rear lens group, the front lens group comprising the fourth lens unit, and the rear lens group comprising the fifth lens unit and the sixth lens unit;

wherein each of the first lens unit, the second lens unit, the third lens unit, the fifth lens unit and the sixth lens unit is a single lens element, the fourth lens unit is composed of two lens elements, and the fourth lens unit comprises, in order from the object side to the image side along the optical path, a front lens element and a rear lens element;

wherein a total number of lens groups of the image capturing lens assembly is two, a total number of lens units of the image capturing lens assembly is six, a total number of lens elements of the image capturing lens assembly is seven, each lens element of the image capturing lens assembly has an object-side surface facing toward the object side and an image-side surface facing toward the image side, and there is no additional lens element disposed between each of adjacent two of the six lens units;

wherein the object-side surface of the third lens unit is convex in a paraxial region thereof, the object-side surface of the front lens element is concave in a paraxial region thereof, and the sixth lens unit has negative refractive power;

wherein a maximum field of view of the image capturing lens assembly is FOV, an axial distance between the object-side surface of the front lens element and the object-side surface of the fifth lens unit is Dra1r9, an axial distance between the image-side surface of the front lens element and the object-side surface of the fifth lens unit is Dra2r9, an axial distance between the first lens unit and the second lens unit is T12, a central thickness of the front lens element is CTa, a central thickness of the first lens unit is CT1, a central thickness of the second lens unit is CT2, a central thickness of the fifth lens unit is CT5, an axial distance between the front lens element and the rear lens element is Tab, a focal length of the second lens unit is f2, a focal length of the third lens unit is f3, a focal length of the fifth lens unit is f5, and the following conditions are satisfied:

$$10.0 \text{ degrees} < FOV < 55.0 \text{ degrees};$$

$$0.50 < Dra2r9/CT5 < 2.30;$$

$$3.0 < Dra1r9/CT1 < 15.0; \text{ and}$$

$$1.80 < 0.1 \times CT2/\text{Tab}.$$

22. The image capturing lens assembly of claim 21, wherein at least one of the object-side surface and the image-side surface of at least one lens element of the first lens group is spherical, at least one lens element of the image capturing lens assembly is made of glass material, and there is no relative displacement between each adjacent two lens elements of the image capturing lens assembly.

23. The image capturing lens assembly of claim 21, wherein a focal length of the image capturing lens assembly is f, a focal length of the first lens unit is f1, the focal length of the second lens unit is f2, a curvature radius of the object-side surface of the first lens unit is R1, a curvature radius of the object-side surface of the fifth lens unit is R9, a curvature radius of the image-side surface of the sixth lens unit is R12, and the following conditions are satisfied:

$$-0.70 < f/f1 + f/f2 < 1.15; \text{ and}$$

$$|R1|/f + |R9|/f + |R12|/f < 25.0.$$

24. The image capturing lens assembly of claim 21, wherein an axial distance of the first lens group is DG1, an axial distance of the front lens group is DG2f, a curvature radius of the image-side surface of the front lens element is Ra2, a curvature radius of the object-side surface of the rear lens element is Rb1, a focal length of the image capturing lens assembly is f, and the following conditions are satisfied:

$$DG1/DG2f < 1.80; \text{ and}$$

$$|Ra2|/f + |Rb1|/f < 3.30.$$

25. The image capturing lens assembly of claim 21, wherein an axial distance between the object-side surface of the first lens unit and an image surface is TL, an entrance pupil diameter of the image capturing lens assembly is EPD, and the following condition is satisfied:

$$1.50 < TL/EPD < 4.10.$$

26. The image capturing lens assembly of claim 21, further comprising an aperture stop, wherein an axial distance between the fifth lens unit and the sixth lens unit is T56, an axial distance between the object-side surface of the first lens unit and an image surface is TL, a central thickness of the sixth lens unit is CT6, a maximum image height of the image capturing lens assembly is ImgH, an axial distance between the aperture stop and the object-side surface of the fifth lens unit is Dsr9, an axial distance between the aperture stop and the image-side surface of the fifth lens unit is Dsr10, and the following conditions are satisfied:

$$3.30 < T56/CT6 + TL/ImgH < 10.50; \text{ and}$$

$$Dsr9/Dsr10 < 0.98.$$

27. The image capturing lens assembly of claim 21, wherein the rear lens element has positive refractive power, and the object-side surface of the rear lens element is convex in a paraxial region thereof.

28. The image capturing lens assembly of claim 21, wherein at least one of the object-side surface and the image-side surface of each of at least three lens elements of the image capturing lens assembly is spherical;

wherein a maximum image height of the image capturing lens assembly is ImgH, a maximum effective radius of the object-side surface of the first lens unit is Y1R1, a maximum effective radius of the object-side surface of the second lens unit is Y2R1, and the following condition is satisfied:

$$0.65 < 2 \times ImgH/(Y1R1 + Y2R1) < 2.00.$$

29. The image capturing lens assembly of claim 21, wherein the maximum field of view of the image capturing lens assembly is FOV, the axial distance between the object-side surface of the front lens element and the object-side surface of the fifth lens unit is Dra1r9, the axial distance between the image-side surface of the front lens element and the object-side surface of the fifth lens unit is Dra2r9, the central thickness of the first lens unit is CT1, the central thickness of the second lens unit is CT2, the central thickness of the fifth lens unit is CT5, the axial distance between the front lens element and the rear lens element is Tab, and the following conditions are satisfied:

$$29.8 \text{ degrees} \leq FOV \leq 37.0 \text{ degrees};$$

$$0.98 \leq Dra2r9/CT5 \leq 1.91;$$

$$3.38 \leq 9/Dra1r9/CT1 \leq 9.51; \text{ and}$$

$$3.24 \leq 0.1 \times CT2/\text{Tab} \leq 65.72.$$

* * * * *